(12) United States Patent
Murphy et al.

(10) Patent No.: US 11,552,983 B2
(45) Date of Patent: Jan. 10, 2023

(54) THREAT MITIGATION SYSTEM AND METHOD

(71) Applicant: ReliaQuest Holdings, LLC, Tampa, FL (US)

(72) Inventors: Brian P. Murphy, Tampa, FL (US); Joe Partlow, Tampa, FL (US); Colin O'Connor, Tampa, FL (US); Jason Pfeiffer, Tampa, FL (US); Brian Philip Murphy, St. Petersburg, FL (US)

(73) Assignee: Reliaquest Holdings, LLC, Tampa, FL (US)

( * ) Notice: Subject to any disclaimer, the term of this patent is extended or adjusted under 35 U.S.C. 154(b) by 0 days.

(21) Appl. No.: 17/016,078

(22) Filed: Sep. 9, 2020

(65) Prior Publication Data

US 2021/0075819 A1   Mar. 11, 2021

Related U.S. Application Data

(60) Provisional application No. 62/897,703, filed on Sep. 9, 2019.

(51) Int. Cl.
*H04L 9/00* (2022.01)
*H04L 9/40* (2022.01)
(Continued)

(52) U.S. Cl.
CPC ...... *H04L 63/1433* (2013.01); *G06F 11/3409* (2013.01); *G06F 21/577* (2013.01); *G06N 5/04* (2013.01); *G06N 20/00* (2019.01); *H04L 63/1416* (2013.01); *H04L 63/1441* (2013.01); *H04L 67/34* (2013.01); *H04L 67/60* (2022.05); *G06F 2221/034* (2013.01); *H04L 63/1425* (2013.01)

(58) Field of Classification Search
CPC .................................................. H04L 63/1433
USPC ........................................................... 726/25
See application file for complete search history.

(56) References Cited

U.S. PATENT DOCUMENTS

| 7,451,488 B2 | 11/2008 | Cooper et al. |
| 7,895,643 B2 | 2/2011 | Yung et al. |

(Continued)

FOREIGN PATENT DOCUMENTS

| WO | 2004086168 A2 | 10/2004 |
| WO | 2016123238 A1 | 8/2016 |
| WO | 2019152505 A1 | 8/2019 |

OTHER PUBLICATIONS

Non-Final Office Action issued in related U.S. Appl. No. 17/016,057 dated Dec. 10, 2020, 9 pages.

(Continued)

*Primary Examiner* — Christopher J Brown
(74) *Attorney, Agent, or Firm* — Brian J. Colandreo; Jeffrey T. Placker; Holland & Knight LLP

(57) ABSTRACT

A computer-implemented method, computer program product and computing system for: detecting one or more security events within a computing platform of a client; notifying the client of the one or more security events within the computing platform; determining if the client responded to the one or more security events within the computing platform; and providing a response report to the client that quantifies client response performance based, at least in part, upon if the client responded to the one or more security events within the computing platform.

21 Claims, 41 Drawing Sheets

(51) Int. Cl.
  *G06N 20/00*  (2019.01)
  *H04L 67/00*  (2022.01)
  *G06F 11/34*  (2006.01)
  *G06F 21/57*  (2013.01)
  *G06N 5/04*  (2006.01)
  *H04L 67/60*  (2022.01)

(56) References Cited

U.S. PATENT DOCUMENTS

| | | | |
|---|---|---|---|
| 8,087,087 | B1 | 12/2011 | van Oorschot et al. |
| 8,332,947 | B1 | 12/2012 | Bregman et al. |
| 9,369,431 | B1 | 6/2016 | Kirby et al. |
| 9,841,882 | B2 | 12/2017 | Wilkinson et al. |
| 9,888,024 | B2 * | 2/2018 | Roundy ............... G06F 21/554 |
| 9,942,249 | B2 | 4/2018 | Gatti |
| 10,032,020 | B2 | 7/2018 | Reybok et al. |
| 10,033,764 | B1 * | 7/2018 | Nachenberg ............ H04L 63/20 |
| 10,075,466 | B1 | 9/2018 | Oliphant et al. |
| 10,154,057 | B2 | 12/2018 | Webb et al. |
| 10,341,377 | B1 | 7/2019 | Dell'Amico et al. |
| 10,547,616 | B2 | 1/2020 | Carter et al. |
| 10,594,722 | B2 * | 3/2020 | Boggs ................. H04L 63/1425 |
| 2003/0009696 | A1 * | 1/2003 | Bunker V. ........... H04L 63/1433 726/26 |
| 2003/0028803 | A1 | 2/2003 | Bunker et al. |
| 2003/0056116 | A1 | 3/2003 | Bunker et al. |
| 2009/0024663 | A1 * | 1/2009 | McGovern ............ G06F 21/577 |
| 2009/0216588 | A1 | 8/2009 | Coyne et al. |
| 2012/0124422 | A1 | 5/2012 | Hsiao et al. |
| 2013/0055399 | A1 | 2/2013 | Zaitsev |
| 2013/0247185 | A1 | 9/2013 | Viscuso et al. |
| 2014/0259170 | A1 | 9/2014 | Amsler |
| 2016/0149939 | A1 | 5/2016 | Call et al. |
| 2016/0191547 | A1 | 6/2016 | Zafar et al. |
| 2016/0196735 | A1 | 7/2016 | Clayman |
| 2016/0314417 | A1 | 10/2016 | Jayaraman et al. |
| 2016/0352640 | A1 | 12/2016 | Kompella et al. |
| 2017/0171231 | A1 | 6/2017 | Reybok et al. |
| 2017/0185783 | A1 | 6/2017 | Brucker et al. |
| 2017/0272458 | A1 | 9/2017 | Maddu et al. |
| 2018/0069888 | A1 | 3/2018 | Muddu et al. |
| 2018/0302303 | A1 | 10/2018 | Skovron et al. |
| 2018/0309642 | A1 | 10/2018 | Rutten et al. |
| 2018/0309794 | A1 | 10/2018 | Eskridge et al. |
| 2018/0316706 | A1 | 11/2018 | Tsironis |
| 2018/0375892 | A1 * | 12/2018 | Ganor ................... H04L 63/20 |
| 2019/0021004 | A1 | 1/2019 | Shanmugavadivel et al. |
| 2019/0052660 | A1 * | 2/2019 | Cassidy ................. G06F 21/54 |
| 2019/0124104 | A1 | 4/2019 | Apostolopoulos |
| 2019/0163469 | A1 | 5/2019 | Sreenivasa et al. |
| 2019/0163916 | A1 | 5/2019 | Steele et al. |
| 2019/0243749 | A1 | 8/2019 | Rutten et al. |
| 2019/0260795 | A1 | 8/2019 | Ariaza et al. |
| 2019/0273760 | A1 | 9/2019 | Jacobs |
| 2019/0377867 | A1 | 12/2019 | Murphy et al. |
| 2020/0014711 | A1 | 1/2020 | Rego et al. |
| 2020/0057953 | A1 | 2/2020 | Livny et al. |
| 2020/0059451 | A1 | 2/2020 | Huang et al. |
| 2020/0228570 | A1 | 7/2020 | Strosaker et al. |

OTHER PUBLICATIONS

Non-Final Office Action issued in related U.S. Appl. No. 17/016,000 dated Nov. 9, 2020,16 pages.
Non-Final Office Action issued in related U.S. Appl. No. 17/016,000 dated Jan. 8, 2021, 36 pages.
Non-Final Office Action issued in related U.S. Appl. No. 17/016,031 dated Nov. 23, 2020,15 pages.
Moran, J. et al. "Key Performance Indicators (KPIs) for Security Operations and Incident Response: Identifying Which KPIs Should Be Set, Monitored and Measured." Internet: https://www.dflabs.com/wp-content/uploads/2018/03/KPIs_for_Security_Operations_and_Incident_Response-2.pdf, Mar. 2018 (Year: 2018), 7 pages.
International Search Report and Written Opinion dated Dec. 4, 2020 in related PCT Application Serial No. PCT/US2020/049903, 14 pages.
International Search Report and Written Opinion dated Dec. 3, 2020 in related PCT Application Serial No. PCT/US2020/049912, 17 pages.
International Search Report and Written Opinion dated Dec. 3, 2020 in related PCT Application Serial No. PCT/US2020/049899, 13 pages.
International Search Report and Written Opinion dated Jun. 7, 2021 in related PCT Application Serial No. PCT/US2020/049936, 13 pages.
Notice of Allowance issued in related U.S. Appl. No. 17/016,108 dated Mar. 8, 2021.
International Search Report and Written Opinion dated Dec. 4, 2020 in PCT Application Serial No. PCT/US2020/049930.
Notice of Allowance issued in related U.S. Appl. No. 17/016,057 dated May 3, 2021.
Final Office Action issued in related U.S. Appl. No. 17/016,031 dated May 11, 2021.
Final Office Action issued in related U.S. Appl. No. 17/016,000 dated Jun. 11, 2021.
Notice of Allowance issued in related U.S. Appl. No. 17/016,031 dated Sep. 29, 2021.
Non-Final Office Action issued in U.S. Appl. No. 17/857,461 dated Oct. 18, 2022.

* cited by examiner

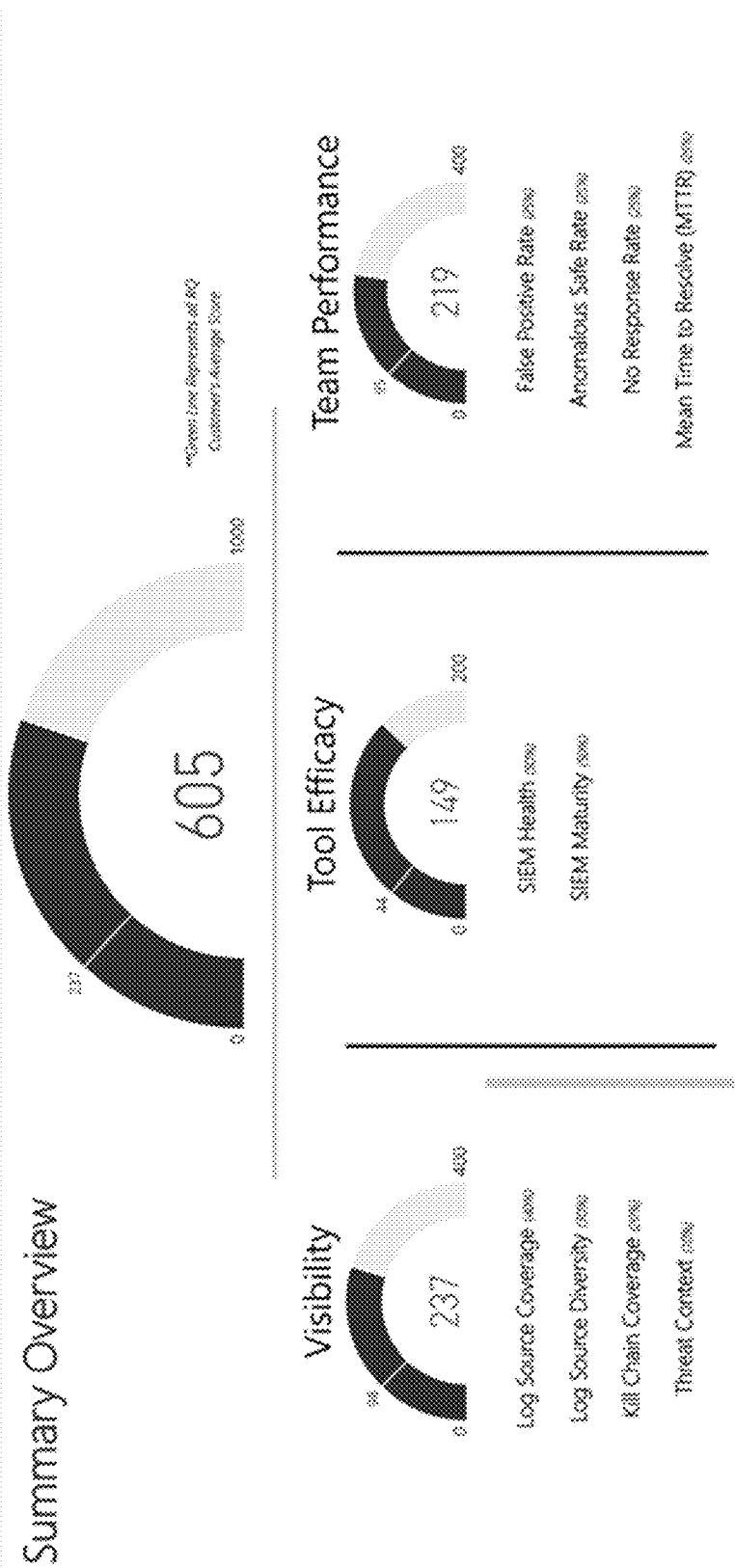
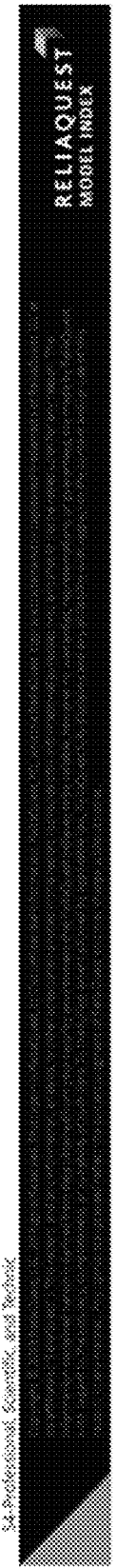
FIG. 5

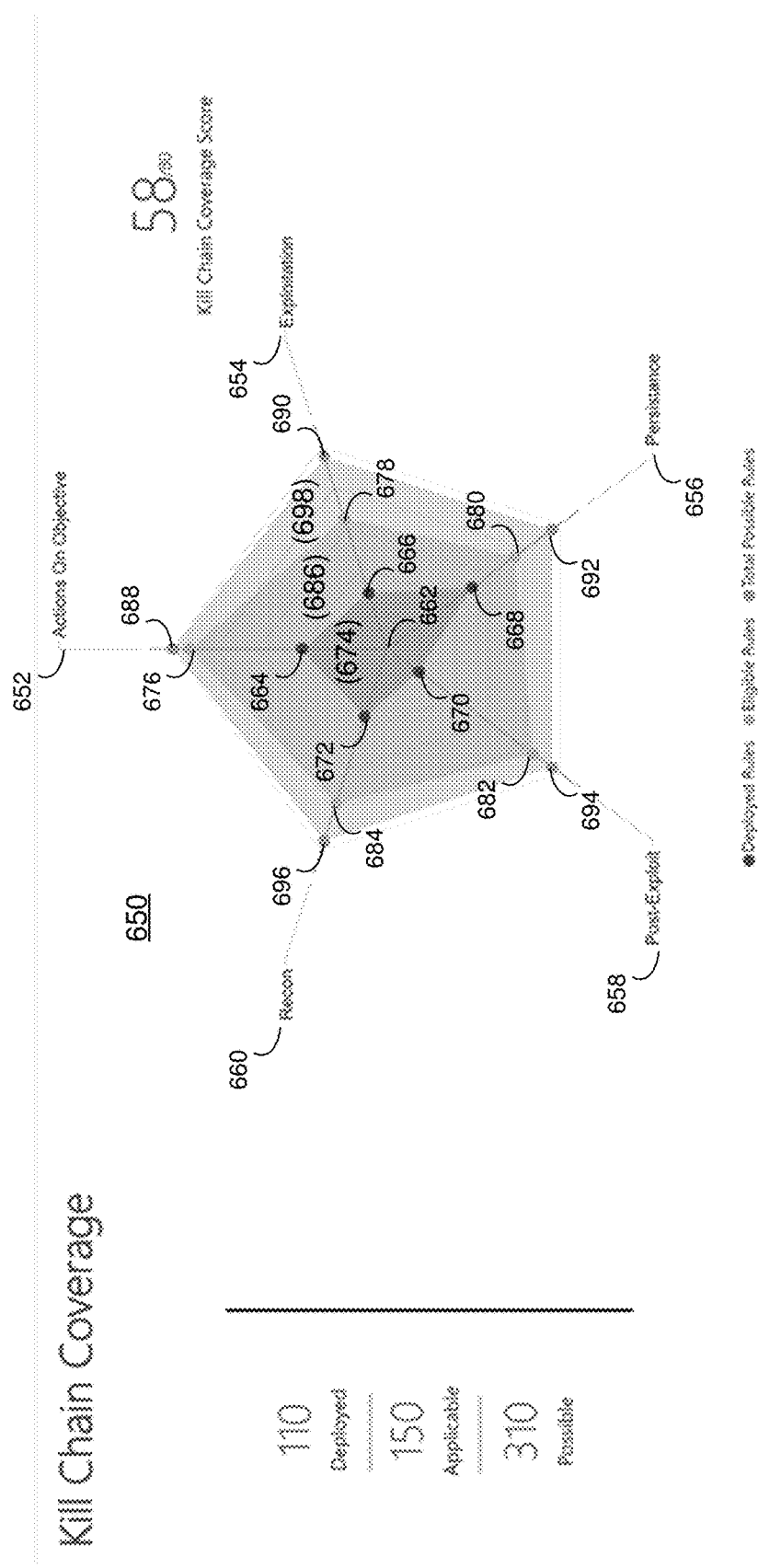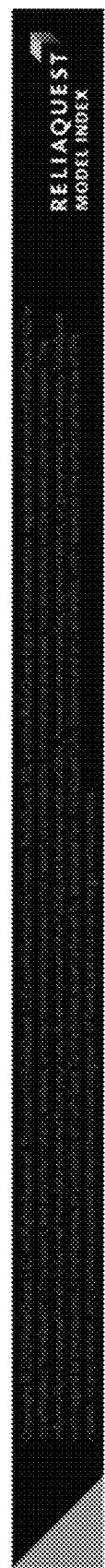
FIG. 12

352
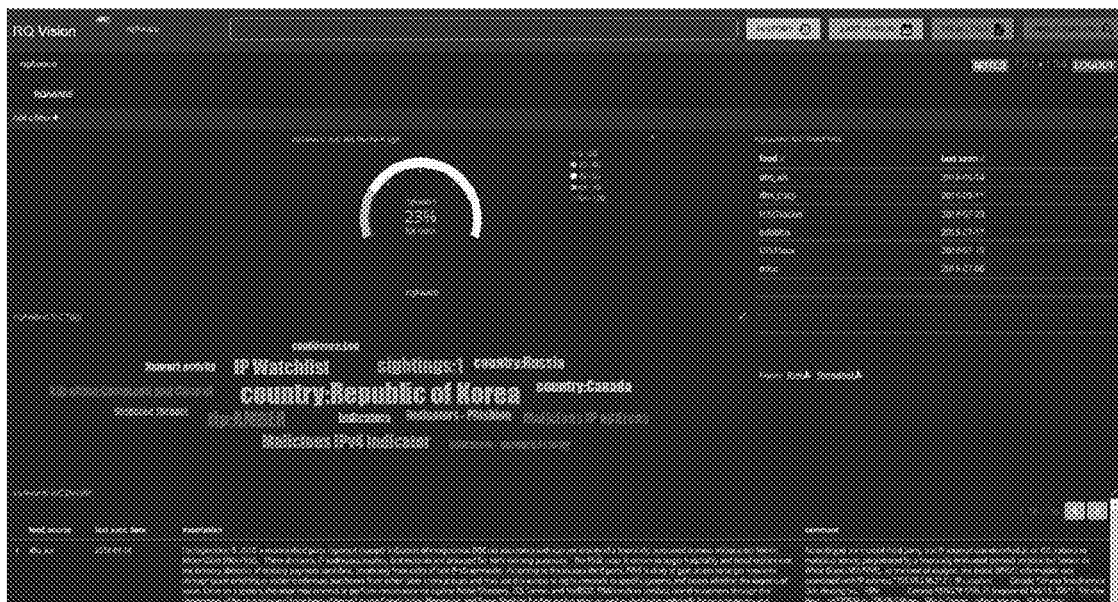
352
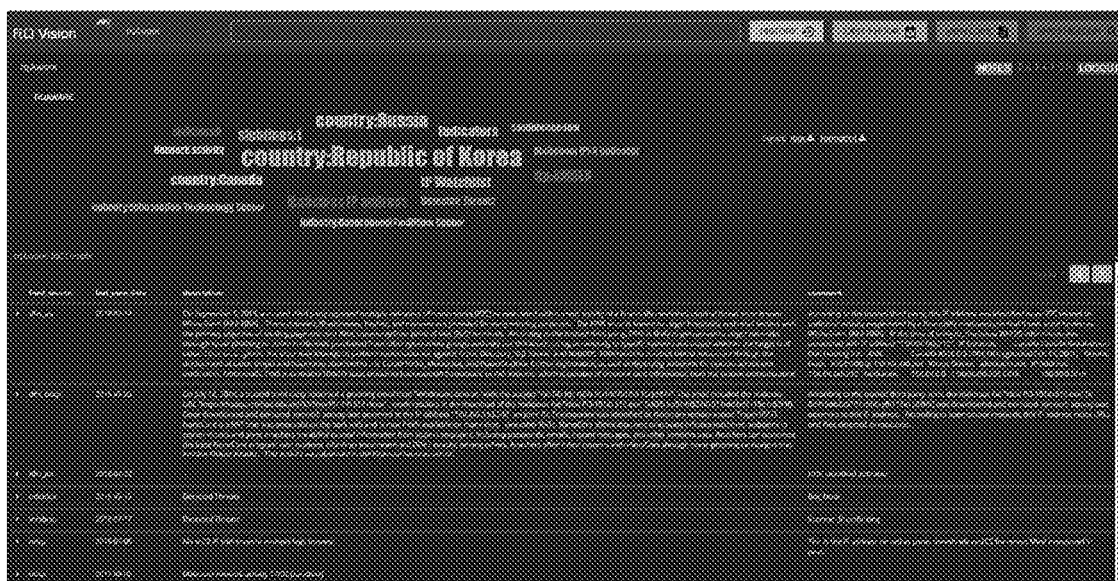
FIG. 16

(1796) Risk of Log Source Coverage Gaps — 1800

| Priority | Function | Probability of True Positive | Coverage |
|---|---|---|---|
| 1 | Windows OS | 8% | 21% |
| 2 | Proxy | 4% | 25% |
| 3 | Linux/Unix OS | 8% | 50% |
| 4 | Scripting | 5% | 0% |
| 5 | IAM | 18% | 0% |

(1798) Recommended Rules to Increase Likelihood of Detecting Threat — 1802

| Priority | Severity | Rule | Probability of True Positive | Performance Score | Kill Chain Phase |
|---|---|---|---|---|---|
| 1 | C | Threat File Hash Detected | 50% | 74 | 3 - Post-Exploit |
| 2 | | Unauthorized P2P Application | 40% | 68 | 5 - Actions on the Objective |
| 3 | M | SharePoint File Shared Outside Organization | 18% | 64 | 4 - Persistence |
| 4 | C | Multiple AWS Production Instance Terminations | 14% | 61 | 5 - Actions on the Objective |
| 5 | M | Hidden File Transfer | 2% | 60 | 5 - Actions on the Objective |

FIG. 37

THREAT MITIGATION SYSTEM AND METHOD

RELATED APPLICATION(S)

This application claims the benefit of U.S. Provisional Application No. 62/897,703, filed on 9 Sep. 2019, their entire contents of which are herein incorporated by reference.

TECHNICAL FIELD

This disclosure relates to threat mitigation systems and, more particularly, to threat mitigation systems that utilize Artificial Intelligence (AI) and Machine Learning (ML).

BACKGROUND

In the computer world, there is a constant battle occurring between bad actors that want to attack computing platforms and good actors who try to prevent the same. Unfortunately, the complexity of such computer attacks in constantly increasing, so technology needs to be employed that understands the complexity of these attacks and is capable of addressing the same. Additionally, the use of Artificial Intelligence (AI) and Machine Learning (ML) has revolutionized the manner in which large quantities of content may be processed so that information may be extracted that is not readily discernible to a human user. Accordingly and though the use of AI/ML, the good actors may gain the upper hand in this never ending battle.

SUMMARY OF DISCLOSURE

Concept 4:

In one implementation, a computer-implemented method is executed on a computing device and includes: detecting one or more security events within a computing platform of a client; notifying the client of the one or more security events within the computing platform; determining if the client responded to the one or more security events within the computing platform; and providing a response report to the client that quantifies client response performance based, at least in part, upon if the client responded to the one or more security events within the computing platform.

One or more of the following features may be included. The response report may define a client response rate with respect to if the client responded to the one or more security events within the computing platform. The response report may compare the client response rate to the response rate of third-parties. The third-parties may include one or more of: other clients regardless of industry; and other clients in the same industry as the client. The response report may define time-based response performance over a defined period of time. The time-based response performance may include time-based response performance for the client. The time-based response performance may include time-based response performance for third-parties. The third-parties may include one or more of: other clients regardless of industry; and other clients in the same industry as the client.

In another implementation, a computer program product resides on a computer readable medium and has a plurality of instructions stored on it. When executed by a processor, the instructions cause the processor to perform operations including: detecting one or more security events within a computing platform of a client; notifying the client of the one or more security events within the computing platform; determining if the client responded to the one or more security events within the computing platform; and providing a response report to the client that quantifies client response performance based, at least in part, upon if the client responded to the one or more security events within the computing platform.

One or more of the following features may be included. The response report may define a client response rate with respect to if the client responded to the one or more security events within the computing platform. The response report may compare the client response rate to the response rate of third-parties. The third-parties may include one or more of: other clients regardless of industry; and other clients in the same industry as the client. The response report may define time-based response performance over a defined period of time. The time-based response performance may include time-based response performance for the client. The time-based response performance may include time-based response performance for third-parties. The third-parties may include one or more of: other clients regardless of industry; and other clients in the same industry as the client.

In another implementation, a computing system includes a processor and memory is configured to perform operations including: detecting one or more security events within a computing platform of a client; notifying the client of the one or more security events within the computing platform; determining if the client responded to the one or more security events within the computing platform; and providing a response report to the client that quantifies client response performance based, at least in part, upon if the client responded to the one or more security events within the computing platform.

One or more of the following features may be included. The response report may define a client response rate with respect to if the client responded to the one or more security events within the computing platform. The response report may compare the client response rate to the response rate of third-parties. The third-parties may include one or more of: other clients regardless of industry; and other clients in the same industry as the client. The response report may define time-based response performance over a defined period of time. The time-based response performance may include time-based response performance for the client. The time-based response performance may include time-based response performance for third-parties. The third-parties may include one or more of: other clients regardless of industry; and other clients in the same industry as the client.

The details of one or more implementations are set forth in the accompanying drawings and the description below. Other features and advantages will become apparent from the description, the drawings, and the claims.

BRIEF DESCRIPTION OF THE DRAWINGS

FIGS. 5-6 are diagrammatic views of screens rendered by the threat mitigation process of FIG. 1 according to an embodiment of the present disclosure;

FIG. 12 is a diagrammatic view of a screen rendered by the threat mitigation process of FIG. 1 according to an embodiment of the present disclosure;

FIG. 16 is a diagrammatic view of screens rendered by the threat mitigation process of FIG. 1 according to an embodiment of the present disclosure;

FIG. 37 is a diagrammatic view of a screen rendered by the threat mitigation process of FIG. 1 according to an embodiment of the present disclosure;

Like reference symbols in the various drawings indicate like elements.

DETAILED DESCRIPTION OF THE PREFERRED EMBODIMENTS

System Overview

Figure 1:
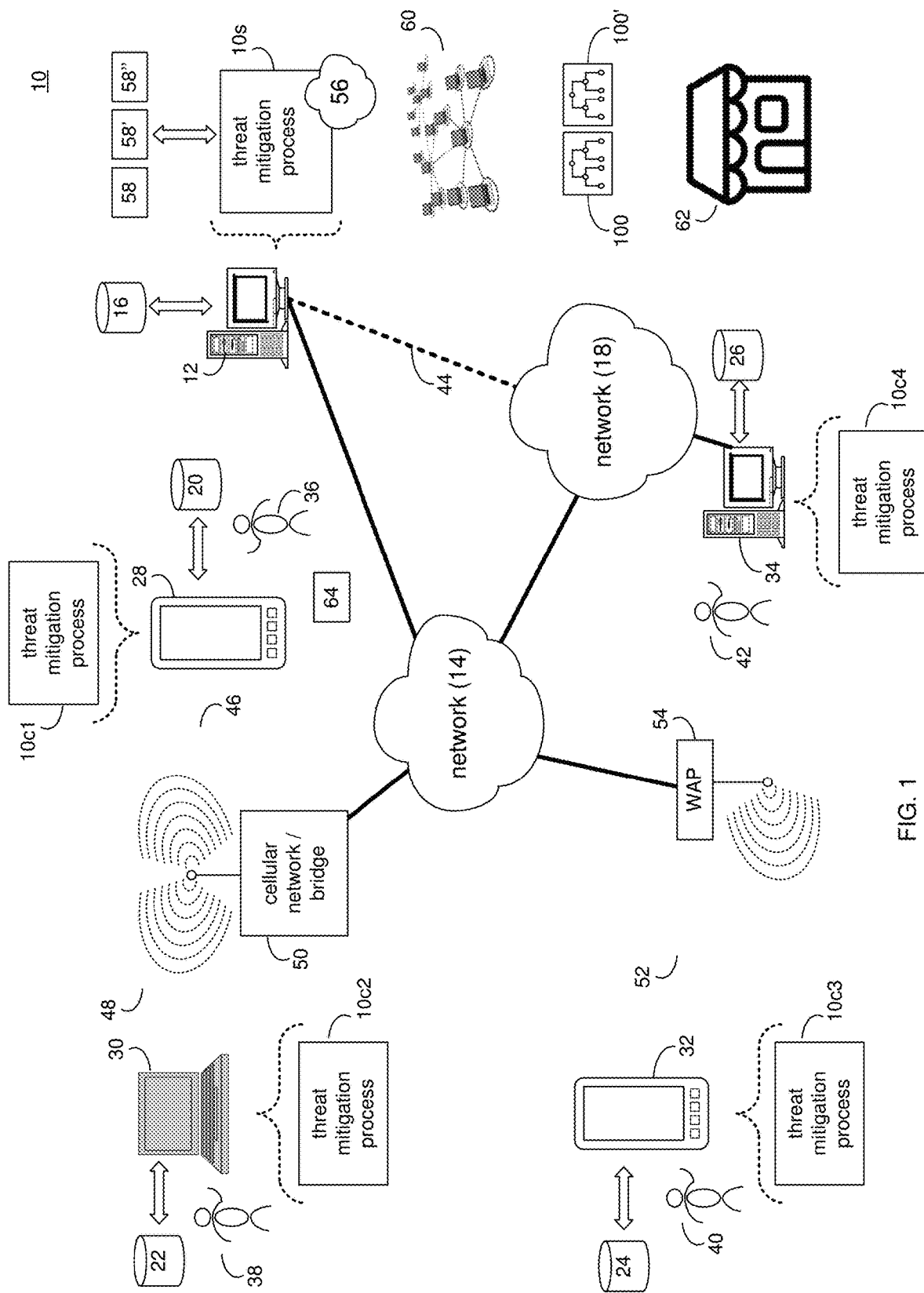
FIG. 1 is a diagrammatic view of a distributed computing network including a computing device that executes a threat mitigation process according to an embodiment of the present disclosure.

Referring to FIG. 1, there is shown threat mitigation process 10. Threat mitigation process 10 may be implemented as a server-side process, a client-side process, or a hybrid server-side/client-side process. For example, threat mitigation process 10 may be implemented as a purely server-side process via threat mitigation process 10s. Alternatively, threat mitigation process 10 may be implemented as a purely client-side process via one or more of threat mitigation process 10c1, threat mitigation process 10c2, threat mitigation process 10c3, and threat mitigation process 10c4. Alternatively still, threat mitigation process 10 may be implemented as a hybrid server-side/client-side process via threat mitigation process 10s in combination with one or more of threat mitigation process 10c1, threat mitigation process 10c2, threat mitigation process 10c3, and threat mitigation process 10c4. Accordingly, threat mitigation process 10 as used in this disclosure may include any combination of threat mitigation process 10s, threat mitigation process 10c1, threat mitigation process 10c2, threat mitigation process, and threat mitigation process 10c4.

Threat mitigation process 10s may be a server application and may reside on and may be executed by computing device 12, which may be connected to network 14 (e.g., the Internet or a local area network). Examples of computing device 12 may include, but are not limited to: a personal computer, a laptop computer, a personal digital assistant, a data-enabled cellular telephone, a notebook computer, a television with one or more processors embedded therein or coupled thereto, a cable/satellite receiver with one or more processors embedded therein or coupled thereto, a server computer, a series of server computers, a mini computer, a mainframe computer, or a cloud-based computing network.

The instruction sets and subroutines of threat mitigation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of threat mitigation processes 10c1, 10c2, 10c3, 10c4 may include but are not limited to a client application, a web browser, a game console user interface, or a specialized application (e.g., an application running on e.g., the Android™ platform or the iOS platform). The instruction sets and subroutines of threat mitigation processes 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage device 16 may include but are not limited to: a hard disk drive; a RAID device; a random access memory (RAM); a read-only memory (ROM); and all forms of flash memory storage devices.

Examples of client electronic devices 28, 30, 32, 34 may include, but are not limited to, data-enabled, cellular telephone 28, laptop computer 30, personal digital assistant 32, personal computer 34, a notebook computer (not shown), a server computer (not shown), a gaming console (not shown), a smart television (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access threat mitigation process 10 directly through network 14 or through secondary network 18. Further, threat mitigation process 10 may be connected to network 14 through secondary network 18, as illustrated with link line 44.

The various client electronic devices (e.g., client electronic devices 28, 30, 32, 34) may be directly or indirectly coupled to network 14 (or network 18). For example, data-enabled, cellular telephone 28 and laptop computer 30 are shown wirelessly coupled to network 14 via wireless communication channels 46, 48 (respectively) established between data-enabled, cellular telephone 28, laptop computer 30 (respectively) and cellular network/bridge 50, which is shown directly coupled to network 14. Further, personal digital assistant 32 is shown wirelessly coupled to network 14 via wireless communication channel 52 established between personal digital assistant 32 and wireless access point (i.e., WAP) 54, which is shown directly coupled to network 14. Additionally, personal computer 34 is shown directly coupled to network 18 via a hardwired network connection.

WAP 54 may be, for example, an IEEE 802.11a, 802.11b, 802.11g, 802.11n, Wi-Fi, and/or Bluetooth device that is capable of establishing wireless communication channel 52 between personal digital assistant 32 and WAP 54. As is known in the art, IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Artificial Intelligence/Machines Learning Overview:

Assume for illustrative purposes that threat mitigation process 10 includes probabilistic process 56 (e.g., an artificial intelligence/machine learning process) that is configured to process information (e.g., information 58). As will be discussed below in greater detail, examples of information 58 may include but are not limited to platform information (e.g., structured or unstructured content) being scanned to detect security events (e.g., access auditing; anomalies; authentication; denial of services; exploitation; malware; phishing; spamming; reconnaissance; and/or web attack) within a monitored computing platform (e.g., computing platform 60).

As is known in the art, structured content may be content that is separated into independent portions (e.g., fields, columns, features) and, therefore, may have a pre-defined data model and/or is organized in a pre-defined manner. For example, if the structured content concerns an employee list: a first field, column or feature may define the first name of the employee; a second field, column or feature may define the last name of the employee; a third field, column or feature may define the home address of the employee; and a fourth field, column or feature may define the hire date of the employee.

Further and as is known in the art, unstructured content may be content that is not separated into independent portions (e.g., fields, columns, features) and, therefore, may not have a pre-defined data model and/or is not organized in a pre-defined manner. For example, if the unstructured content concerns the same employee list: the first name of the employee, the last name of the employee, the home address of the employee, and the hire date of the employee may all be combined into one field, column or feature.

For the following illustrative example, assume that information 58 is unstructured content, an example of which may include but is not limited to unstructured user feedback received by a company (e.g., text-based feedback such as text-messages, social media posts, and email messages; and transcribed voice-based feedback such as transcribed voice mail, and transcribed voice messages).

When processing information 58, probabilistic process 56 may use probabilistic modeling to accomplish such processing, wherein examples of such probabilistic modeling may include but are not limited to discriminative modeling, generative modeling, or combinations thereof.

As is known in the art, probabilistic modeling may be used within modern artificial intelligence systems (e.g., probabilistic process 56), in that these probabilistic models may provide artificial intelligence systems with the tools required to autonomously analyze vast quantities of data (e.g., information 58).

Examples of the tasks for which probabilistic modeling may be utilized may include but are not limited to:
  predicting media (music, movies, books) that a user may like or enjoy based upon media that the user has liked or enjoyed in the past;
  transcribing words spoken by a user into editable text;
  grouping genes into gene clusters;
  identifying recurring patterns within vast data sets;
  filtering email that is believed to be spam from a user's inbox;
  generating clean (i.e., non-noisy) data from a noisy data set;
  analyzing (voice-based or text-based) customer feedback; and
  diagnosing various medical conditions and diseases.

For each of the above-described applications of probabilistic modeling, an initial probabilistic model may be defined, wherein this initial probabilistic model may be subsequently (e.g., iteratively or continuously) modified and revised, thus allowing the probabilistic models and the artificial intelligence systems (e.g., probabilistic process 56) to "learn" so that future probabilistic models may be more precise and may explain more complex data sets.

Accordingly, probabilistic process 56 may define an initial probabilistic model for accomplishing a defined task (e.g., the analyzing of information 58). For the illustrative example, assume that this defined task is analyzing customer feedback (e.g., information 58) that is received from customers of e.g., store 62 via an automated feedback phone line. For this example, assume that information 58 is initially voice-based content that is processed via e.g., a speech-to-text process that results in unstructured text-based customer feedback (e.g., information 58).

With respect to probabilistic process 56, a probabilistic model may be utilized to go from initial observations about information 58 (e.g., as represented by the initial branches of a probabilistic model) to conclusions about information 58 (e.g., as represented by the leaves of a probabilistic model).

As used in this disclosure, the term "branch" may refer to the existence (or non-existence) of a component (e.g., a sub-model) of (or included within) a model. Examples of such a branch may include but are not limited to: an execution branch of a probabilistic program or other generative model, a part (or parts) of a probabilistic graphical model, and/or a component neural network that may (or may not) have been previously trained.

While the following discussion provides a detailed example of a probabilistic model, this is for illustrative purposes only and is not intended to be a limitation of this disclosure, as other configurations are possible and are considered to be within the scope of this disclosure. For example, the following discussion may concern any type of model (e.g., be it probabilistic or other) and, therefore, the below-described probabilistic model is merely intended to be one illustrative example of a type of model and is not intended to limit this disclosure to probabilistic models.

Additionally, while the following discussion concerns word-based routing of messages through a probabilistic model, this is for illustrative purposes only and is not intended to be a limitation of this disclosure, as other configurations are possible and are considered to be within the scope of this disclosure. Examples of other types of information that may be used to route messages through a probabilistic model may include: the order of the words within a message; and the punctuation interspersed throughout the message.

Figure 2:
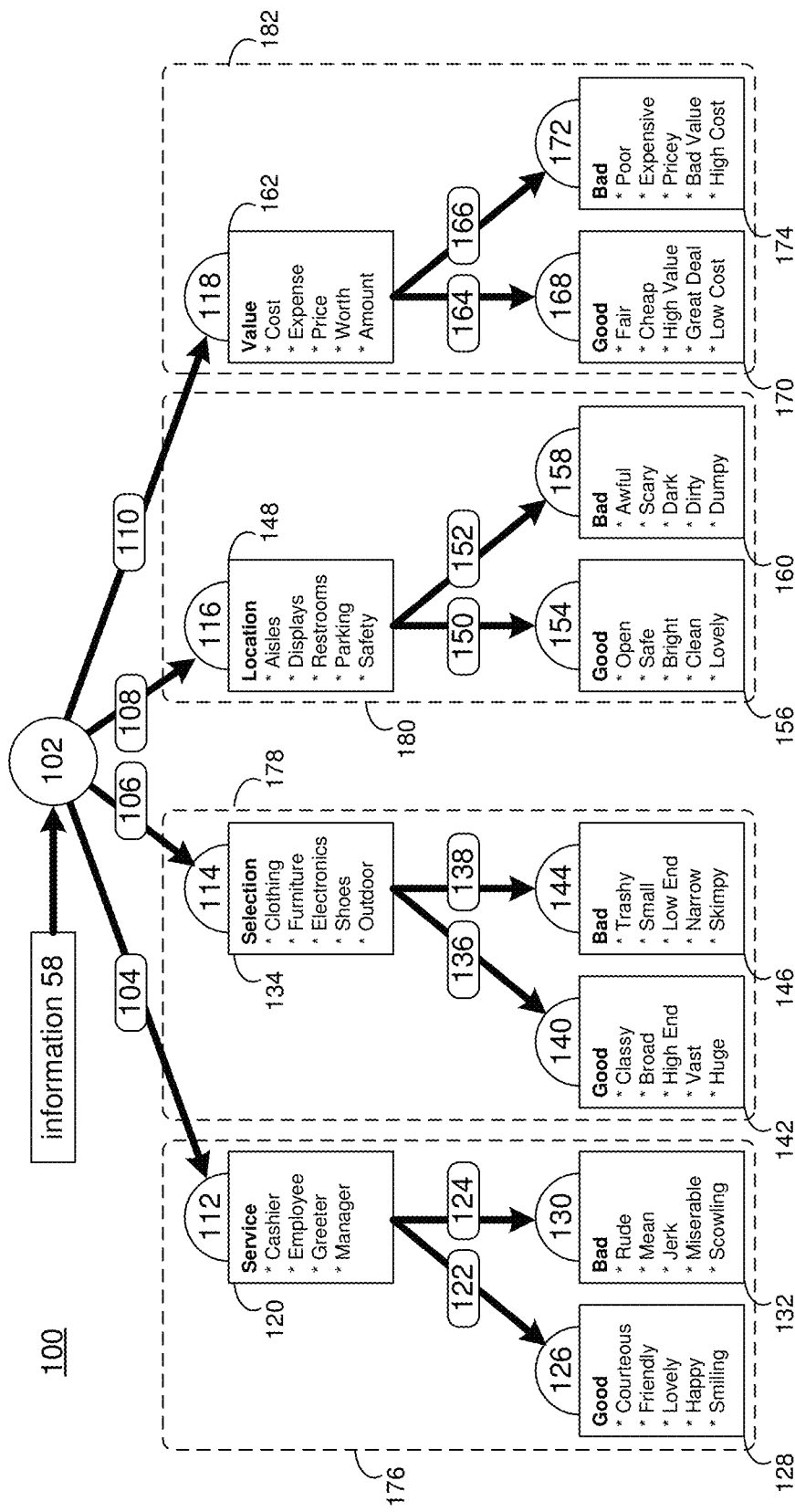
FIG. 2 is a diagrammatic view of an exemplary probabilistic model rendered by a probabilistic process of the threat mitigation process of FIG. 1 according to an embodiment of the present disclosure.

For example and referring also to FIG. 2, there is shown one simplified example of a probabilistic model (e.g., probabilistic model 100) that may be utilized to analyze information 58 (e.g., unstructured text-based customer feedback) concerning store 62. The manner in which probabilistic model 100 may be automatically-generated by probabilistic process 56 will be discussed below in detail. In this particular example, probabilistic model 100 may receive information 58 (e.g., unstructured text-based customer feedback) at branching node 102 for processing. Assume that probabilistic model 100 includes four branches off of branching node 102, namely: service branch 104; selection branch 106; location branch 108; and value branch 110 that respectively lead to service node 112, selection node 114, location node 116, and value node 118.

As stated above, service branch 104 may lead to service node 112, which may be configured to process the portion of information 58 (e.g., unstructured text-based customer feedback) that concerns (in whole or in part) feedback concerning the customer service of store 62. For example, service node 112 may define service word list 120 that may include e.g., the word service, as well as synonyms of (and words related to) the word service (e.g., cashier, employee, greeter and manager). Accordingly and in the event that a portion of information 58 (e.g., a text-based customer feedback message) includes the word cashier, employee, greeter and/or manager, that portion of information 58 may be considered to be text-based customer feedback concerning the service received at store 62 and (therefore) may be routed to service node 112 of probabilistic model 100 for further processing. Assume for this illustrative example that probabilistic model 100 includes two branches off of service node 112, namely: good service branch 122 and bad service branch 124.

Good service branch 122 may lead to good service node 126, which may be configured to process the portion of information 58 (e.g., unstructured text-based customer feedback) that concerns (in whole or in part) good feedback concerning the customer service of store 62. For example, good service node 126 may define good service word list 128 that may include e.g., the word good, as well as synonyms of (and words related to) the word good (e.g., courteous, friendly, lovely, happy, and smiling). Accordingly and in the event that a portion of information 58 (e.g., a text-based customer feedback message) that was routed to service node 112 includes the word good, courteous, friendly, lovely, happy, and/or smiling, that portion of information 58 may be considered to be text-based customer feedback indicative of good service received at store 62 (and, therefore, may be routed to good service node 126).

Bad service branch 124 may lead to bad service node 130, which may be configured to process the portion of information 58 (e.g., unstructured text-based customer feedback) that concerns (in whole or in part) bad feedback concerning the customer service of store 62. For example, bad service node 130 may define bad service word list 132 that may include e.g., the word bad, as well as synonyms of (and words related to) the word bad (e.g., rude, mean, jerk, miserable, and scowling). Accordingly and in the event that a portion of information 58 (e.g., a text-based customer feedback message) that was routed to service node 112 includes the word bad, rude, mean, jerk, miserable, and/or scowling, that portion of information 58 may be considered to be text-based customer feedback indicative of bad service received at store 62 (and, therefore, may be routed to bad service node 130).

As stated above, selection branch 106 may lead to selection node 114, which may be configured to process the portion of information 58 (e.g., unstructured text-based customer feedback) that concerns (in whole or in part) feedback concerning the selection available at store 62. For example, selection node 114 may define selection word list 134 that may include e.g., words indicative of the selection available at store 62. Accordingly and in the event that a portion of information 58 (e.g., a text-based customer feedback message) includes any of the words defined within selection word list 134, that portion of information 58 may be considered to be text-based customer feedback concerning the selection available at store 62 and (therefore) may be routed to selection node 114 of probabilistic model 100 for further processing. Assume for this illustrative example that probabilistic model 100 includes two branches off of selection node 114, namely: good selection branch 136 and bad selection branch 138.

Good selection branch 136 may lead to good selection node 140, which may be configured to process the portion of information 58 (e.g., unstructured text-based customer feedback) that concerns (in whole or in part) good feedback concerning the selection available at store 62. For example, good selection node 140 may define good selection word list 142 that may include words indicative of a good selection at store 62. Accordingly and in the event that a portion of information 58 (e.g., a text-based customer feedback message) that was routed to selection node 114 includes any of the words defined within good selection word list 142, that portion of information 58 may be considered to be text-based customer feedback indicative of a good selection available at store 62 (and, therefore, may be routed to good selection node 140).

Bad selection branch 138 may lead to bad selection node 144, which may be configured to process the portion of information 58 (e.g., unstructured text-based customer feedback) that concerns (in whole or in part) bad feedback concerning the selection available at store 62. For example, bad selection node 144 may define bad selection word list 146 that may include words indicative of a bad selection at store 62. Accordingly and in the event that a portion of information 58 (e.g., a text-based customer feedback message) that was routed to selection node 114 includes any of the words defined within bad selection word list 146, that portion of information 58 may be considered to be text-based customer feedback indicative of a bad selection being available at store 62 (and, therefore, may be routed to bad selection node 144).

As stated above, location branch 108 may lead to location node 116, which may be configured to process the portion of information 58 (e.g., unstructured text-based customer feedback) that concerns (in whole or in part) feedback concerning the location of store 62. For example, location node 116 may define location word list 148 that may include e.g., words indicative of the location of store 62. Accordingly and in the event that a portion of information 58 (e.g., a text-based customer feedback message) includes any of the words defined within location word list 148, that portion of information 58 may be considered to be text-based customer feedback concerning the location of store 62 and (therefore) may be routed to location node 116 of probabilistic model 100 for further processing. Assume for this illustrative example that probabilistic model 100 includes two branches off of location node 116, namely: good location branch 150 and bad location branch 152.

Good location branch 150 may lead to good location node 154, which may be configured to process the portion of information 58 (e.g., unstructured text-based customer feedback) that concerns (in whole or in part) good feedback concerning the location of store 62. For example, good location node 154 may define good location word list 156 that may include words indicative of store 62 being in a good location. Accordingly and in the event that a portion of information 58 (e.g., a text-based customer feedback message) that was routed to location node 116 includes any of the words defined within good location word list 156, that portion of information 58 may be considered to be text-based customer feedback indicative of store 62 being in a good location (and, therefore, may be routed to good location node 154).

Bad location branch 152 may lead to bad location node 158, which may be configured to process the portion of information 58 (e.g., unstructured text-based customer feedback) that concerns (in whole or in part) bad feedback concerning the location of store 62. For example, bad location node 158 may define bad location word list 160 that may include words indicative of store 62 being in a bad location. Accordingly and in the event that a portion of information 58 (e.g., a text-based customer feedback message) that was routed to location node 116 includes any of the words defined within bad location word list 160, that portion of information 58 may be considered to be text-based customer feedback indicative of store 62 being in a bad location (and, therefore, may be routed to bad location node 158).

As stated above, value branch 110 may lead to value node 118, which may be configured to process the portion of information 58 (e.g., unstructured text-based customer feedback) that concerns (in whole or in part) feedback concerning the value received at store 62. For example, value node 118 may define value word list 162 that may include e.g., words indicative of the value received at store 62. Accordingly and in the event that a portion of information 58 (e.g., a text-based customer feedback message) includes any of the words defined within value word list 162, that portion of information 58 may be considered to be text-based customer feedback concerning the value received at store 62 and (therefore) may be routed to value node 118 of probabilistic model 100 for further processing. Assume for this illustrative example that probabilistic model 100 includes two branches off of value node 118, namely: good value branch 164 and bad value branch 166.

Good value branch 164 may lead to good value node 168, which may be configured to process the portion of information 58 (e.g., unstructured text-based customer feedback) that concerns (in whole or in part) good value being received at store 62. For example, good value node 168 may define good value word list 170 that may include words indicative of receiving good value at store 62. Accordingly and in the event that a portion of information 58 (e.g., a text-based customer feedback message) that was routed to value node 118 includes any of the words defined within good value word list 170, that portion of information 58 may be considered to be text-based customer feedback indicative of good value being received at store 62 (and, therefore, may be routed to good value node 168).

Bad value branch 166 may lead to bad value node 172, which may be configured to process the portion of information 58 (e.g., unstructured text-based customer feedback) that concerns (in whole or in part) bad value being received at store 62. For example, bad value node 172 may define bad value word list 174 that may include words indicative of receiving bad value at store 62. Accordingly and in the event that a portion of information 58 (e.g., a text-based customer feedback message) that was routed to value node 118 includes any of the words defined within bad value word list 174, that portion of information 58 may be considered to be text-based customer feedback indicative of bad value being received at store 62 (and, therefore, may be routed to bad value node 172).

Once it is established that good or bad customer feedback was received concerning store 62 (i.e., with respect to the service, the selection, the location or the value), representatives and/or agents of store 62 may address the provider of such good or bad feedback via e.g., social media postings, text-messages and/or personal contact.

Assume for illustrative purposes that user 36 uses data-enabled, cellular telephone 28 to provide feedback 64 (e.g., a portion of information 58) to an automated feedback phone line concerning store 62. Upon receiving feedback 64 for analysis, probabilistic process 56 may identify any pertinent content that is included within feedback 64.

For illustrative purposes, assume that user 36 was not happy with their experience at store 62 and that feedback 64 provided by user 36 was "my cashier was rude and the weather was rainy". Accordingly and for this example, probabilistic process 56 may identify the pertinent content (included within feedback 64) as the phrase "my cashier was rude" and may ignore/remove the irrelevant content "the weather was rainy". As (in this example) feedback 64 includes the word "cashier", probabilistic process 56 may route feedback 64 to service node 112 via service branch 104. Further, as feedback 64 also includes the word "rude", probabilistic process 56 may route feedback 64 to bad service node 130 via bad service branch 124 and may consider feedback 64 to be text-based customer feedback indicative of bad service being received at store 62.

For further illustrative purposes, assume that user 36 was happy with their experience at store 62 and that feedback 64 provided by user 36 was "the clothing I purchased was classy but my cab got stuck in traffic". Accordingly and for this example, probabilistic process 56 may identify the pertinent content (included within feedback 64) as the phrase "the clothing I purchased was classy" and may ignore/remove the irrelevant content "my cab got stuck in traffic". As (in this example) feedback 64 includes the word "clothing", probabilistic process 56 may route feedback 64 to selection node 114 via selection branch 106. Further, as feedback 64 also includes the word "classy", probabilistic process 56 may route feedback 64 to good selection node 140 via good selection branch 136 and may consider feedback 64 to be text-based customer feedback indicative of a good selection being available at store 62.

Model Generation Overview:

While the following discussion concerns the automated generation of a probabilistic model, this is for illustrative purposes only and is not intended to be a limitation of this disclosure, as other configurations are possible and are considered to be within the scope of this disclosure. For example, the following discussion of automated generation may be utilized on any type of model. For example, the following discussion may be applicable to any other form of probabilistic model or any form of generic model (such as Dempster Shaffer theory or fuzzy logic).

As discussed above, probabilistic model 100 may be utilized to categorize information 58, thus allowing the various messages included within information 58 to be routed to (in this simplified example) one of eight nodes (e.g., good service node 126, bad service node 130, good selection node 140, bad selection node 144, good location node 154, bad location node 158, good value node 168, and bad value node 172). For the following example, assume that store 62 is a long-standing and well established shopping establishment. Further, assume that information 58 is a very large quantity of voice mail messages (>10,000 messages) that were left by customers of store 62 on a voice-based customer feedback line. Additionally, assume that this very large quantity of voice mail messages (>10,000) have been transcribed into a very large quantity of text-based messages (>10,000).

Probabilistic process 56 may be configured to automatically define probabilistic model 100 based upon information 58. Accordingly, probabilistic process 56 may receive content (e.g., a very large quantity of text-based messages) and may be configured to define one or more probabilistic model variables for probabilistic model 100. For example, probabilistic process 56 may be configured to allow a user to specify such probabilistic model variables. Another example of such variables may include but is not limited to values and/or ranges of values for a data flow variable. For the following discussion and for this disclosure, examples of a "variable" may include but are not limited to variables, parameters, ranges, branches and nodes.

Specifically and for this example, assume that probabilistic process 56 defines the initial number of branches (i.e., the number of branches off of branching node 102) within probabilistic model 100 as four (i.e., service branch 104, selection branch 106, location branch 108 and value branch 110). The defining of the initial number of branches (i.e., the number of branches off of branching node 102) within probabilistic model 100 as four may be effectuated in various ways (e.g., manually or algorithmically). Further and when defining probabilistic model 100 based, at least in part, upon information 58 and the one or more model variables (i.e., defining the number of branches off of branching node 102 as four), probabilistic process 56 may process information 58 to identify the pertinent content included within information 58. As discussed above, probabilistic process 56 may identify the pertinent content (included within information 58) and may ignore/remove the irrelevant content.

This type of processing of information 58 may continue for all of the very large quantity of text-based messages (>10,000) included within information 58. And using the probabilistic modeling technique described above, probabilistic process 56 may define a first version of the probabilistic model (e.g., probabilistic model 100) based, at least in part, upon pertinent content found within information 58. Accordingly, a first text-based message included within information 58 may be processed to extract pertinent information from that first message, wherein this pertinent information may be grouped in a manner to correspond (at least temporarily) with the requirement that four branches originate from branching node 102 (as defined above).

As probabilistic process 56 continues to process information 58 to identify pertinent content included within information 58, probabilistic process 56 may identify patterns within these text-based message included within information 58. For example, the messages may all concern one or more of the service, the selection, the location and/or the value of store 62. Further and e.g., using the probabilistic modeling technique described above, probabilistic process 56 may process information 58 to e.g.: a) sort text-based messages concerning the service into positive or negative service messages; b) sort text-based messages concerning the selection into positive or negative selection messages; c) sort text-based messages concerning the location into positive or negative location messages; and/or d) sort text-based messages concerning the value into positive or negative service messages. For example, probabilistic process 56 may define various lists (e.g., lists 128, 132, 142, 146, 156, 160, 170, 174) by starting with a root word (e.g., good or bad) and may then determine synonyms for these words and use those words and synonyms to populate lists 128, 132, 142, 146, 156, 160, 170, 174.

Continuing with the above-stated example, once information 58 (or a portion thereof) is processed by probabilistic process 56, probabilistic process 56 may define a first version of the probabilistic model (e.g., probabilistic model 100) based, at least in part, upon pertinent content found within information 58. Probabilistic process 56 may compare the first version of the probabilistic model (e.g., probabilistic model 100) to information 58 to determine if the first version of the probabilistic model (e.g., probabilistic model 100) is a good explanation of the content.

When determining if the first version of the probabilistic model (e.g., probabilistic model 100) is a good explanation of the content, probabilistic process 56 may use an ML algorithm to fit the first version of the probabilistic model (e.g., probabilistic model 100) to the content, wherein examples of such an ML algorithm may include but are not limited to one or more of: an inferencing algorithm, a learning algorithm, an optimization algorithm, and a statistical algorithm.

For example and as is known in the art, probabilistic model 100 may be used to generate messages (in addition to analyzing them). For example and when defining a first version of the probabilistic model (e.g., probabilistic model 100) based, at least in part, upon pertinent content found within information 58, probabilistic process 56 may define a weight for each branch within probabilistic model 100 based upon information 58. For example, threat mitigation process 10 may equally weight each of branches 104, 106, 108, 110 at 25%. Alternatively, if e.g., a larger percentage of information 58 concerned the service received at store 62, threat mitigation process 10 may equally weight each of branches 106, 108, 110 at 20%, while more heavily weighting branch 104 at 40%.

Accordingly and when probabilistic process 56 compares the first version of the probabilistic model (e.g., probabilistic model 100) to information 58 to determine if the first version of the probabilistic model (e.g., probabilistic model 100) is a good explanation of the content, probabilistic process 56 may generate a very large quantity of messages e.g., by auto-generating messages using the above-described probabilities, the above-described nodes & node types, and the words defined in the above-described lists (e.g., lists 128, 132, 142, 146, 156, 160, 170, 174), thus resulting in generated information 58'. Generated information 58' may then be compared to information 58 to determine if the first version of the probabilistic model (e.g., probabilistic model 100) is a good explanation of the content. For example, if generated information 58' exceeds a threshold level of similarity to information 58, the first version of the probabilistic model (e.g., probabilistic model 100) may be deemed a good explanation of the content. Conversely, if generated information 58' does not exceed a threshold level of similarity to information 58, the first version of the probabilistic model (e.g., probabilistic model 100) may be deemed not a good explanation of the content.

If the first version of the probabilistic model (e.g., probabilistic model 100) is not a good explanation of the content, probabilistic process 56 may define a revised version of the probabilistic model (e.g., revised probabilistic model 100'). When defining revised probabilistic model 100', probabilistic process 56 may e.g., adjust weighting, adjust probabilities, adjust node counts, adjust node types, and/or adjust branch counts to define the revised version of the probabilistic model (e.g., revised probabilistic model 100'). Once defined, the above-described process of auto-generating messages (this time using revised probabilistic model 100') may be repeated and this newly-generated content (e.g., generated information 58") may be compared to information 58 to determine if e.g., revised probabilistic model 100' is a good explanation of the content. If revised probabilistic model 100' is not a good explanation of the content, the above-described process may be repeated until a proper probabilistic model is defined.

The Threat Mitigation Process

As discussed above, threat mitigation process 10 may include probabilistic process 56 (e.g., an artificial intelligence/machine learning process) that may be configured to process information (e.g., information 58), wherein examples of information 58 may include but are not limited to platform information (e.g., structured or unstructured content) that may be scanned to detect security events (e.g., access auditing; anomalies; authentication; denial of services; exploitation; malware; phishing; spamming; reconnaissance; and/or web attack) within a monitored computing platform (e.g., computing platform 60).

Figure 3:
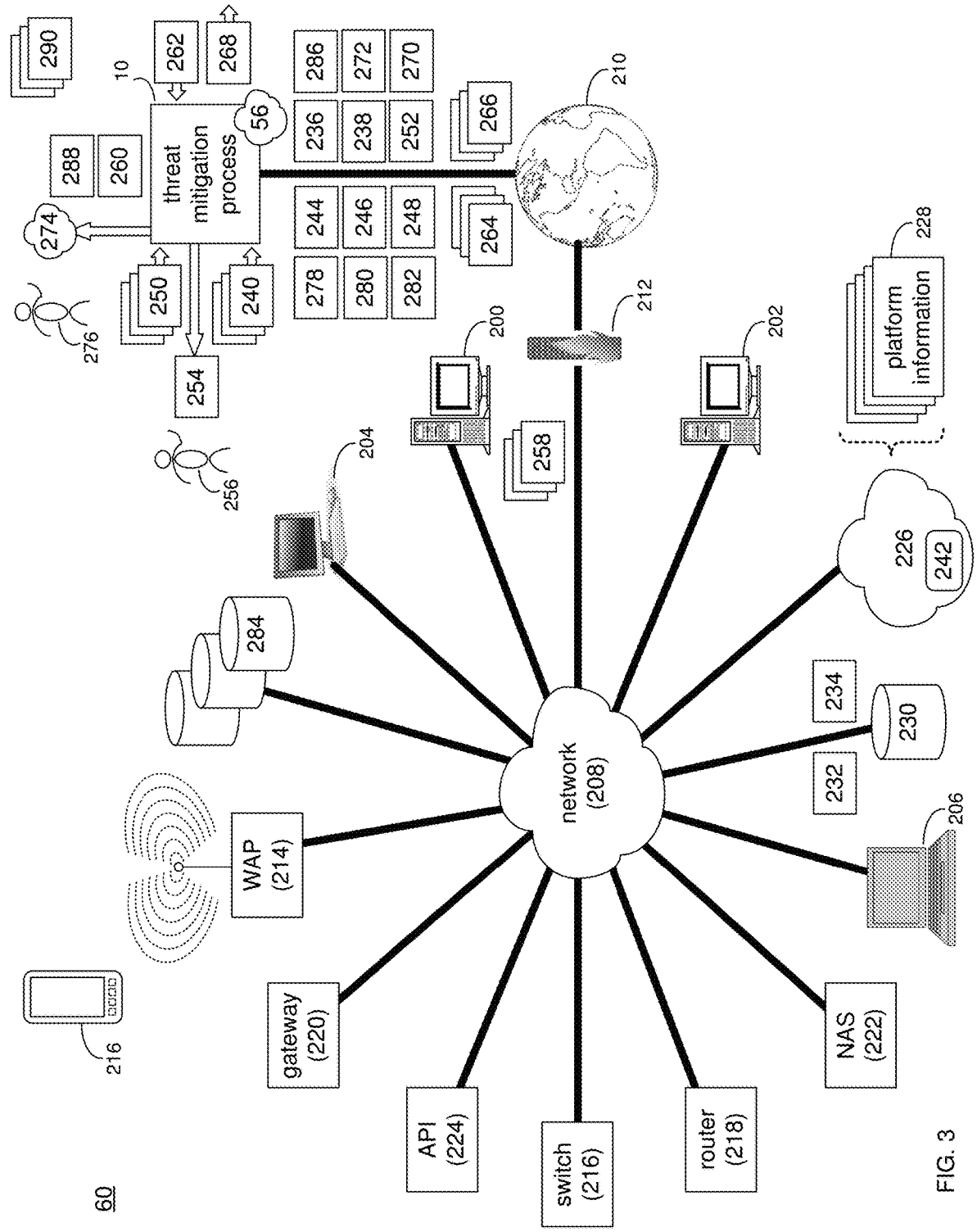
FIG. 3 is a diagrammatic view of the computing platform of FIG. 1 according to an embodiment of the present disclosure.

Referring also to FIG. 3, the monitored computing platform (e.g., computing platform 60) utilized by business today may be a highly complex, multi-location computing system/network that may span multiple buildings/locations/countries. For this illustrative example, the monitored computing platform (e.g., computing platform 60) is shown to include many discrete computing devices, examples of which may include but are not limited to: server computers (e.g., server computers 200, 202), desktop computers (e.g., desktop computer 204), and laptop computers (e.g., laptop computer 206), all of which may be coupled together via a network (e.g., network 208), such as an Ethernet network. Computing platform 60 may be coupled to an external network (e.g., Internet 210) through WAF (i.e., Web Application Firewall) 212. A wireless access point (e.g., WAP 214) may be configured to allow wireless devices (e.g., smartphone 216) to access computing platform 60. Computing platform 60 may include various connectivity devices that enable the coupling of devices within computing platform 60, examples of which may include but are not limited to: switch 216, router 218 and gateway 220. Computing platform 60 may also include various storage devices (e.g., NAS 222), as well as functionality (e.g., API Gateway 224) that allows software applications to gain access to one or more resources within computing platform 60.

In addition to the devices and functionality discussed above, other technology (e.g., security-relevant subsystems 226) may be deployed within computing platform 60 to monitor the operation of (and the activity within) computing platform 60. Examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform.

Each of security-relevant subsystems 226 may monitor and log their activity with respect to computing platform 60, resulting in the generation of platform information 228. For example, platform information 228 associated with a client-defined MDM (i.e., Mobile Device Management) system may monitor and log the mobile devices that were allowed access to computing platform 60.

Further, SEIM (i.e., Security Information and Event Management) system 230 may be deployed within computing platform 60. As is known in the art, SIEM system 230 is an approach to security management that combines SIM (security information management) functionality and SEM (security event management) functionality into one security management system. The underlying principles of a STEM system is to aggregate relevant data from multiple sources, identify deviations from the norm and take appropriate action. For example, when a security event is detected, STEM system 230 might log additional information, generate an alert and instruct other security controls to mitigate the security event. Accordingly, STEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Computing Platform Analysis & Reporting

As will be discussed below in greater detail, threat mitigation process 10 may be configured to e.g., analyze computing platform 60 and provide reports to third-parties concerning the same.

Figure 4:
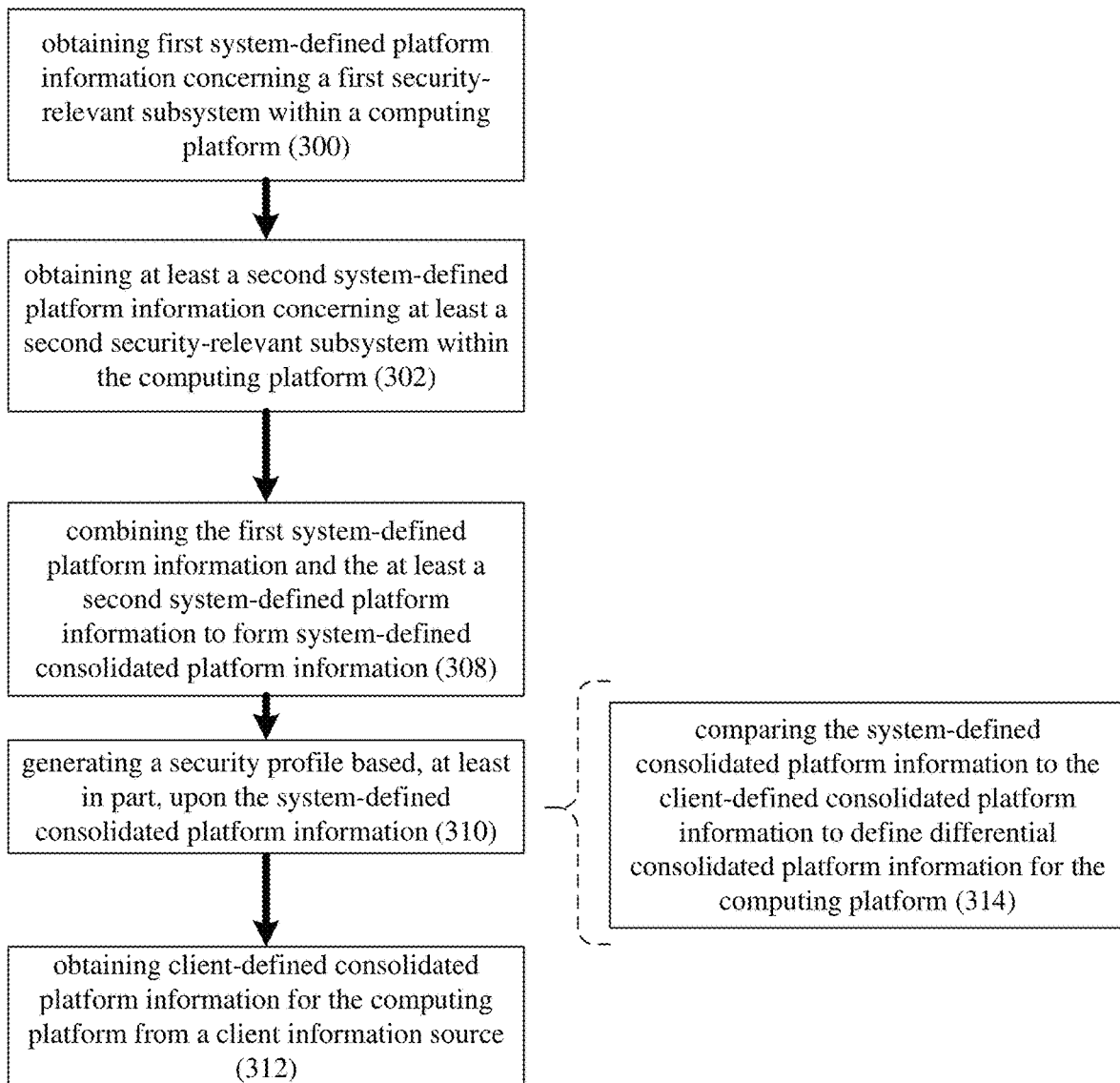
FIG. 4 is a flowchart of an implementation of the threat mitigation process of FIG. 1 according to an embodiment of the present disclosure.
Figure 6:
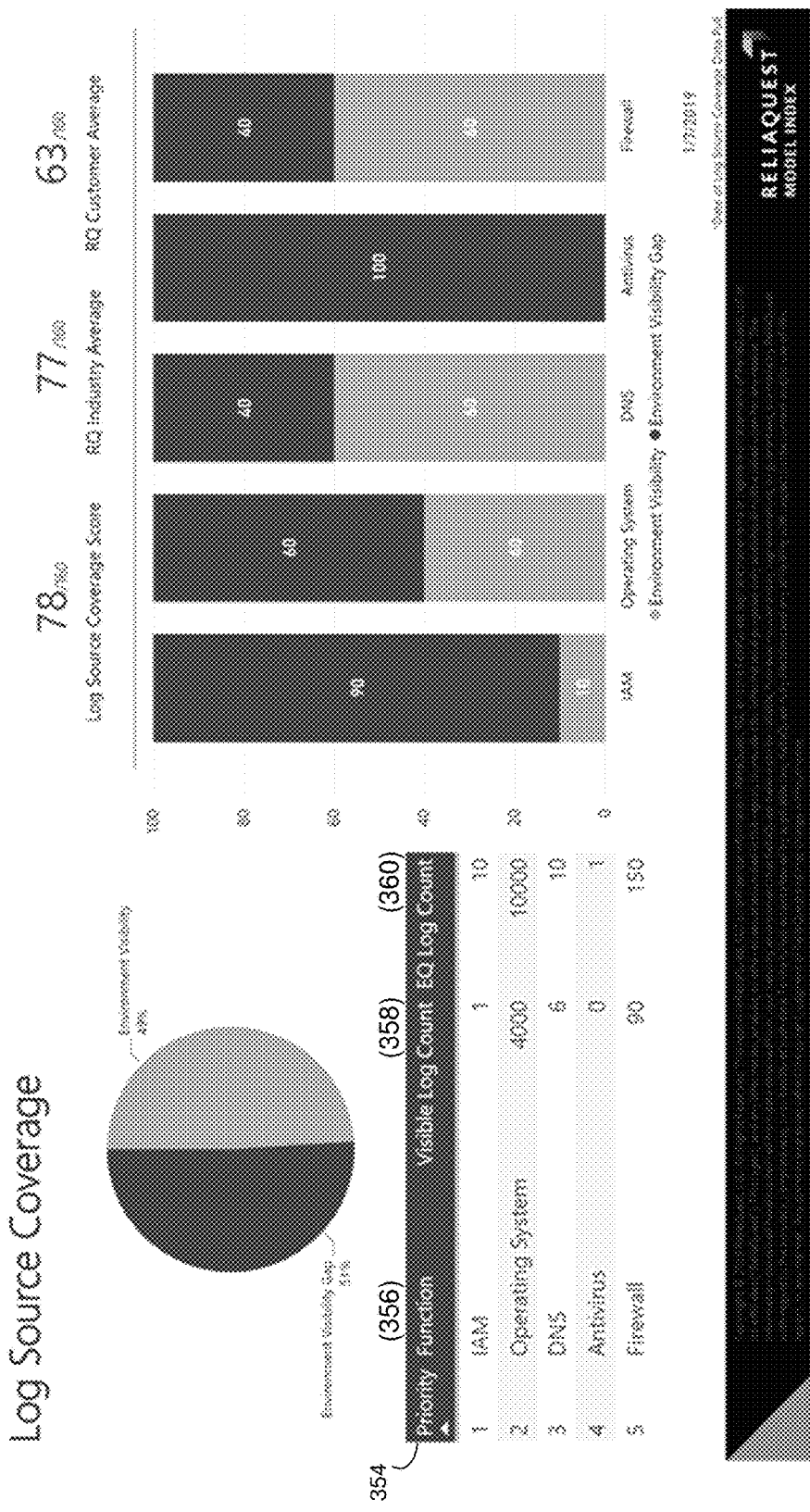

Referring also to FIGS. 4-6, threat mitigation process 10 may be configured to obtain and combine information from multiple security-relevant subsystem to generate a security profile for computing platform 60. For example, threat mitigation process 10 may obtain 300 first system-defined platform information (e.g., system-defined platform information 232) concerning a first security-relevant subsystem (e.g., the number of operating systems deployed) within computing platform 60 and may obtain 302 at least a second system-defined platform information (e.g., system-defined platform information 234) concerning at least a second security-relevant subsystem (e.g., the number of antivirus systems deployed) within computing platform 60.

The first system-defined platform information (e.g., system-defined platform information 232) and the at least a second system-defined platform information (e.g., system-defined platform information 234) may be obtained from one or more log files defined for computing platform 60.

Specifically, system-defined platform information 232 and/or system-defined platform information 234 may be obtained from SIEM system 230, wherein (and as discussed above) STEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

Alternatively, the first system-defined platform information (e.g., system-defined platform information 232) and the at least a second system-defined platform information (e.g., system-defined platform information 234) may be obtained from the first security-relevant subsystem (e.g., the operating systems themselves) and the at least a second security-relevant subsystem (e.g., the antivirus systems themselves). Specifically, system-defined platform information 232 and/or system-defined platform information 234 may be obtained directly from the security-relevant subsystems (e.g., the operating systems and/or the antivirus systems), which (as discussed above) may be configured to self-document their activity.

Threat mitigation process 10 may combine 308 the first system-defined platform information (e.g., system-defined platform information 232) and the at least a second system-defined platform information (e.g., system-defined platform information 234) to form system-defined consolidated platform information 236. Accordingly and in this example, system-defined consolidated platform information 236 may independently define the security-relevant subsystems (e.g., security-relevant subsystems 226) present on computing platform 60.

Threat mitigation process 10 may generate 310 a security profile (e.g., security profile 350) based, at least in part, upon system-defined consolidated platform information 236. Through the use of security profile (e.g., security profile 350), the user/owner/operator of computing platform 60 may be able to see that e.g., they have a security score of 605 out of a possible score of 1,000, wherein the average customer has a security score of 237. While security profile 350 in shown in the example to include several indicators that may enable a user to compare (in this example) computing platform 60 to other computing platforms, this is for illustrative purposes only and is not intended to be a limitation of this disclosure, as it is understood that other configurations are possible and are considered to be within the scope of this disclosure.

Naturally, the format, appearance and content of security profile 350 may be varied greatly depending upon the design criteria and anticipated performance/use of threat mitigation process 10. Accordingly, the appearance, format, completeness and content of security profile 350 is for illustrative purposes only and is not intended to be a limitation of this disclosure, as other configurations are possible and are considered to be within the scope of this disclosure. For example, content may be added to security profile 350, removed from security profile 350, and/or reformatted within security profile 350.

Additionally, threat mitigation process 10 may obtain 312 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality). Accordingly and in this example, client-defined consolidated platform information 238 may define the security-relevant subsystems (e.g., security-relevant subsystems 226) that the client believes are present on computing platform 60.

When generating 310 a security profile (e.g., security profile 350) based, at least in part, upon system-defined consolidated platform information 236, threat mitigation process 10 may compare 314 the system-defined consolidated platform information (e.g., system-defined consolidated platform information 236) to the client-defined consolidated platform information (e.g., client-defined consolidated platform information 238) to define differential consolidated platform information 352 for computing platform 60.

Differential consolidated platform information 352 may include comparison table 354 that e.g., compares computing platform 60 to other computing platforms. For example and in this particular implementation of differential consolidated platform information 352, comparison table 354 is shown to include three columns, namely: security-relevant subsystem column 356 (that identifies the security-relevant subsystems in question); system-defined consolidated platform information column 358 (that is based upon system-defined consolidated platform information 236 and independently defines what security-relevant subsystems are present on computing platform 60); and client-defined consolidated platform column 360 (that is based upon client-defined platform information 238 and defines what security-relevant subsystems the client believes are present on computing platform 60). As shown within comparison table 354, there are considerable differences between that is actually present on computing platform 60 and what is believed to be present on computing platform 60 (e.g., 1 IAM system vs. 10 IAM systems; 4,000 operating systems vs. 10,000 operating systems, 6 DNS systems vs. 10 DNS systems; 0 antivirus systems vs. 1 antivirus system, and 90 firewalls vs. 150 firewalls).

Naturally, the format, appearance and content of differential consolidated platform information 352 may be varied greatly depending upon the design criteria and anticipated performance/use of threat mitigation process 10. Accordingly, the appearance, format, completeness and content of differential consolidated platform information 352 is for illustrative purposes only and is not intended to be a limitation of this disclosure, as other configurations are possible and are considered to be within the scope of this disclosure. For example, content may be added to differential consolidated platform information 352, removed from differential consolidated platform information 352, and/or reformatted within differential consolidated platform information 352.

Figure 7:
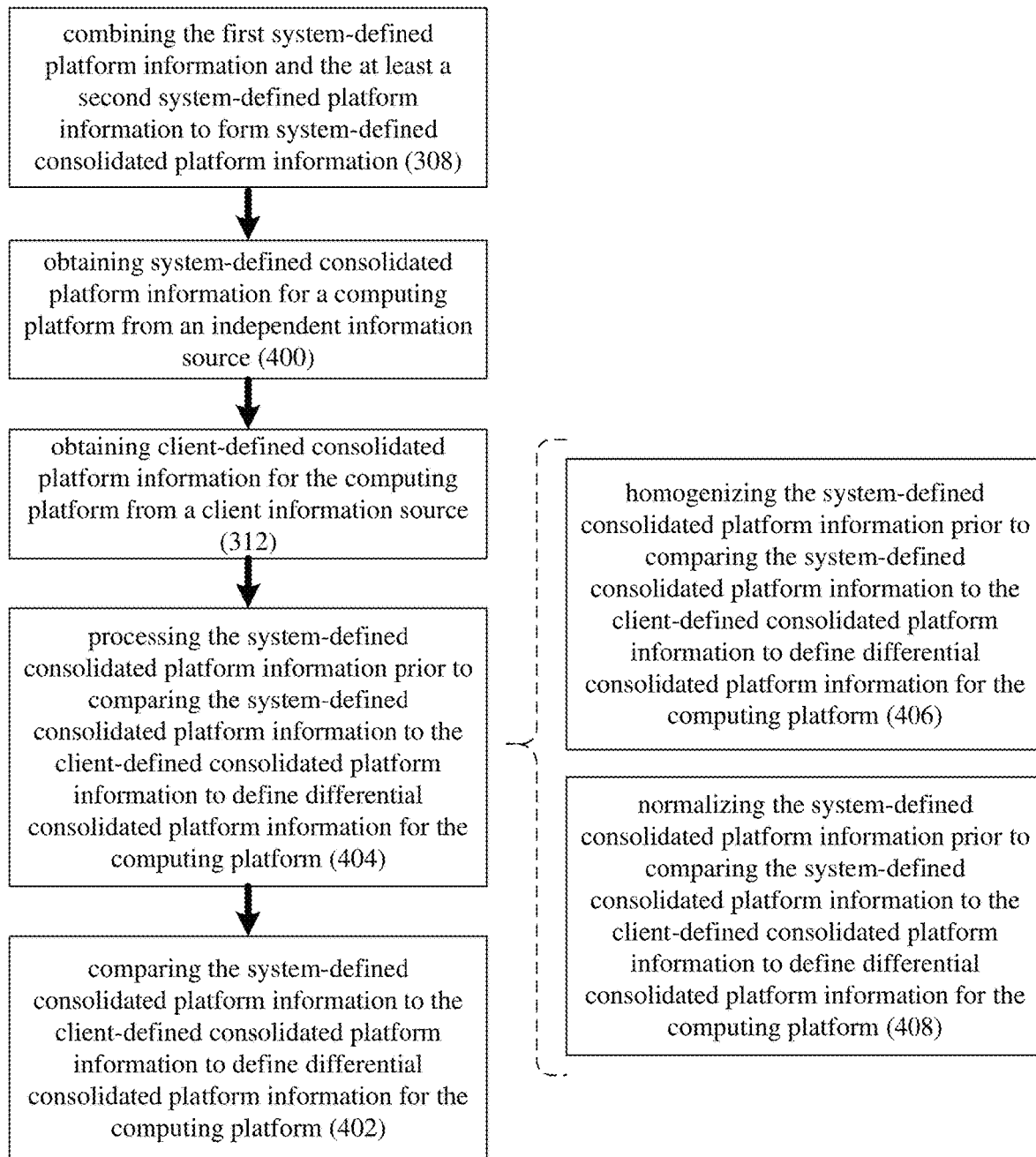
FIGS. 7-9 are flowcharts of other implementations of the threat mitigation process of FIG. 1 according to an embodiment of the present disclosure.

Referring also to FIG. 7, threat mitigation process 10 may be configured to compare what security relevant subsystems are actually included within computing platform 60 versus what security relevant subsystems were believed to be included within computing platform 60. As discussed above, threat mitigation process 10 may combine 308 the first system-defined platform information (e.g., system-defined platform information 232) and the at least a second system-defined platform information (e.g., system-defined platform information 234) to form system-defined consolidated platform information 236.

Threat mitigation process 10 may obtain 400 system-defined consolidated platform information 236 for computing platform 60 from an independent information source, examples of which may include but are not limited to: one or more log files defined for computing platform 60 (e.g., such as those maintained by SIEM system 230); and two or more security-relevant subsystems (e.g., directly from the operating system security-relevant subsystem and the antivirus security-relevant subsystem) deployed within computing platform 60.

Further and as discussed above, threat mitigation process 10 may obtain 312 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality).

Additionally and as discussed above, threat mitigation process 10 may compare 402 system-defined consolidated platform information 236 to client-defined consolidated platform information 238 to define differential consolidated platform information 352 for computing platform 60, wherein differential consolidated platform information 352 may include comparison table 354 that e.g., compares computing platform 60 to other computing platforms.

Threat mitigation process 10 may process 404 system-defined consolidated platform information 236 prior to comparing 402 system-defined consolidated platform information 236 to client-defined consolidated platform information 238 to define differential consolidated platform information 352 for computing platform 60. Specifically, threat mitigation process 10 may process 404 system-defined consolidated platform information 236 so that it is comparable to client-defined consolidated platform information 238.

For example and when processing 404 system-defined consolidated platform information 236, threat mitigation process 10 may homogenize 406 system-defined consolidated platform information 236 prior to comparing 402 system-defined consolidated platform information 236 to client-defined consolidated platform information 238 to define differential consolidated platform information 352 for computing platform 60. Such homogenization 406 may result in system-defined consolidated platform information 236 and client-defined consolidated platform information 238 being comparable to each other (e.g., to accommodate for differing data nomenclatures/headers).

Further and when processing 404 system-defined consolidated platform information 236, threat mitigation process 10 may normalize 408 system-defined consolidated platform information 236 prior to comparing 402 system-defined consolidated platform information 236 to client-defined consolidated platform information 238 to define differential consolidated platform information 352 for computing platform 60 (e.g., to accommodate for data differing scales/ranges).

Figure 8:
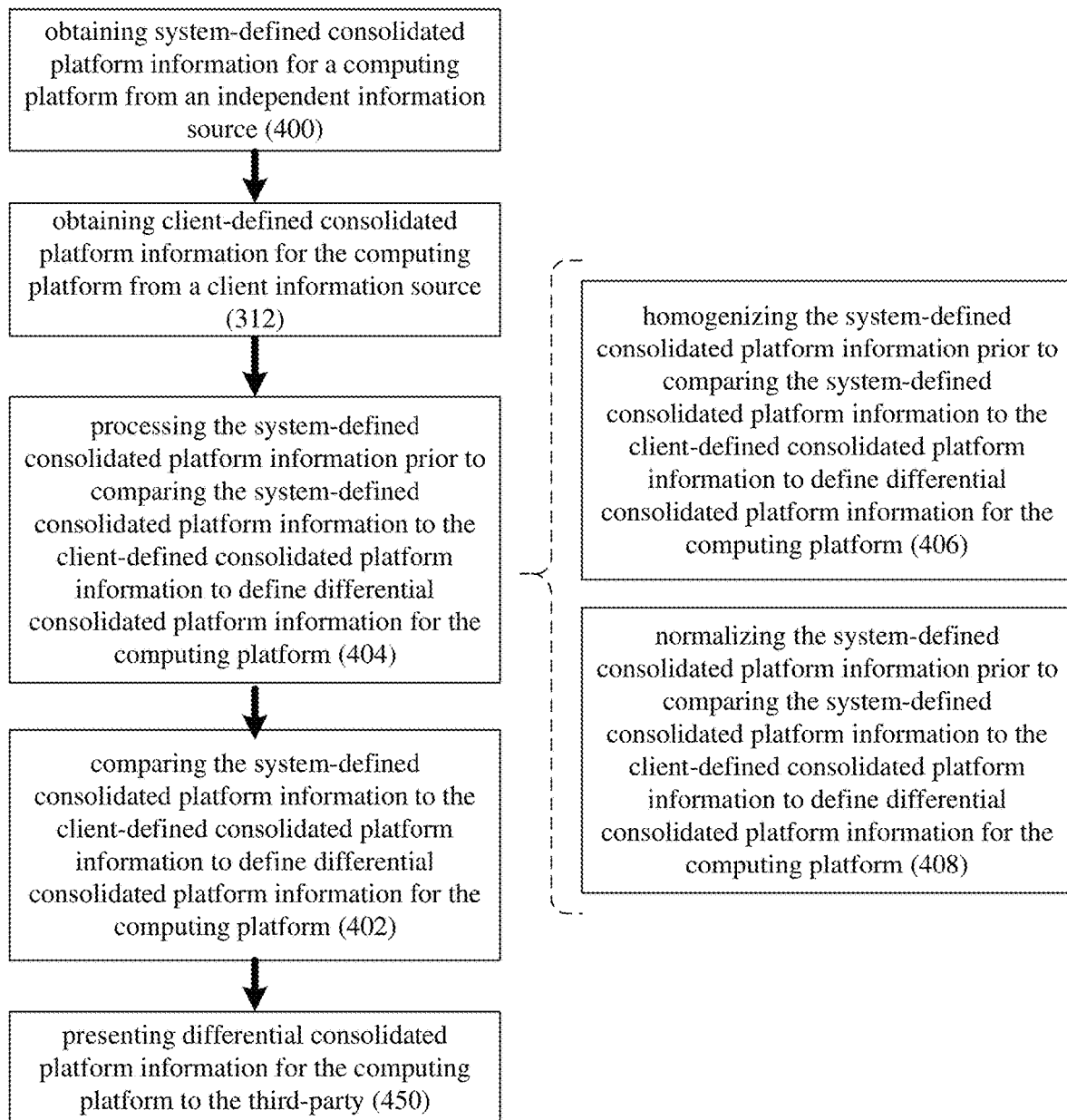

Referring also to FIG. 8, threat mitigation process 10 may be configured to compare what security relevant subsystems are actually included within computing platform 60 versus what security relevant subsystems were believed to be included within computing platform 60.

As discussed above, threat mitigation process 10 may obtain 400 system-defined consolidated platform information 236 for computing platform 60 from an independent information source, examples of which may include but are not limited to: one or more log files defined for computing platform 60 (e.g., such as those maintained by STEM system 230); and two or more security-relevant subsystems (e.g., directly from the operating system security-relevant subsystem and the antivirus security-relevant subsystem) deployed within computing platform 60

Further and as discussed above, threat mitigation process 10 may obtain 312 client-defined consolidated platform information 238 for computing platform 60 from a client information source, examples of which may include but are not limited to one or more client-completed questionnaires (e.g., questionnaires 240) and/or one or more client-deployed platform monitors (e.g., client-deployed platform monitor 242, which may be configured to effectuate SIEM functionality).

Threat mitigation process 10 may present 450 differential consolidated platform information 352 for computing platform 60 to a third-party, examples of which may include but are not limited to the user/owner/operator of computing platform 60.

Additionally and as discussed above, threat mitigation process 10 may compare 402 system-defined consolidated platform information 236 to client-defined consolidated platform information 238 to define differential consolidated platform information 352 for computing platform 60, wherein differential consolidated platform information 352 may include comparison table 354 that e.g., compares computing platform 60 to other computing platforms, wherein (and as discussed above) threat mitigation process 10 may process 404 (e.g., via homogenizing 406 and/or normalizing 408) system-defined consolidated platform information 236 prior to comparing 402 system-defined consolidated platform information 236 to client-defined consolidated platform information 238 to define differential consolidated platform information 352 for computing platform 60.

Computing Platform Analysis & Recommendation

As will be discussed below in greater detail, threat mitigation process 10 may be configured to e.g., analyze & display the vulnerabilities of computing platform 60.

Figure 9:
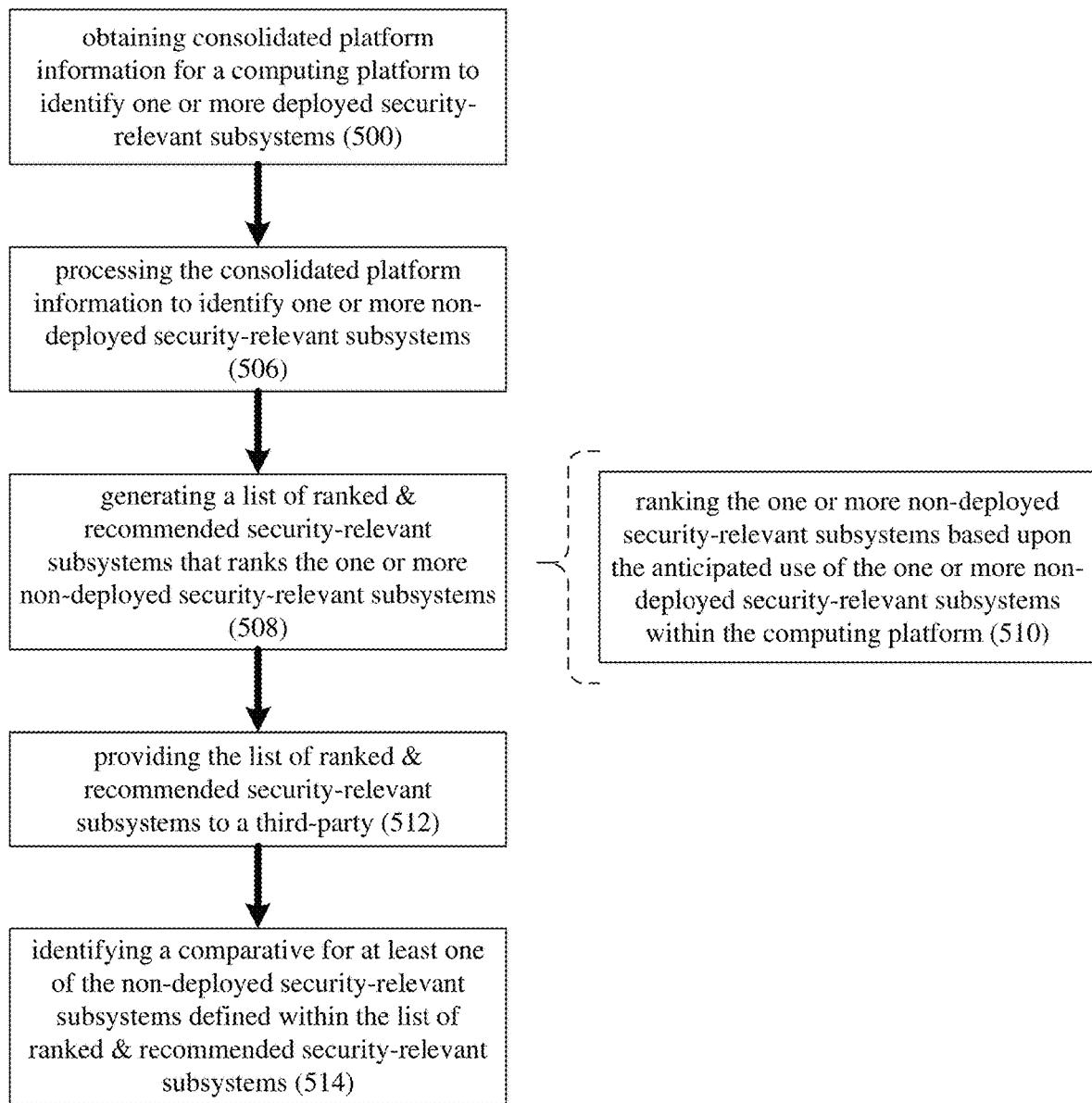

Referring also to FIG. 9, threat mitigation process 10 may be configured to make recommendations concerning security relevant subsystems that are missing from computing platform 60. As discussed above, threat mitigation process 10 may obtain 500 consolidated platform information for computing platform 60 to identify one or more deployed security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform). This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238).

Figure 10:
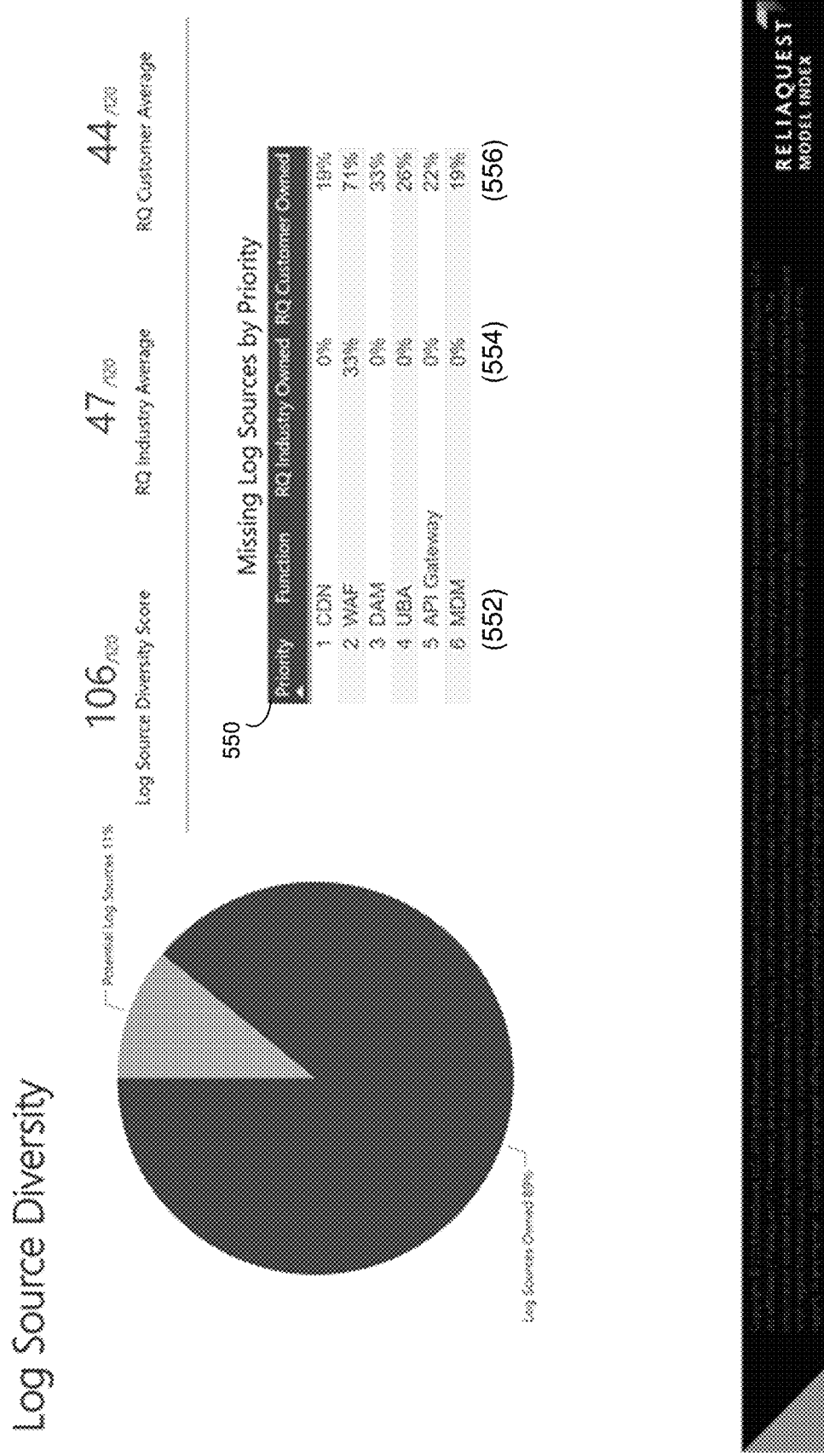
FIG. 10 is a diagrammatic view of a screen rendered by the threat mitigation process of FIG. 1 according to an embodiment of the present disclosure.

Referring also to FIG. 10, threat mitigation process 10 may process 506 the consolidated platform information (e.g., system-defined consolidated platform information 236 and/or client-defined consolidated platform information 238) to identify one or more non-deployed security-relevant subsystems (within computing platform 60) and may then generate 508 a list of ranked & recommended security-relevant subsystems (e.g., non-deployed security-relevant subsystem list 550) that ranks the one or more non-deployed security-relevant subsystems.

For this particular illustrative example, non-deployed security-relevant subsystem list 550 is shown to include column 552 that identifies six non-deployed security-relevant subsystems, namely: a CDN subsystem, a WAF subsystem, a DAM subsystem; a UBA subsystem; a API subsystem, and an MDM subsystem.

When generating 508 a list of ranked & recommended security-relevant subsystems (e.g., non-deployed security-relevant subsystem list 550) that ranks the one or more non-deployed security-relevant subsystems, threat mitigation process 10 may rank 510 the one or more non-deployed security-relevant subsystems (e.g., a CDN subsystem, a WAF subsystem, a DAM subsystem; a UBA subsystem; a API subsystem, and an MDM subsystem) based upon the anticipated use of the one or more non-deployed security-relevant subsystems within computing platform 60. This ranking 510 of the non-deployed security-relevant subsystems (e.g., a CDN subsystem, a WAF subsystem, a DAM subsystem; a UBA subsystem; a API subsystem, and an MDM subsystem) may be agnostic in nature and may be based on the functionality/effectiveness of the non-deployed security-relevant subsystems and the anticipated manner in which their implementation may impact the functionality/security of computing platform 60.

Threat mitigation process 10 may provide 512 the list of ranked & recommended security-relevant subsystems (e.g., non-deployed security-relevant subsystem list 550) to a third-party, examples of which may include but are not limited to a user/owner/operator of computing platform 60.

Additionally, threat mitigation process 10 may identify 514 a comparative for at least one of the non-deployed security-relevant subsystems (e.g., a CDN subsystem, a WAF subsystem, a DAM subsystem; a UBA subsystem; a API subsystem, and an MDM subsystem) defined within the list of ranked & recommended security-relevant subsystems (e.g., non-deployed security-relevant subsystem list 550). This comparative may include vendor customers in a specific industry comparative and/or vendor customers in any industry comparative.

For example and in addition to column 552, non-deployed security-relevant subsystem list 550 may include columns 554, 556 for defining the comparatives for the six non-deployed security-relevant subsystems, namely: a CDN subsystem, a WAF subsystem, a DAM subsystem; a UBA subsystem; a API subsystem, and an MDM subsystem. Specifically, column 554 is shown to define comparatives concerning vendor customers that own the non-deployed security-relevant subsystems in a specific industry (i.e., the same industry as the user/owner/operator of computing platform 60). Additionally, column 556 is shown to define comparatives concerning vendor customers that own the non-deployed security-relevant subsystems in any industry (i.e., not necessarily the same industry as the user/owner/operator of computing platform 60). For example and concerning the comparatives of the WAF subsystem: 33% of the vendor customers in the same industry as the user/owner/operator of computing platform 60 deploy a WAF subsystem; while 71% of the vendor customers in any industry deploy a WAF subsystem.

Naturally, the format, appearance and content of non-deployed security-relevant subsystem list 550 may be varied greatly depending upon the design criteria and anticipated performance/use of threat mitigation process 10. Accordingly, the appearance, format, completeness and content of non-deployed security-relevant subsystem list 550 is for illustrative purposes only and is not intended to be a limitation of this disclosure, as other configurations are possible and are considered to be within the scope of this disclosure. For example, content may be added to non-deployed security-relevant subsystem list 550, removed from non-deployed security-relevant subsystem list 550, and/or reformatted within non-deployed security-relevant subsystem list 550.

Figure 11:
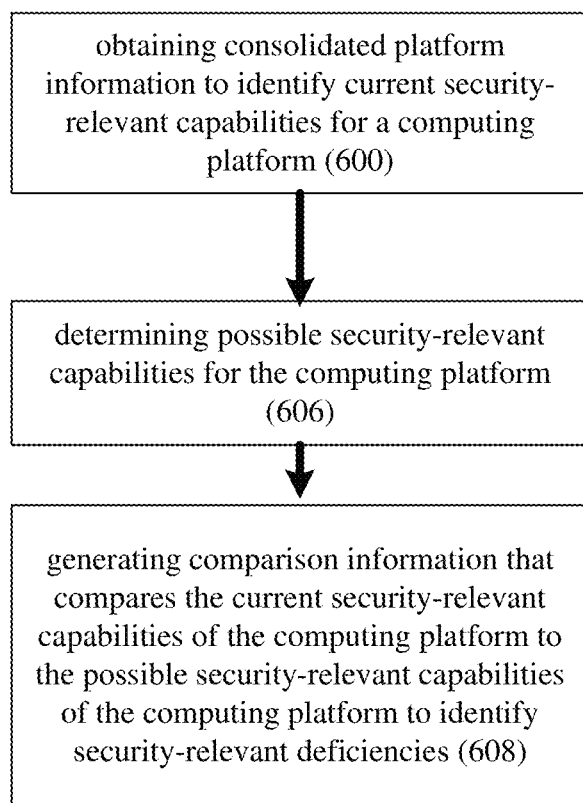
FIG. 11 is a flowchart of another implementation of the threat mitigation process of FIG. 1 according to an embodiment of the present disclosure.

Referring also to FIG. 11, threat mitigation process 10 may be configured to compare the current capabilities to the possible capabilities of computing platform 60. As discussed above, threat mitigation process 10 may obtain 600 consolidated platform information to identify current security-relevant capabilities for computing platform 60. This consolidated platform information may be obtained from an independent information source (e.g., such as STEM system 230 that may provide system-defined consolidated platform information 236) and/or may be obtained from a client information source (e.g., such as questionnaires 240 that may provide client-defined consolidated platform information 238. Threat mitigation process 10 may then determine 606 possible security-relevant capabilities for computing platform 60 (i.e., the difference between the current security-relevant capabilities of computing platform 60 and the possible security-relevant capabilities of computing platform 60. For example, the possible security-relevant capabilities may concern the possible security-relevant capabilities of computing platform 60 using the currently-deployed security-relevant subsystems. Additionally/alternatively, the possible security-relevant capabilities may concern the possible security-relevant capabilities of computing platform 60 using one or more supplemental security-relevant subsystems.

Referring also to FIG. 12 and as will be explained below, threat mitigation process 10 may generate 608 comparison information 650 that compares the current security-relevant capabilities of computing platform 60 to the possible security-relevant capabilities of computing platform 60 to identify security-relevant deficiencies. Comparison information 650 may include graphical comparison information, such as multi-axial graphical comparison information that simultaneously illustrates a plurality of security-relevant deficiencies.

For example, comparison information 650 may define (in this particular illustrative example) graphical comparison information that include five axes (e.g. axes 652, 654, 656, 658, 660) that correspond to five particular types of computer threats. Comparison information 650 includes origin 662, the point at which computing platform 60 has no protection with respect to any of the five types of computer threats that correspond to axes 652, 654, 656, 658, 660. Accordingly, as the capabilities of computing platform 60 are increased to counter a particular type of computer threat, the data point along the corresponding axis is proportionately displaced from origin 652.

As discussed above, threat mitigation process 10 may obtain 600 consolidated platform information to identify current security-relevant capabilities for computing platform 60. Concerning such current security-relevant capabilities for computing platform 60, these current security-relevant capabilities are defined by data points 664, 666, 668, 670, 672, the combination of which define bounded area 674. Bounded area 674 (in this example) defines the current security-relevant capabilities of computing platform 60.

Further and as discussed above, threat mitigation process 10 may determine 606 possible security-relevant capabilities for computing platform 60 (i.e., the difference between the current security-relevant capabilities of computing platform 60 and the possible security-relevant capabilities of computing platform 60.

As discussed above, the possible security-relevant capabilities may concern the possible security-relevant capabilities of computing platform 60 using the currently-deployed security-relevant subsystems. For example, assume that the currently-deployed security relevant subsystems are not currently being utilized to their full potential. Accordingly, certain currently-deployed security relevant subsystems may have certain features that are available but are not utilized and/or disabled. Further, certain currently-deployed security relevant subsystems may have expanded features available if additional licensing fees are paid. Therefore and concerning such possible security-relevant capabilities of computing platform 60 using the currently-deployed security-relevant subsystems, data points 676, 678, 680, 682, 684 may define bounded area 686 (which represents the full capabilities of the currently-deployed security-relevant subsystems within computing platform 60).

Further and as discussed above, the possible security-relevant capabilities may concern the possible security-relevant capabilities of computing platform 60 using one or more supplemental security-relevant subsystems. For example, assume that supplemental security-relevant subsystems are available for the deployment within computing platform 60. Therefore and concerning such possible security-relevant capabilities of computing platform 60 using such supplemental security-relevant subsystems, data points 688, 690, 692, 694, 696 may define bounded area 698 (which represents the total capabilities of computing platform 60 when utilizing the full capabilities of the currently-deployed security-relevant subsystems and any supplemental security-relevant subsystems).

Naturally, the format, appearance and content of comparison information 650 may be varied greatly depending upon the design criteria and anticipated performance/use of threat mitigation process 10. Accordingly, the appearance, format, completeness and content of comparison information 650 is for illustrative purposes only and is not intended to be a limitation of this disclosure, as other configurations are possible and are considered to be within the scope of this disclosure. For example, content may be added to comparison information 650, removed from comparison information 650, and/or reformatted within comparison information 650.

Figure 13:
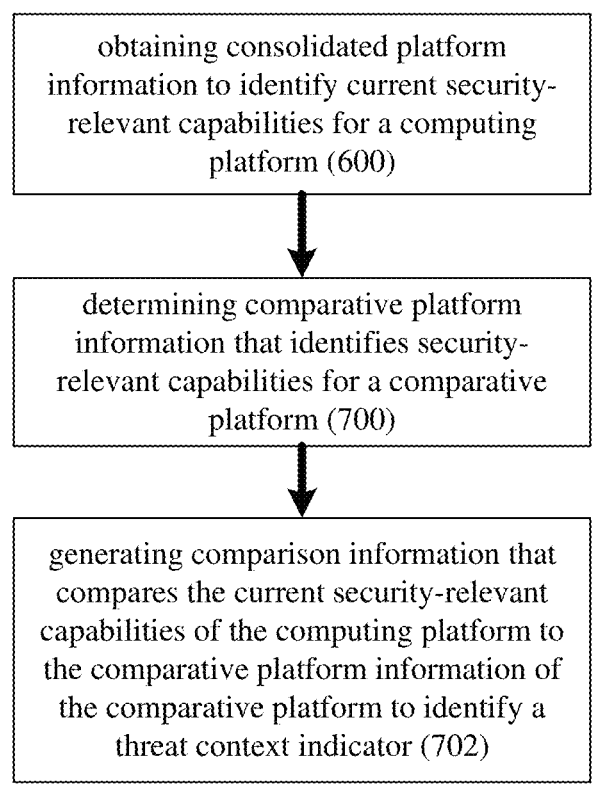
FIG. 13 is a flowchart of another implementation of the threat mitigation process of FIG. 1 according to an embodiment of the present disclosure.

Referring also to FIG. 13, threat mitigation process 10 may be configured to generate a threat context score for computing platform 60. As discussed above, threat mitigation process 10 may obtain 600 consolidated platform information to identify current security-relevant capabilities for computing platform 60. This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238. As will be discussed below in greater detail, threat mitigation process 10 may determine 700 comparative platform information that identifies security-relevant capabilities for a comparative platform, wherein this comparative platform information may concern vendor customers in a specific industry (i.e., the same industry as the user/owner/operator of computing platform 60) and/or vendor customers in any industry (i.e., not necessarily the same industry as the user/owner/operator of computing platform 60).

Figure 14:
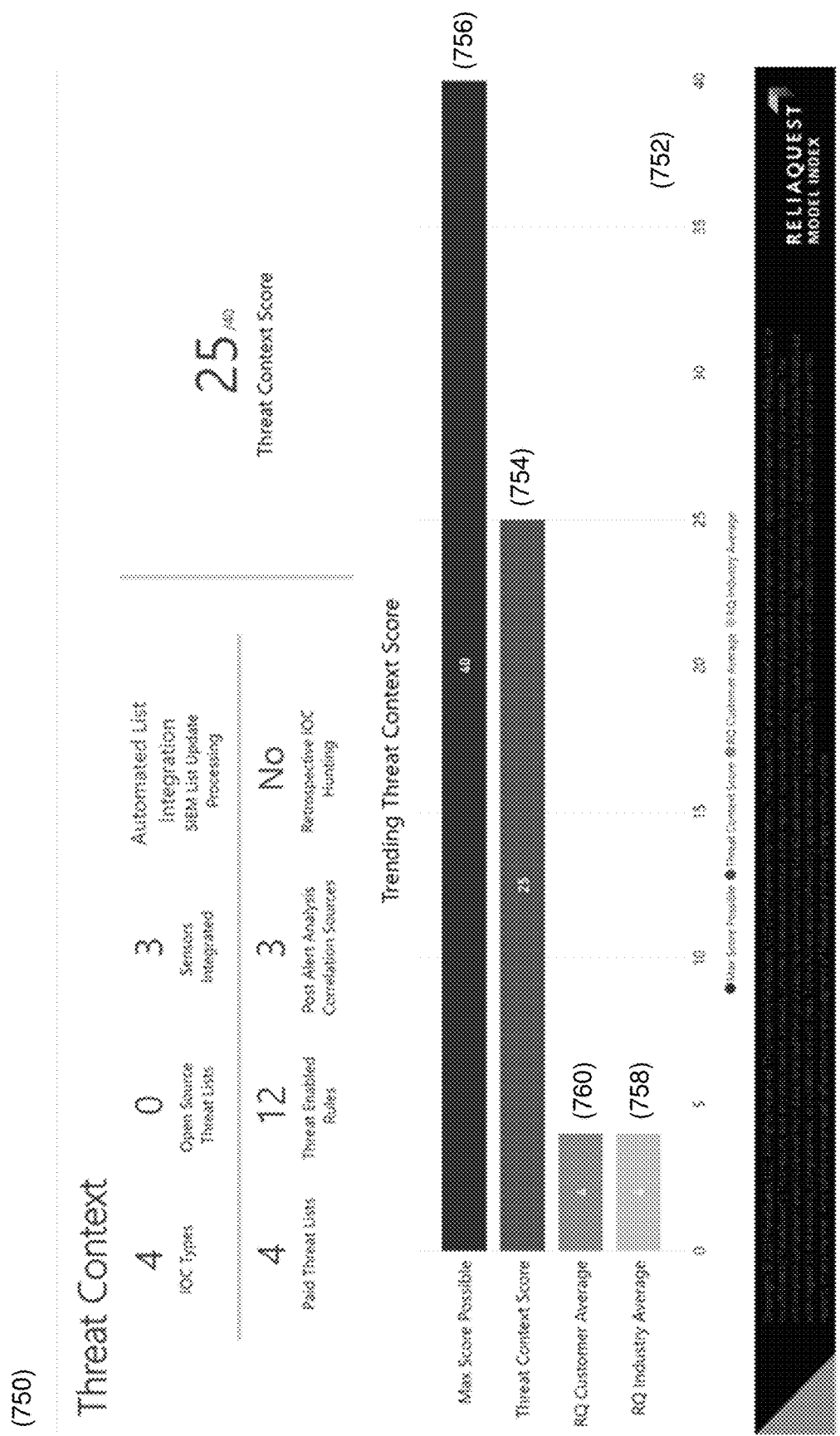
FIG. 14 is a diagrammatic view of a screen rendered by the threat mitigation process of FIG. 1 according to an embodiment of the present disclosure.

Referring also to FIG. 14 and as will be discussed below, threat mitigation process 10 may generate 702 comparison information 750 that compares the current security-relevant capabilities of computing platform 60 to the comparative platform information determined 700 for the comparative platform to identify a threat context indicator for computing platform 60, wherein comparison information 750 may include graphical comparison information 752.

Graphical comparison information 752 (which in this particular example is a bar chart) may identify one or more of: a current threat context score 754 for a client (e.g., the user/owner/operator of computing platform 60); a maximum possible threat context score 756 for the client (e.g., the user/owner/operator of computing platform 60); a threat context score 758 for one or more vendor customers in a specific industry (i.e., the same industry as the user/owner/operator of computing platform 60); and a threat context score 760 for one or more vendor customers in any industry (i.e., not necessarily the same industry as the user/owner/operator of computing platform 60).

Naturally, the format, appearance and content of comparison information 750 may be varied greatly depending upon the design criteria and anticipated performance/use of threat mitigation process 10. Accordingly, the appearance, format, completeness and content of comparison information 750 is for illustrative purposes only and is not intended to be a limitation of this disclosure, as other configurations are possible and are considered to be within the scope of this disclosure. For example, content may be added to comparison information 750, removed from comparison information 750, and/or reformatted within comparison information 750.

Computing Platform Monitoring & Mitigation

As will be discussed below in greater detail, threat mitigation process 10 may be configured to e.g., monitor the operation and performance of computing platform 60.

Figure 15:
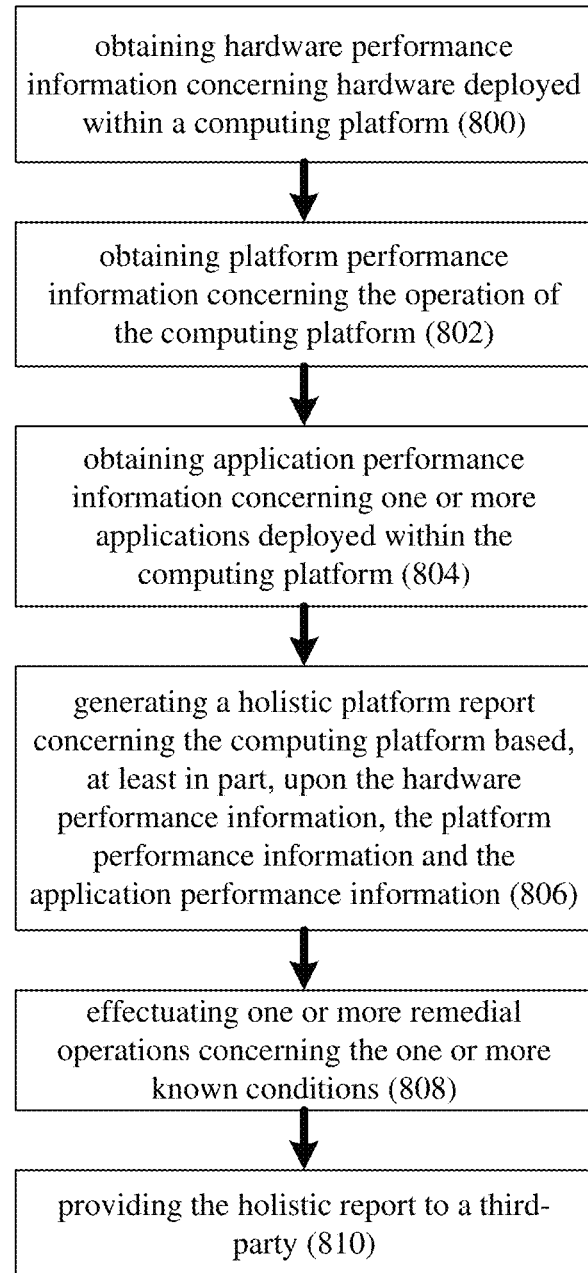
FIG. 15 is a flowchart of another implementation of the threat mitigation process of FIG. 1 according to an embodiment of the present disclosure.

Referring also to FIG. 15, threat mitigation process 10 may be configured to monitor the health of computing platform 60 and provide feedback to a third-party concerning the same. Threat mitigation process 10 may obtain 800 hardware performance information 244 concerning hardware (e.g., server computers, desktop computers, laptop computers, switches, firewalls, routers, gateways, WAPs, and NASs), deployed within computing platform 60. Hardware performance information 244 may concern the operation and/or functionality of one or more hardware systems (e.g., server computers, desktop computers, laptop computers, switches, firewalls, routers, gateways, WAPs, and NASs) deployed within computing platform 60.

Threat mitigation process 10 may obtain 802 platform performance information 246 concerning the operation of computing platform 60. Platform performance information 246 may concern the operation and/or functionality of computing platform 60.

When obtaining 802 platform performance information concerning the operation of computing platform 60, threat mitigation process 10 may (as discussed above): obtain 400 system-defined consolidated platform information 236 for computing platform 60 from an independent information source (e.g., SIEM system 230); obtain 312 client-defined consolidated platform information 238 for computing platform 60 from a client information (e.g., questionnaires 240); and present 450 differential consolidated platform information 352 for computing platform 60 to a third-party, examples of which may include but are not limited to the user/owner/operator of computing platform 60.

When obtaining 802 platform performance information concerning the operation of computing platform 60, threat mitigation process 10 may (as discussed above): obtain 500 consolidated platform information for computing platform 60 to identify one or more deployed security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform); process 506 the consolidated platform information (e.g., system-defined consolidated platform information 236 and/or client-defined consolidated platform information 238) to identify one or more non-deployed security-relevant subsystems (within computing platform 60); generate 508 a list of ranked & recommended security-relevant subsystems (e.g., non-deployed security-relevant subsystem list 550) that ranks the one or more non-deployed security-relevant subsystems; and provide 514 the list of ranked & recommended security-relevant subsystems (e.g., non-deployed security-relevant subsystem list 550) to a third-party, examples of which may include but are not limited to a user/owner/operator of computing platform 60.

When obtaining 802 platform performance information concerning the operation of computing platform 60, threat mitigation process 10 may (as discussed above): obtain 600 consolidated platform information to identify current security-relevant capabilities for the computing platform; determine 606 possible security-relevant capabilities for computing platform 60; and generate 608 comparison information 650 that compares the current security-relevant capabilities of computing platform 60 to the possible security-relevant capabilities of computing platform 60 to identify security-relevant deficiencies.

When obtaining 802 platform performance information concerning the operation of computing platform 60, threat mitigation process 10 may (as discussed above): obtain 600 consolidated platform information to identify current security-relevant capabilities for computing platform 60; determine 700 comparative platform information that identifies security-relevant capabilities for a comparative platform; and generate 702 comparison information 750 that compares the current security-relevant capabilities of computing platform 60 to the comparative platform information determined 700 for the comparative platform to identify a threat context indicator for computing platform 60.

Threat mitigation process 10 may obtain 804 application performance information 248 concerning one or more applications (e.g., operating systems, user applications, security application, and utility application) deployed within computing platform 60. Application performance information 248 may concern the operation and/or functionality of one or more software applications (e.g., operating systems, user applications, security application, and utility application) deployed within computing platform 60.

Referring also to FIG. 16, threat mitigation process 10 may generate 806 holistic platform report (e.g., holistic platform reports 850, 852) concerning computing platform 60 based, at least in part, upon hardware performance information 244, platform performance information 246 and application performance information 248. Threat mitigation process 10 may be configured to receive e.g., hardware performance information 244, platform performance information 246 and application performance information 248 at regular intervals (e.g., continuously, every minute, every ten minutes, etc.).

As illustrated, holistic platform reports 850, 852 may include various pieces of content such as e.g., thought clouds that identity topics/issues with respect to computing platform 60, system logs that memorialize identified issues within computing platform 60, data sources providing information to computing system 60, and so on. The holistic platform report (e.g., holistic platform reports 850, 852) may identify one or more known conditions concerning the computing platform; and threat mitigation process 10 may effectuate 808 one or more remedial operations concerning the one or more known conditions.

For example, assume that the holistic platform report (e.g., holistic platform reports 850, 852) identifies that computing platform 60 is under a DoS (i.e., Denial of Services) attack. In computing, a denial-of-service attack (DoS attack) is a cyber-attack in which the perpetrator seeks to make a machine or network resource unavailable to its intended users by temporarily or indefinitely disrupting services of a host connected to the Internet. Denial of service is typically accomplished by flooding the targeted machine or resource with superfluous requests in an attempt to overload systems and prevent some or all legitimate requests from being fulfilled.

In response to detecting such a DoS attack, threat mitigation process 10 may effectuate 808 one or more remedial operations. For example and with respect to such a DoS attack, threat mitigation process 10 may effectuate 808 e.g., a remedial operation that instructs WAF (i.e., Web Application Firewall) 212 to deny all incoming traffic from the identified attacker based upon e.g., protocols, ports or the originating IP addresses.

Threat mitigation process 10 may also provide 810 the holistic report (e.g., holistic platform reports 850, 852) to a third-party, examples of which may include but are not limited to a user/owner/operator of computing platform 60.

Naturally, the format, appearance and content of the holistic platform report (e.g., holistic platform reports 850, 852) may be varied greatly depending upon the design criteria and anticipated performance/use of threat mitigation process 10. Accordingly, the appearance, format, completeness and content of the holistic platform report (e.g., holistic platform reports 850, 852) is for illustrative purposes only and is not intended to be a limitation of this disclosure, as other configurations are possible and are considered to be within the scope of this disclosure. For example, content may be added to the holistic platform report (e.g., holistic platform reports 850, 852), removed from the holistic platform report (e.g., holistic platform reports 850, 852), and/or reformatted within the holistic platform report (e.g., holistic platform reports 850, 852).

Figure 17:
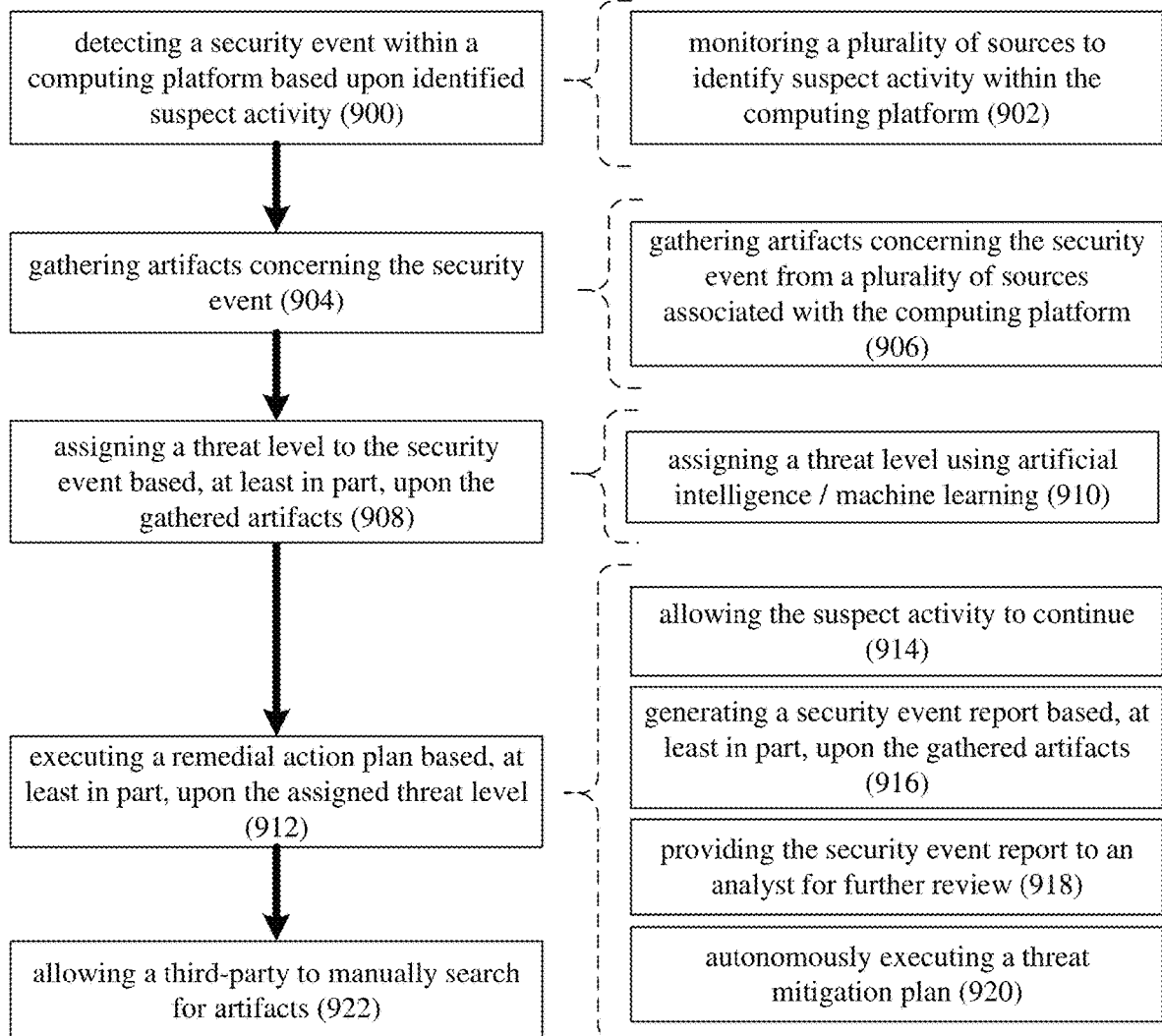
FIGS. 17-23 are flowcharts of other implementations of the threat mitigation process of FIG. 1 according to an embodiment of the present disclosure.

Referring also to FIG. 17, threat mitigation process 10 may be configured to monitor computing platform 60 for the occurrence of a security event and (in the event of such an occurrence) gather artifacts concerning the same. For example, threat mitigation process 10 may detect 900 a security event within computing platform 60 based upon identified suspect activity. Examples of such security events may include but are not limited to: DDoS events, DoS events, phishing events, spamming events, malware events, web attacks, and exploitation events.

When detecting 900 a security event (e.g., DDoS events, DoS events, phishing events, spamming events, malware events, web attacks, and exploitation events) within computing platform 60 based upon identified suspect activity, threat mitigation process 10 may monitor 902 a plurality of sources to identify suspect activity within computing platform 60.

For example, assume that threat mitigation process 10 detects 900 a security event within computing platform 60. Specifically, assume that threat mitigation process 10 is monitoring 902 a plurality of sources (e.g., the various log files maintained by STEM system 230). And by monitoring 902 such sources, assume that threat mitigation process 10 detects 900 the receipt of inbound content (via an API) from a device having an IP address located in Uzbekistan; the subsequent opening of a port within WAF (i.e., Web Application Firewall) 212; and the streaming of content from a computing device within computing platform 60 through that recently-opened port in WAF (i.e., Web Application Firewall) 212 and to a device having an IP address located in Moldova.

Upon detecting 900 such a security event within computing platform 60, threat mitigation process 10 may gather 904 artifacts (e.g., artifacts 250) concerning the above-described security event. When gathering 904 artifacts (e.g., artifacts 250) concerning the above-described security event, threat mitigation process 10 may gather 906 artifacts concerning the security event from a plurality of sources associated with the computing platform, wherein examples of such plurality of sources may include but are not limited to the various log files maintained by SIEM system 230, and the various log files directly maintained by the security-relevant subsystems.

Once the appropriate artifacts (e.g., artifacts 250) are gathered 904, threat mitigation process 10 may assign 908 a threat level to the above-described security event based, at least in part, upon the artifacts (e.g., artifacts 250) gathered 904.

When assigning 908 a threat level to the above-described security event, threat mitigation process 10 may assign 910 a threat level using artificial intelligence/machine learning. As discussed above and with respect to artificial intelligence/machine learning being utilized to process data sets, an initial probabilistic model may be defined, wherein this initial probabilistic model may be subsequently (e.g., iteratively or continuously) modified and revised, thus allowing the probabilistic models and the artificial intelligence systems (e.g., probabilistic process 56) to "learn" so that future probabilistic models may be more precise and may explain more complex data sets. As further discussed above, probabilistic process 56 may define an initial probabilistic model for accomplishing a defined task (e.g., the analyzing of information 58), wherein the probabilistic model may be utilized to go from initial observations about information 58 (e.g., as represented by the initial branches of a probabilistic model) to conclusions about information 58 (e.g., as represented by the leaves of a probabilistic model). Accordingly and through the use of probabilistic process 56, massive data sets concerning security events may be processed so that a probabilistic model may be defined (and subsequently revised) to assign 910 a threat level to the above-described security event.

Once assigned 910 a threat level, threat mitigation process 10 may execute 912 a remedial action plan (e.g., remedial action plan 252) based, at least in part, upon the assigned threat level.

For example and when executing 912 a remedial action plan, threat mitigation process 10 may allow 914 the above-described suspect activity to continue when e.g., threat mitigation process 10 assigns 908 a "low" threat level to the above-described security event (e.g., assuming that it is determined that the user of the local computing device is streaming video of his daughter's graduation to his parents in Moldova).

Further and when executing 912 a remedial action plan, threat mitigation process 10 may generate 916 a security event report (e.g., security event report 254) based, at least in part, upon the artifacts (e.g., artifacts 250) gathered 904; and provide 918 the security event report (e.g., security event report 254) to an analyst (e.g., analyst 256) for further review when e.g., threat mitigation process 10 assigns 908 a "moderate" threat level to the above-described security event (e.g., assuming that it is determined that while the streaming of the content is concerning, the content is low value and the recipient is not a known bad actor).

Further and when executing 912 a remedial action plan, threat mitigation process 10 may autonomously execute 920 a threat mitigation plan (shutting down the stream and closing the port) when e.g., threat mitigation process 10 assigns 908 a "severe" threat level to the above-described security event (e.g., assuming that it is determined that the streaming of the content is very concerning, as the content is high value and the recipient is a known bad actor).

Additionally, threat mitigation process 10 may allow 922 a third-party (e.g., the user/owner/operator of computing platform 60) to manually search for artifacts within computing platform 60. For example, the third-party (e.g., the user/owner/operator of computing platform 60) may be able to search the various information resources include within computing platform 60, examples of which may include but are not limited to the various log files maintained by SIEM system 230, and the various log files directly maintained by the security-relevant subsystems within computing platform 60.

Computing Platform Aggregation & Searching

As will be discussed below in greater detail, threat mitigation process 10 may be configured to e.g., aggregate data sets and allow for unified search of those data sets.

Figure 18:
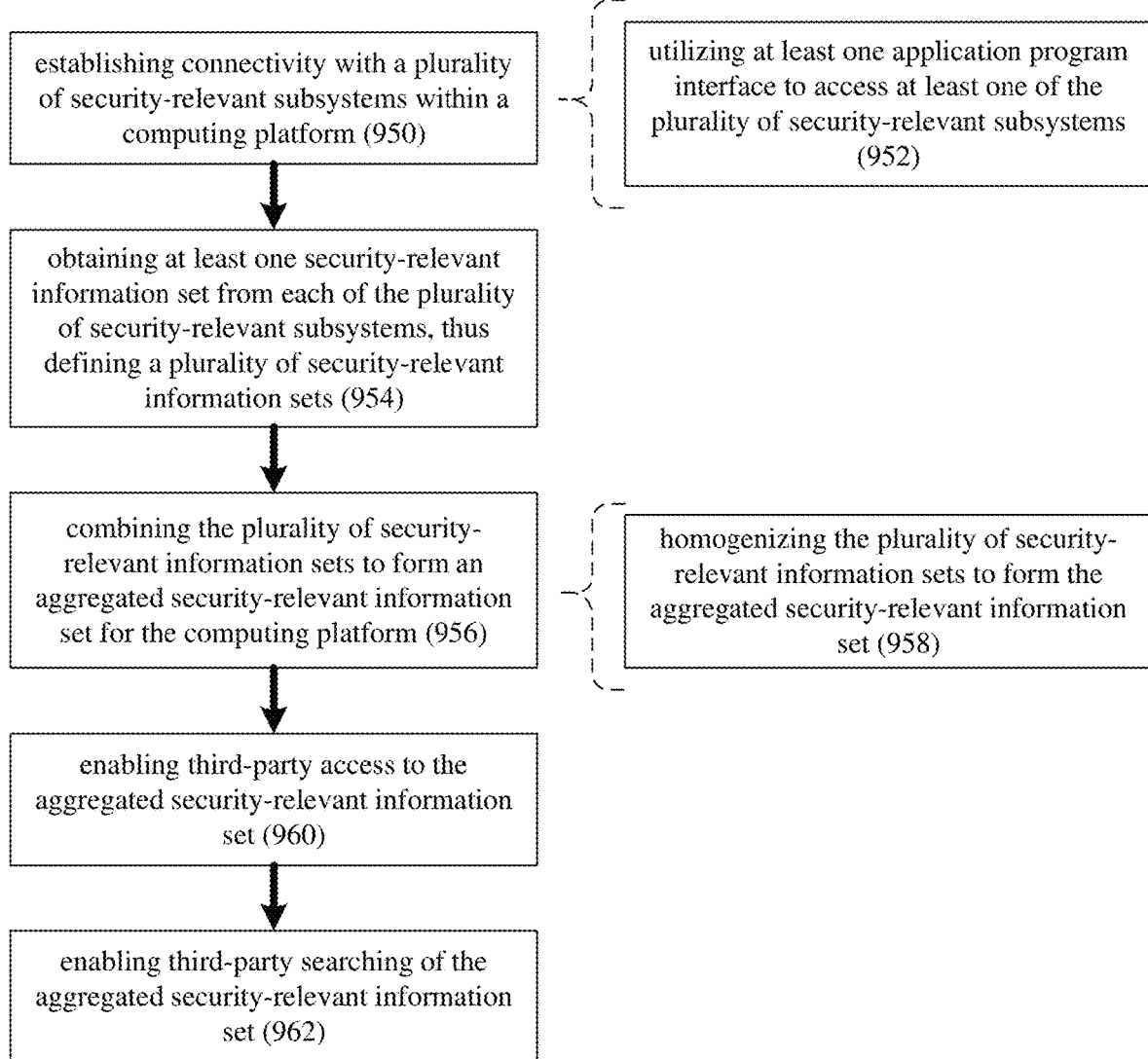

Referring also to FIG. 18, threat mitigation process 10 may be configured to consolidate multiple separate and discrete data sets to form a single, aggregated data set. For example, threat mitigation process 10 may establish 950 connectivity with a plurality of security-relevant subsystems (e.g., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 950 connectivity with a plurality of security-relevant subsystems, threat mitigation process 10 may utilize 952 at least one application program interface (e.g., API Gateway 224) to access at least one of the plurality of security-relevant subsystems. For example, a $1^{st}$ API gateway may be utilized to access CDN (i.e., Content Delivery Network) system; a $2^{nd}$ API gateway may be utilized to access DAM (i.e., Database Activity Monitoring) system; a $3^{rd}$ API gateway may be utilized to access UBA (i.e., User Behavior Analytics) system; a $4^{th}$ API gateway may be utilized to access MDM (i.e., Mobile Device Management) system; a $5^{th}$ API gateway may be utilized to access IAM (i.e., Identity and Access Management) system; and a $6^{th}$ API gateway may be utilized to access DNS (i.e., Domain Name Server) system.

Threat mitigation process 10 may obtain 954 at least one security-relevant information set (e.g., a log file) from each of the plurality of security-relevant subsystems (e.g., CDN system; DAM system; UBA system; MDM system; IAM system; and DNS system), thus defining plurality of security-relevant information sets 258. As would be expected, plurality of security-relevant information sets 258 may utilize a plurality of different formats and/or a plurality of different nomenclatures. Accordingly, threat mitigation process 10 may combine 956 plurality of security-relevant information sets 258 to form an aggregated security-relevant information set 260 for computing platform 60.

When combining 956 plurality of security-relevant information sets 258 to form aggregated security-relevant information set 260, threat mitigation process 10 may homogenize 958 plurality of security-relevant information sets 258 to form aggregated security-relevant information set 260. For example, threat mitigation process 10 may process one or more of security-relevant information sets 258 so that they all have a common format, a common nomenclature, and/or a common structure.

Once threat mitigation process 10 combines 956 plurality of security-relevant information sets 258 to form an aggregated security-relevant information set 260 for computing platform 60, threat mitigation process 10 may enable 960 a third-party (e.g., the user/owner/operator of computing platform 60) to access aggregated security-relevant information set 260 and/or enable 962 a third-party (e.g., the user/owner/operator of computing platform 60) to search aggregated security-relevant information set 260.

Figure 19:
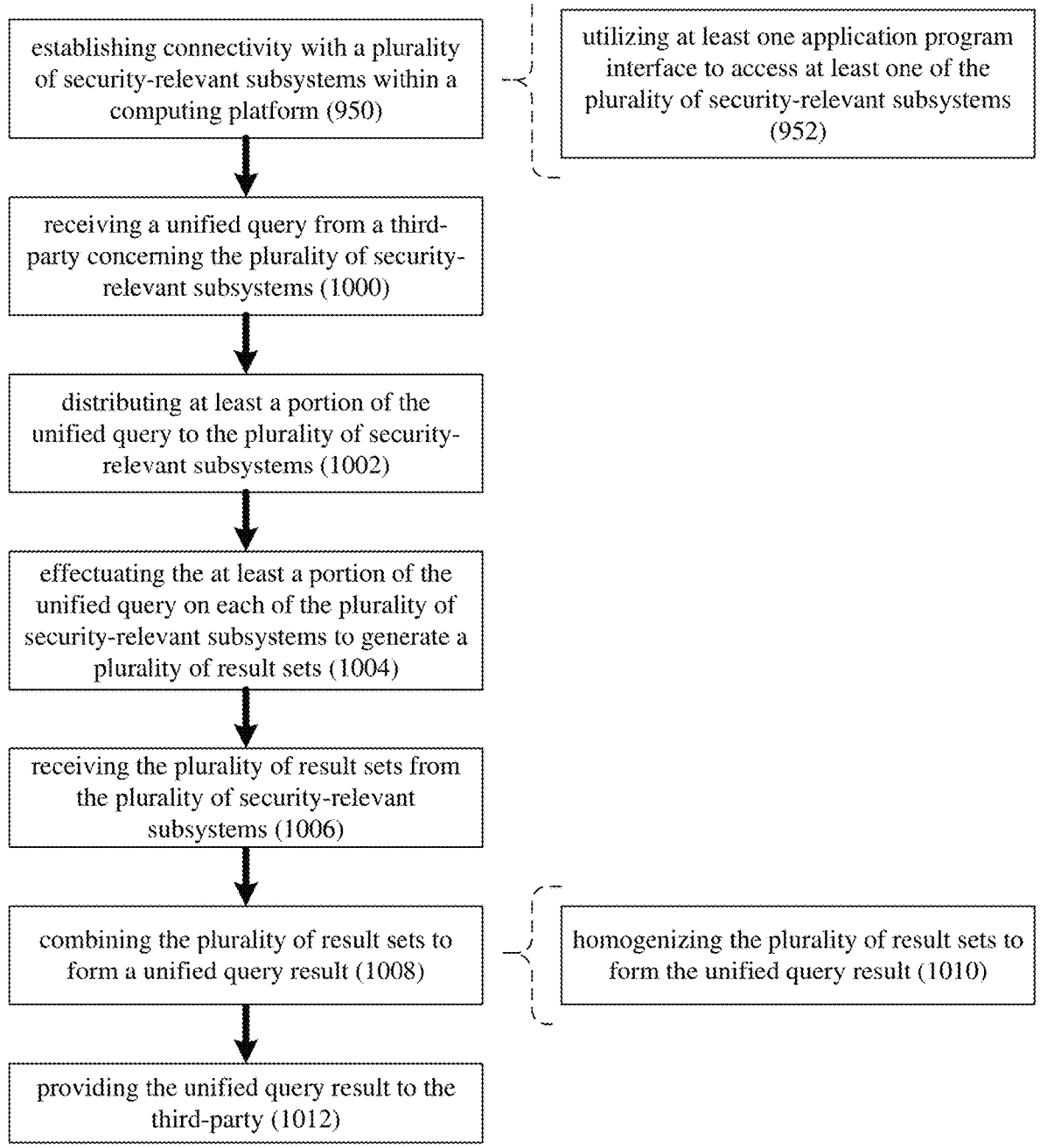

Referring also to FIG. 19, threat mitigation process 10 may be configured to enable the searching of multiple separate and discrete data sets using a single search operation. For example and as discussed above, threat mitigation process 10 may establish 950 connectivity with a plurality of security-relevant subsystems (e.g., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When establishing 950 connectivity with a plurality of security-relevant subsystems, threat mitigation process 10 may utilize 952 at least one application program interface (e.g., API Gateway 224) to access at least one of the plurality of security-relevant subsystems. For example, a $1^{st}$ API gateway may be utilized to access CDN (i.e., Content Delivery Network) system; a $2^{nd}$ API gateway may be utilized to access DAM (i.e., Database Activity Monitoring) system; a $3^{rd}$ API gateway may be utilized to access UBA (i.e., User Behavior Analytics) system; a $4^{th}$ API gateway may be utilized to access MDM (i.e., Mobile Device Management) system; a $5^{th}$ API gateway may be utilized to access IAM (i.e., Identity and Access Management) system; and a $6^{th}$ API gateway may be utilized to access DNS (i.e., Domain Name Server) system.

Threat mitigation process 10 may receive 1000 unified query 262 from a third-party (e.g., the user/owner/operator of computing platform 60) concerning the plurality of security-relevant subsystems. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

Threat mitigation process 10 may distribute 1002 at least a portion of unified query 262 to the plurality of security-relevant subsystems, resulting in the distribution of plurality of queries 264 to the plurality of security-relevant subsystems. For example, assume that a third-party (e.g., the user/owner/operator of computing platform 60) wishes to execute a search concerning the activity of a specific employee. Accordingly, the third-party (e.g., the user/owner/operator of computing platform 60) may formulate the appropriate unified query (e.g., unified query 262) that defines the employee name, the computing device(s) of the employee, and the date range of interest. Unified query 262 may then be parsed to form plurality of queries 264, wherein a specific query (within plurality of queries 264) may be defined for each of the plurality of security-relevant subsystems and provided to the appropriate security-relevant subsystems. For example, a $1^{st}$ query may be included within plurality of queries 264 and provided to CDN (i.e., Content Delivery Network) system; a $2^{nd}$ query may be included within plurality of queries 264 and provided to DAM (i.e., Database Activity Monitoring) system; a $3^{rd}$ query may be included within plurality of queries 264 and provided to UBA (i.e., User Behavior Analytics) system; a $4^{th}$ query may be included within plurality of queries 264 and provided to MDM (i.e., Mobile Device Management) system; a $5^{th}$ query may be included within plurality of queries 264 and provided to IAM (i.e., Identity and Access Management) system; and a $6^{th}$ query may be included within plurality of queries 264 and provided to DNS (i.e., Domain Name Server) system.

Threat mitigation process 10 may effectuate 1004 at least a portion of unified query 262 on each of the plurality of security-relevant subsystems to generate plurality of result sets 266. For example, the $1^{st}$ query may be executed on CDN (i.e., Content Delivery Network) system to produce a $1^{st}$ result set; the $2^{nd}$ query may be executed on DAM (i.e., Database Activity Monitoring) system to produce a $2^{nd}$ result set; the $3^{rd}$ query may be executed on UBA (i.e., User Behavior Analytics) system to produce a $3^{rd}$ result set; the $4^{th}$ query may be executed on MDM (i.e., Mobile Device Management) system to produce a $4^{th}$ result set; the $5^{th}$ query may be executed on IAM (i.e., Identity and Access Management) system to produce a $5^{th}$ result set; and the $6^{th}$ query may executed on DNS (i.e., Domain Name Server) system to produce a $6^{th}$ result set.

Threat mitigation process 10 may receive 1006 plurality of result sets 266 from the plurality of security-relevant subsystems. Threat mitigation process 10 may then combine 1008 plurality of result sets 266 to form unified query result 268. When combining 1008 plurality of result sets 266 to form unified query result 268, threat mitigation process 10 may homogenize 1010 plurality of result sets 266 to form unified query result 268. For example, threat mitigation process 10 may process one or more discrete result sets included within plurality of result sets 266 so that the discrete result sets within plurality of result sets 266 all have a common format, a common nomenclature, and/or a common structure. Threat mitigation process 10 may then provide 1012 unified query result 268 to the third-party (e.g., the user/owner/operator of computing platform 60).

Figure 20:
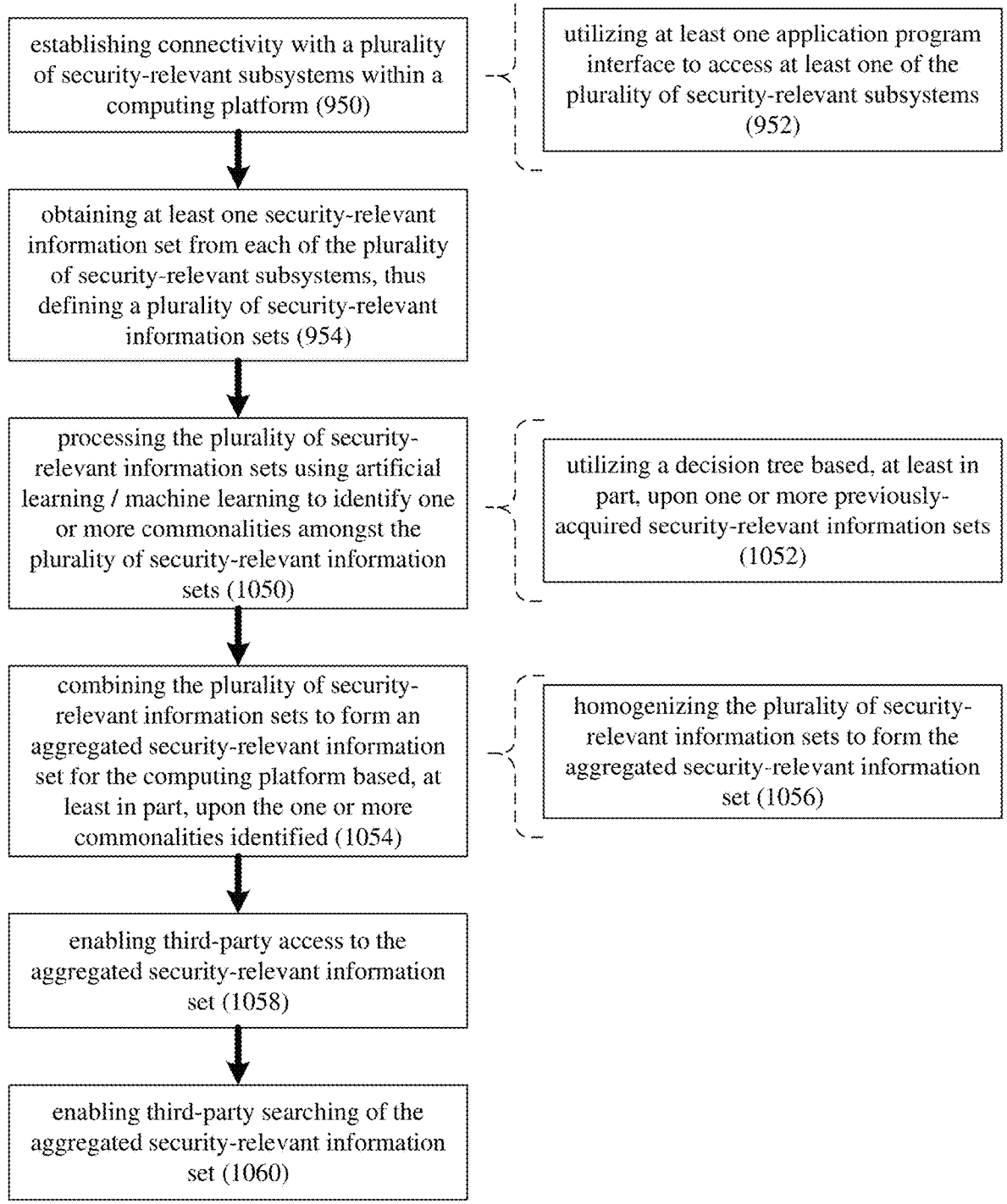

Referring also to FIG. 20, threat mitigation process 10 may be configured to utilize artificial intelligence/machine learning to automatically consolidate multiple separate and discrete data sets to form a single, aggregated data set. For example and as discussed above, threat mitigation process 10 may establish 950 connectivity with a plurality of security-relevant subsystems (e.g., security-relevant subsystems 226) within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

As discussed above and when establishing 950 connectivity with a plurality of security-relevant subsystems, threat mitigation process 10 may utilize 952 at least one application program interface (e.g., API Gateway 224) to access at least one of the plurality of security-relevant subsystems. For example, a $1^{st}$ API gateway may be utilized to access CDN (i.e., Content Delivery Network) system; a $2^{nd}$ API gateway may be utilized to access DAM (i.e., Database Activity Monitoring) system; a $3^{rd}$ API gateway may be utilized to access UBA (i.e., User Behavior Analytics) system; a $4^{th}$ API gateway may be utilized to access MDM (i.e., Mobile Device Management) system; a $5^{th}$ API gateway may be utilized to access IAM (i.e., Identity and Access Management) system; and a $6^{th}$ API gateway may be utilized to access DNS (i.e., Domain Name Server) system.

As discussed above, threat mitigation process 10 may obtain 954 at least one security-relevant information set (e.g., a log file) from each of the plurality of security-relevant subsystems (e.g., CDN system; DAM system; UBA system; MDM system; IAM system; and DNS system), thus defining plurality of security-relevant information sets 258. As would be expected, plurality of security-relevant information sets 258 may utilize a plurality of different formats and/or a plurality of different nomenclatures.

Threat mitigation process 10 may process 1050 plurality of security-relevant information sets 258 using artificial learning/machine learning to identify one or more commonalities amongst plurality of security-relevant information sets 258. As discussed above and with respect to artificial intelligence/machine learning being utilized to process data sets, an initial probabilistic model may be defined, wherein this initial probabilistic model may be subsequently (e.g., iteratively or continuously) modified and revised, thus allowing the probabilistic models and the artificial intelligence systems (e.g., probabilistic process 56) to "learn" so that future probabilistic models may be more precise and may explain more complex data sets. As further discussed above, probabilistic process 56 may define an initial probabilistic model for accomplishing a defined task (e.g., the analyzing of information 58), wherein the probabilistic model may be utilized to go from initial observations about information 58 (e.g., as represented by the initial branches of a probabilistic model) to conclusions about information 58 (e.g., as represented by the leaves of a probabilistic model). Accordingly and through the use of probabilistic process 56, plurality of security-relevant information sets 258 may be processed so that a probabilistic model may be defined (and subsequently revised) to identify one or more commonalities (e.g., common headers, common nomenclatures, common data ranges, common data types, common formats, etc.) amongst plurality of security-relevant information sets 258. When processing 1050 plurality of security-relevant information sets 258 using artificial learning/machine learning to identify one or more commonalities amongst plurality of security-relevant information sets 258, threat mitigation process 10 may utilize 1052 a decision tree (e.g., probabilistic model 100) based, at least in part, upon one or more previously-acquired security-relevant information sets.

Threat mitigation process 10 may combine 1054 plurality of security-relevant information sets 258 to form aggregated security-relevant information set 260 for computing platform 60 based, at least in part, upon the one or more commonalities identified.

When combining 1054 plurality of security-relevant information sets 258 to form aggregated security-relevant information set 260 for computing platform 60 based, at least in part, upon the one or more commonalities identified, threat mitigation process 10 may homogenize 1056 plurality of security-relevant information sets 258 to form aggregated security-relevant information set 260. For example, threat mitigation process 10 may process one or more of security-relevant information sets 258 so that they all have a common format, a common nomenclature, and/or a common structure.

Once threat mitigation process 10 combines 1054 plurality of security-relevant information sets 258 to form an aggregated security-relevant information set 260 for computing platform 60, threat mitigation process 10 may enable 1058 a third-party (e.g., the user/owner/operator of computing platform 60) to access aggregated security-relevant information set 260 and/or enable 1060 a third-party (e.g., the user/owner/operator of computing platform 60) to search aggregated security-relevant information set 260.

Threat Event Information Updating

As will be discussed below in greater detail, threat mitigation process 10 may be configured to be updated concerning threat event information.

Figure 21:
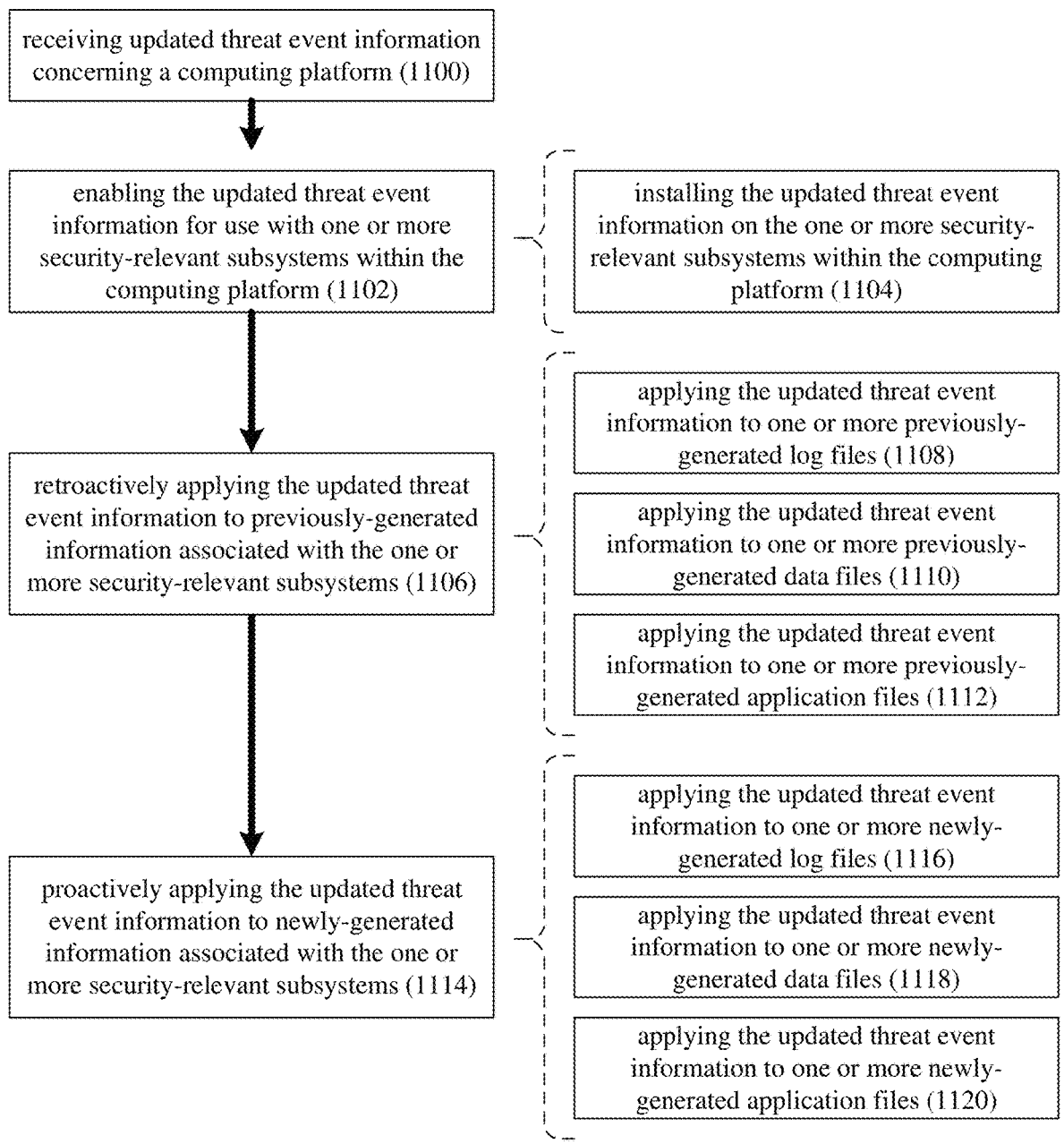

Referring also to FIG. 21, threat mitigation process 10 may be configured to receive updated threat event information for security-relevant subsystems 226. For example, threat mitigation process 10 may receive 1100 updated threat event information 270 concerning computing platform 60, wherein updated threat event information 270 may define one or more of: updated threat listings; updated threat definitions; updated threat methodologies; updated threat sources; and updated threat strategies. Threat mitigation process 10 may enable 1102 updated threat event information 270 for use with one or more security-relevant subsystems 226 within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

When enabling 1102 updated threat event information 270 for use with one or more security-relevant subsystems 226 within computing platform 60, threat mitigation process 10 may install 1104 updated threat event information 270 on one or more security-relevant subsystems 226 within computing platform 60.

Threat mitigation process 10 may retroactively apply 1106 updated threat event information 270 to previously-generated information associated with one or more security-relevant subsystems 226.

When retroactively apply 1106 updated threat event information 270 to previously-generated information associated with one or more security-relevant subsystems 226, threat mitigation process 10 may: apply 1108 updated threat event information 270 to one or more previously-generated log files (not shown) associated with one or more security-relevant subsystems 226; apply 1110 updated threat event information 270 to one or more previously-generated data files (not shown) associated with one or more security-relevant subsystems 226; and apply 1112 updated threat event information 270 to one or more previously-generated application files (not shown) associated with one or more security-relevant subsystems 226.

Additionally, alternatively, threat mitigation process 10 may proactively apply 1114 updated threat event information 270 to newly-generated information associated with one or more security-relevant subsystems 226.

When proactively applying 1114 updated threat event information 270 to newly-generated information associated with one or more security-relevant subsystems 226, threat mitigation process 10 may: apply 1116 updated threat event information 270 to one or more newly-generated log files (not shown) associated with one or more security-relevant subsystems 226; apply 1118 updated threat event information 270 to one or more newly-generated data files (not shown) associated with one or more security-relevant subsystems 226; and apply 1120 updated threat event information 270 to one or more newly-generated application files (not shown) associated with one or more security-relevant subsystems 226.

Figure 22:
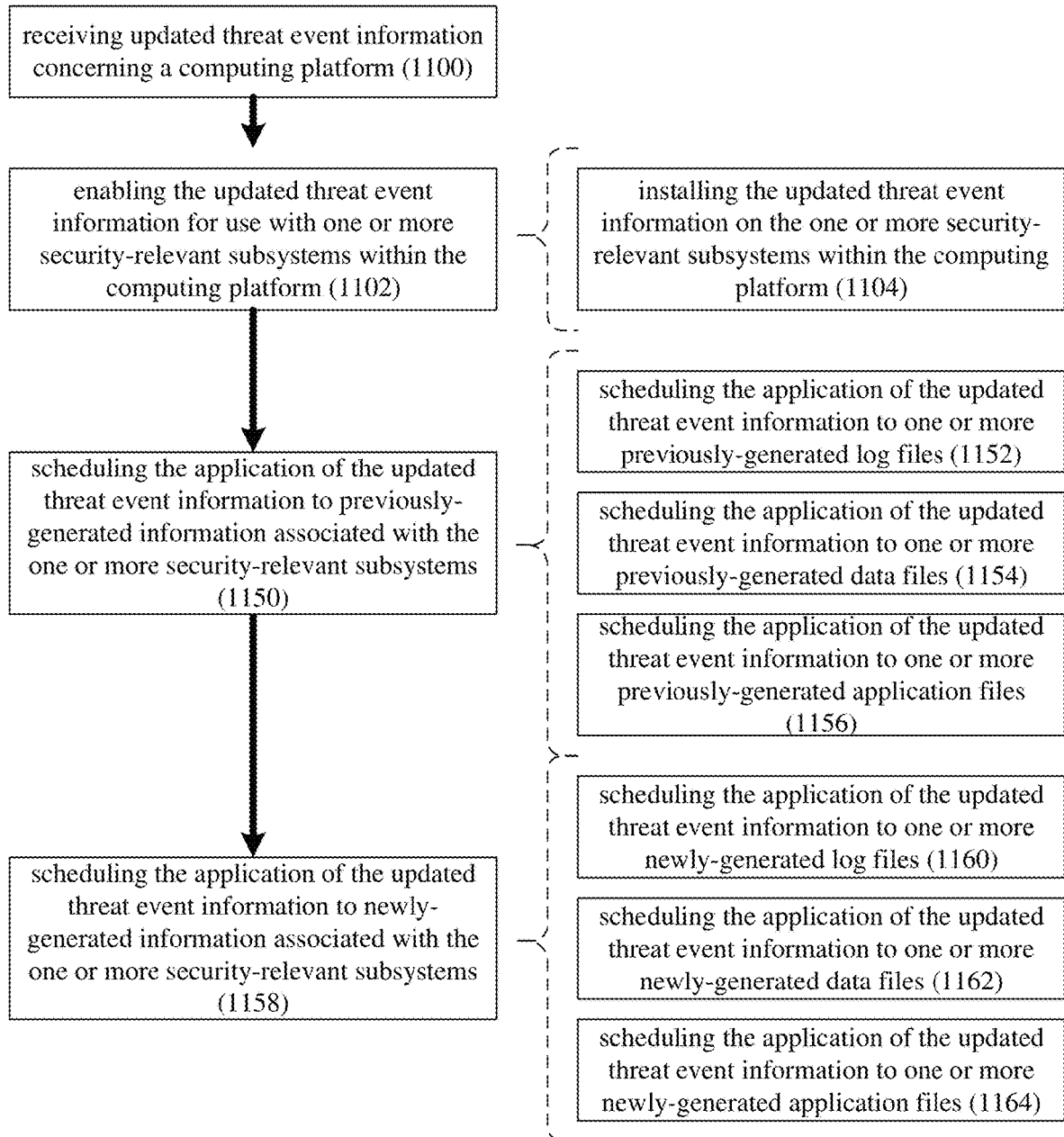

Referring also to FIG. 22, threat mitigation process 10 may be configured to receive updated threat event information 270 for security-relevant subsystems 226. For example and as discussed above, threat mitigation process 10 may receive 1100 updated threat event information 270 concerning computing platform 60, wherein updated threat event information 270 may define one or more of: updated threat listings; updated threat definitions; updated threat methodologies; updated threat sources; and updated threat strategies. Further and as discussed above, threat mitigation process 10 may enable 1102 updated threat event information 270 for use with one or more security-relevant subsystems 226 within computing platform 60. As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

As discussed above and when enabling 1102 updated threat event information 270 for use with one or more security-relevant subsystems 226 within computing platform 60, threat mitigation process 10 may install 1104 updated threat event information 270 on one or more security-relevant subsystems 226 within computing platform 60.

Sometimes, it may not be convenient and/or efficient to immediately apply updated threat event information 270 to security-relevant subsystems 226. Accordingly, threat mitigation process 10 may schedule 1150 the application of updated threat event information 270 to previously-generated information associated with one or more security-relevant subsystems 226.

When scheduling 1150 the application of updated threat event information 270 to previously-generated information associated with one or more security-relevant subsystems 226, threat mitigation process 10 may: schedule 1152 the application of updated threat event information 270 to one or more previously-generated log files (not shown) associated with one or more security-relevant subsystems 226; schedule 1154 the application of updated threat event information 270 to one or more previously-generated data files (not shown) associated with one or more security-relevant subsystems 226; and schedule 1156 the application of updated threat event information 270 to one or more previously-generated application files (not shown) associated with one or more security-relevant subsystems 226.

Additionally, alternatively, threat mitigation process 10 may schedule 1158 the application of the updated threat event information to newly-generated information associated with the one or more security-relevant subsystems.

When scheduling 1158 the application of updated threat event information 270 to newly-generated information associated with one or more security-relevant subsystems 226, threat mitigation process 10 may: schedule 1160 the application of updated threat event information 270 to one or more newly-generated log files (not shown) associated with one or more security-relevant subsystems 226; schedule 1162 the application of updated threat event information 270 to one or more newly-generated data files (not shown) associated with one or more security-relevant subsystems 226; and schedule 1164 the application of updated threat event information 270 to one or more newly-generated application files (not shown) associated with one or more security-relevant subsystems 226.

Figure 23:
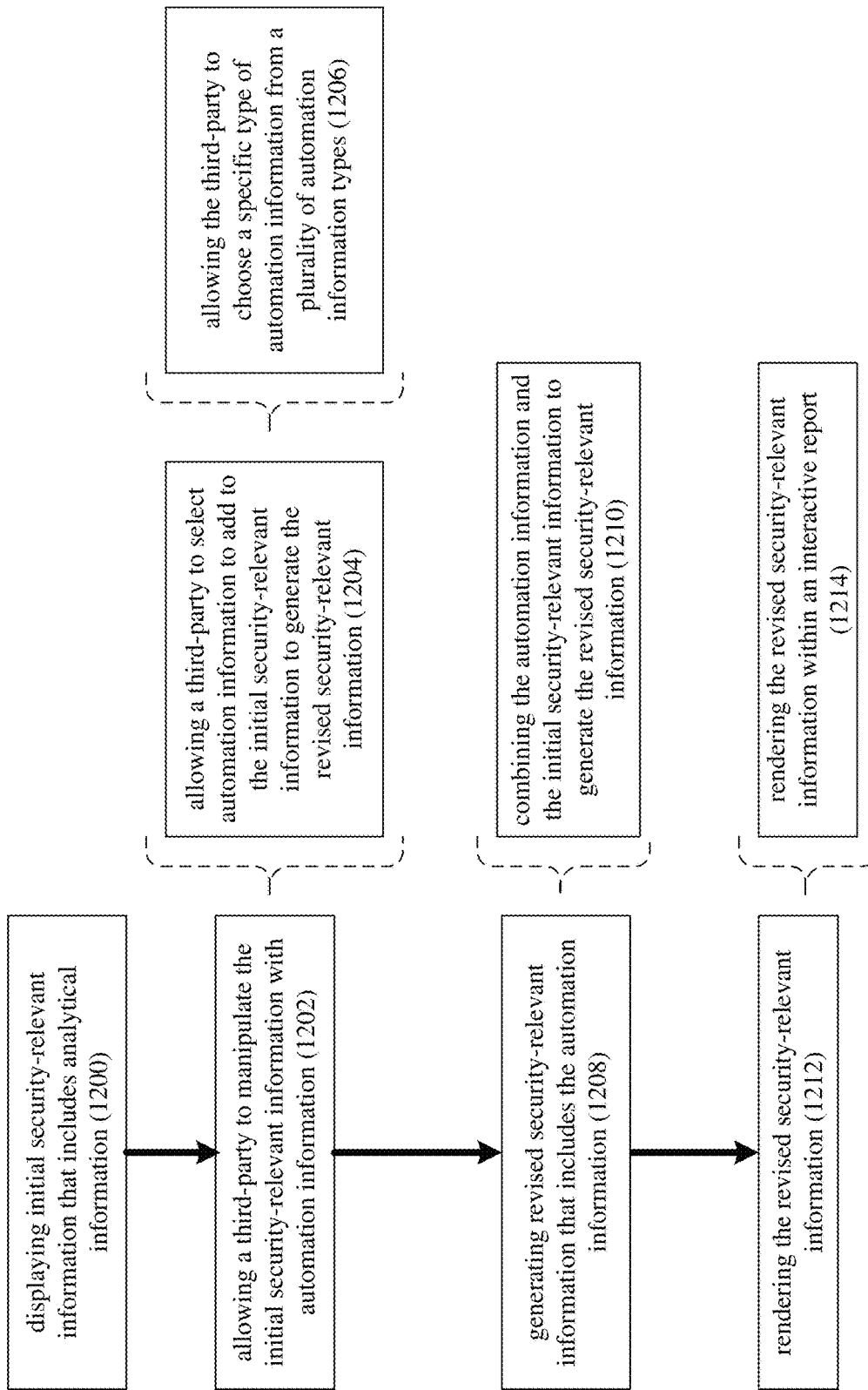
Figure 24:
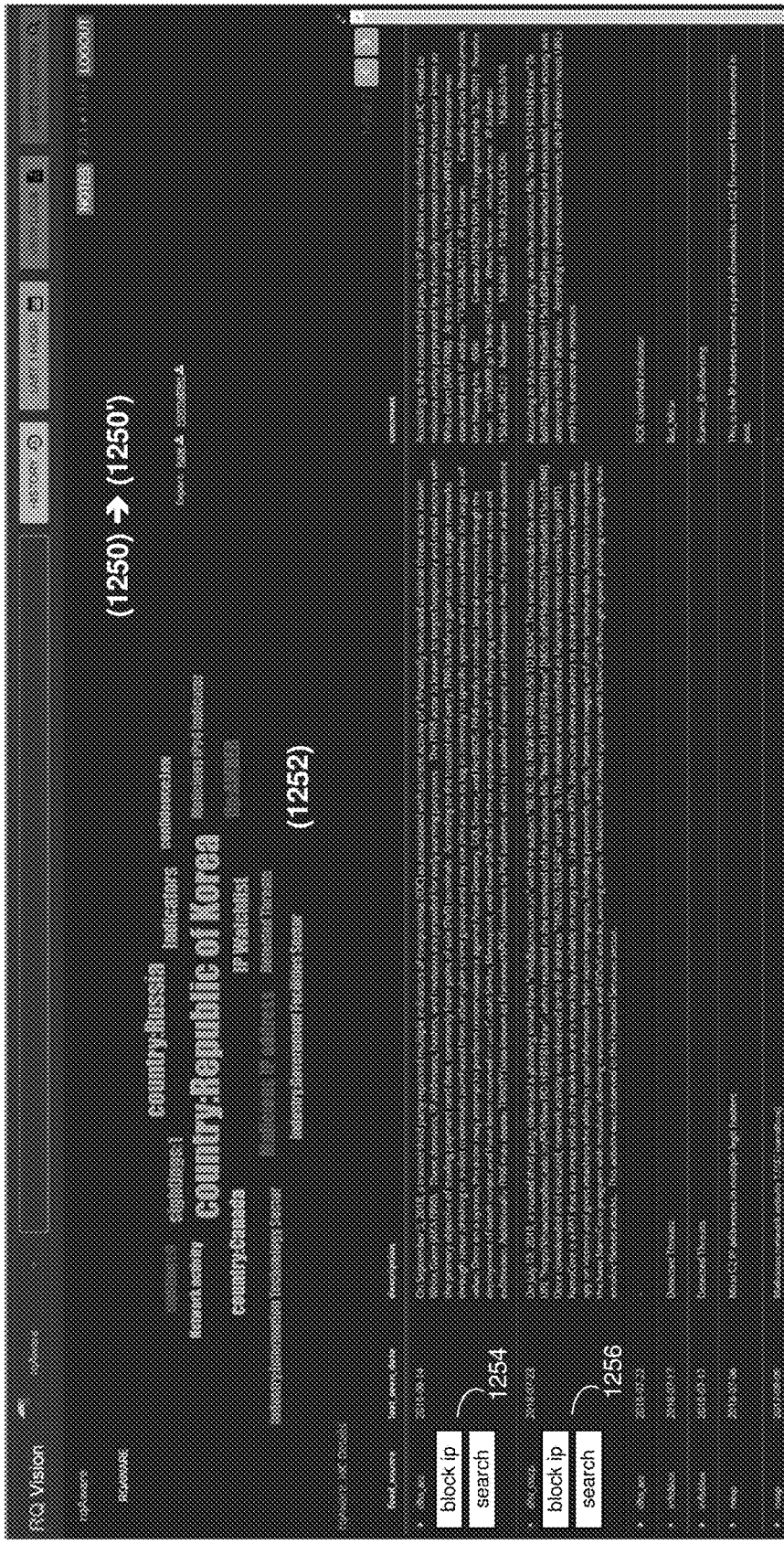
FIG. 24 is a diagrammatic view of a screen rendered by the threat mitigation process of FIG. 1 according to an embodiment of the present disclosure.

Referring also to FIGS. 23-24, threat mitigation process 10 may be configured to initially display analytical data, which may then be manipulated/updated to include automation data. For example, threat mitigation process 10 may display 1200 initial security-relevant information 1250 that includes analytical information (e.g., thought cloud 1252). Examples of such analytical information may include but is not limited to one or more of: investigative information; and hunting information.

Investigative Information (a portion of analytical information): Unified searching and/or automated searching, such as e.g., a security event occurring and searches being performed to gather artifacts concerning that security event.

Hunt Information (a portion of analytical information): Targeted searching/investigations, such as the monitoring and cataloging of the videos that an employee has watched or downloaded over the past 30 days.

Threat mitigation process 10 may allow 1202 a third-party (e.g., the user/owner/operator of computing platform 60) to manipulate initial security-relevant information 1250 with automation information.

Automate Information (a portion of automation): The execution of a single (and possibly simple) action one time, such as the blocking an IP address from accessing computing platform 60 whenever such an attempt is made.

Orchestrate Information (a portion of automation): The execution of a more complex batch (or series) of tasks, such as sensing an unauthorized download via an API and a) shutting down the API, adding the requesting IP address to a blacklist, and closing any ports opened for the requestor.

When allowing 1202 a third-party (e.g., the user/owner/operator of computing platform 60) to manipulate initial security-relevant information 1250 with automation information, threat mitigation process 10 may allow 1204 a third-party (e.g., the user/owner/operator of computing platform 60) to select the automation information to add to initial security-relevant information 1250 to generate revised security-relevant information 1250'. For example and when allowing 1204 a third-party (e.g., the user/owner/operator of computing platform 60) to select the automation information to add to initial security-relevant information 1250 to generate revised security-relevant information 1250', threat mitigation process 10 may allow 1206 the third-party (e.g., the user/owner/operator of computing platform 60) to choose a specific type of automation information from a plurality of automation information types.

For example, the third-party (e.g., the user/owner/operator of computing platform 60) may choose to add/initiate the automation information to generate revised security-relevant information 1250'. Accordingly, threat mitigation process 10 may render selectable options (e.g., selectable buttons 1254, 1256) that the third-party (e.g., the user/owner/operator of computing platform 60) may select to manipulate initial security-relevant information 1250 with automation information to generate revised security-relevant information 1250'. For this particular example, the third-party (e.g., the user/owner/operator of computing platform 60) may choose two different options to manipulate initial security-relevant information 1250, namely: "block ip" or "search", both of which will result in threat mitigation process 10 generating 1208 revised security-relevant information 1250' (that includes the above-described automation information).

When generating 1208 revised security-relevant information 1250' (that includes the above-described automation information), threat mitigation process 10 may combine 1210 the automation information (that results from selecting "block IP" or "search") and initial security-relevant information 1250 to generate and render 1212 revised security-relevant information 1250'.

When rendering 1212 revised security-relevant information 1250', threat mitigation process 10 may render 1214 revised security-relevant information 1250' within interactive report 1258.

Training Routine Generation and Execution

As will be discussed below in greater detail, threat mitigation process 10 may be configured to allow for the manual or automatic generation of training routines, as well as the execution of the same.

Figure 25:
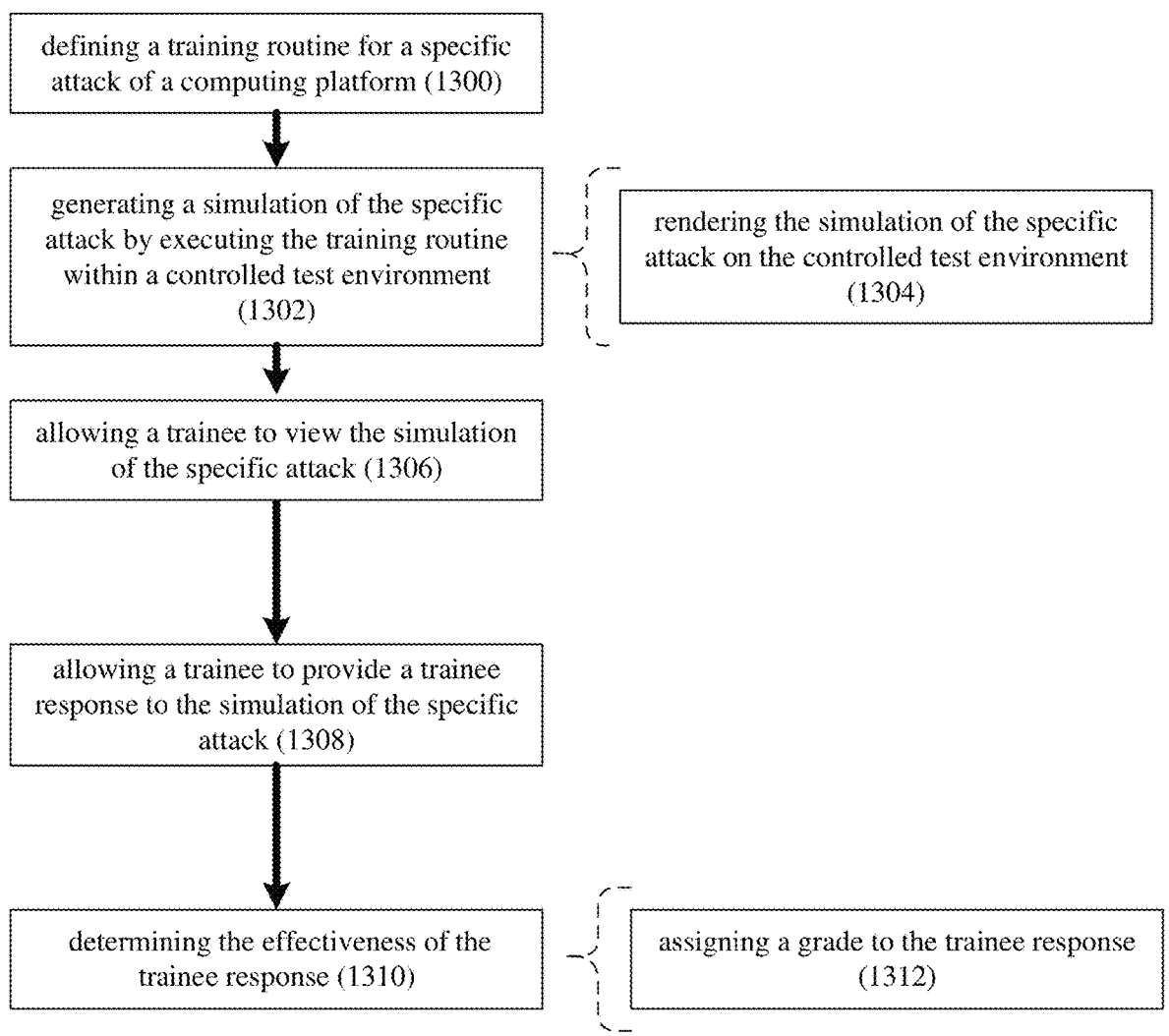
FIGS. 25-31 are flowcharts of other implementations of the threat mitigation process of FIG. 1 according to an embodiment of the present disclosure.

Referring also to FIG. 25, threat mitigation process 10 may be configured to allow for the manual generation of testing routine 272. For example, threat mitigation process 10 may define 1300 training routine 272 for a specific attack (e.g., a Denial of Services attack) of computing platform 60. Specifically, threat mitigation process 10 may generate 1302 a simulation of the specific attack (e.g., a Denial of Services attack) by executing training routine 272 within a controlled test environment, an example of which may include but is not limited to virtual machine 274 executed on a computing device (e.g., computing device 12).

When generating 1302 a simulation of the specific attack (e.g., a Denial of Services attack) by executing training routine 272 within the controlled test environment (e.g., virtual machine 274), threat mitigation process 10 may render 1304 the simulation of the specific attack (e.g., a Denial of Services attack) on the controlled test environment (e.g., virtual machine 274).

Threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

Figure 26:
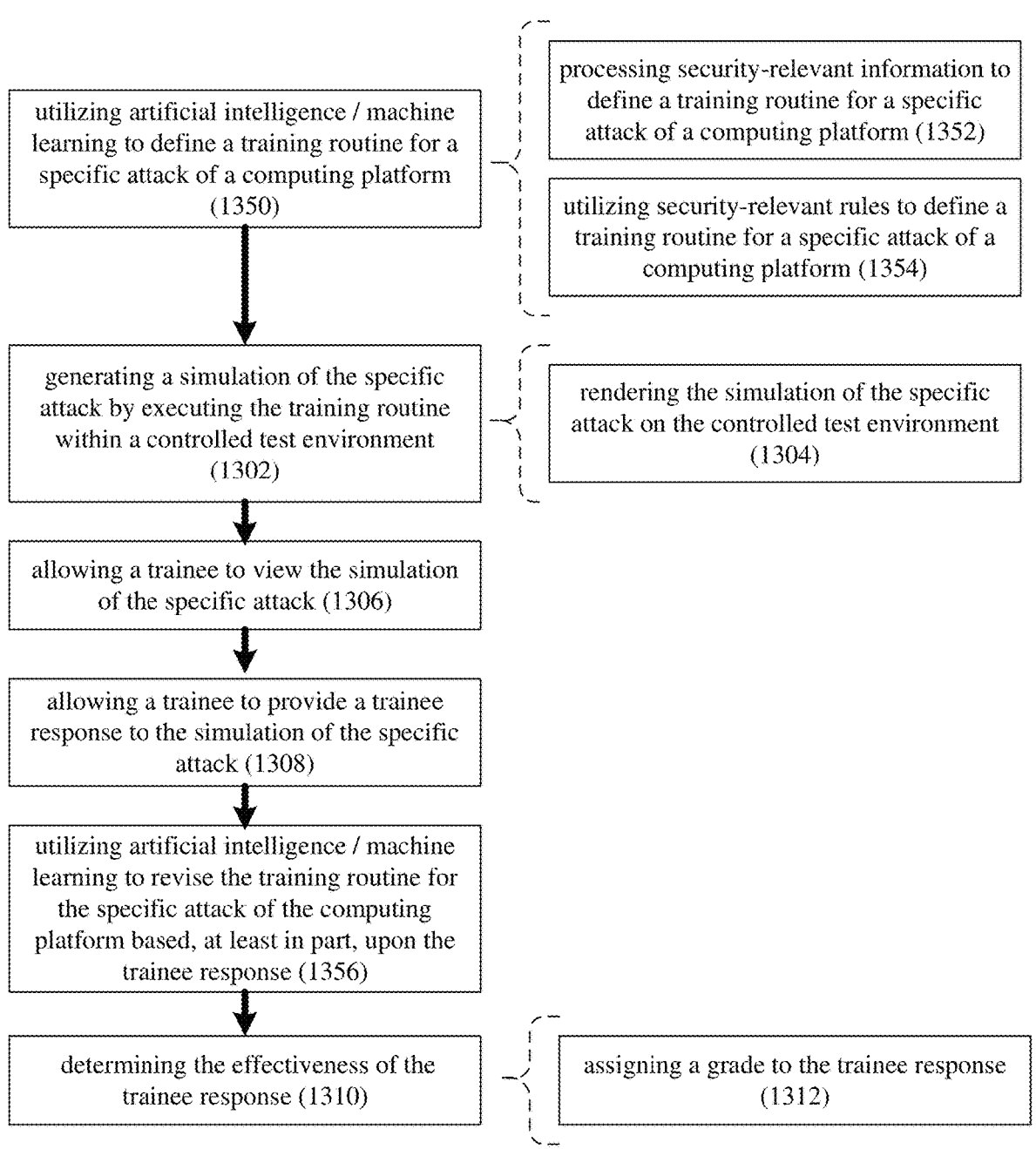

Referring also to FIG. 26, threat mitigation process 10 may be configured to allow for the automatic generation of testing routine 272. For example, threat mitigation process 10 may utilize 1350 artificial intelligence/machine learning to define training routine 272 for a specific attack (e.g., a Denial of Services attack) of computing platform 60.

As discussed above and with respect to artificial intelligence/machine learning being utilized to process data sets, an initial probabilistic model may be defined, wherein this initial probabilistic model may be subsequently (e.g., iteratively or continuously) modified and revised, thus allowing the probabilistic models and the artificial intelligence systems (e.g., probabilistic process 56) to "learn" so that future probabilistic models may be more precise and may explain more complex data sets. As further discussed above, probabilistic process 56 may define an initial probabilistic model for accomplishing a defined task (e.g., the analyzing of information 58), wherein the probabilistic model may be utilized to go from initial observations about information 58 (e.g., as represented by the initial branches of a probabilistic model) to conclusions about information 58 (e.g., as represented by the leaves of a probabilistic model). Accordingly and through the use of probabilistic process 56, information may be processed so that a probabilistic model may be defined (and subsequently revised) to define training routine 272 for a specific attack (e.g., a Denial of Services attack) of computing platform 60.

When using 1350 artificial intelligence/machine learning to define training routine 272 for a specific attack (e.g., a Denial of Services attack) of computing platform 60, threat mitigation process 10 may process 1352 security-relevant information to define training routine 272 for specific attack (e.g., a Denial of Services attack) of computing platform 60. Further and when using 1350 artificial intelligence/machine learning to define training routine 272 for a specific attack (e.g., a Denial of Services attack) of computing platform 60, threat mitigation process 10 may utilize 1354 security-relevant rules to define training routine 272 for a specific attack (e.g., a Denial of Services attack) of computing platform 60. Accordingly, security-relevant information that e.g., defines the symptoms of e.g., a Denial of Services attack and security-relevant rules that define the behavior of e.g., a Denial of Services attack may be utilized by threat mitigation process 10 when defining training routine 272.

As discussed above, threat mitigation process 10 may generate 1302 a simulation of the specific attack (e.g., a Denial of Services attack) by executing training routine 272 within a controlled test environment, an example of which may include but is not limited to virtual machine 274 executed on a computing device (e.g., computing device 12.

Further and as discussed above, when generating 1302 a simulation of the specific attack (e.g., a Denial of Services attack) by executing training routine 272 within the controlled test environment (e.g., virtual machine 274), threat mitigation process 10 may render 1304 the simulation of the specific attack (e.g., a Denial of Services attack) on the controlled test environment (e.g., virtual machine 274).

Threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Threat mitigation process 10 may utilize 1356 artificial intelligence/machine learning to revise training routine 272 for the specific attack (e.g., a Denial of Services attack) of computing platform 60 based, at least in part, upon trainee response 278.

As discussed above, threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

Figure 27:
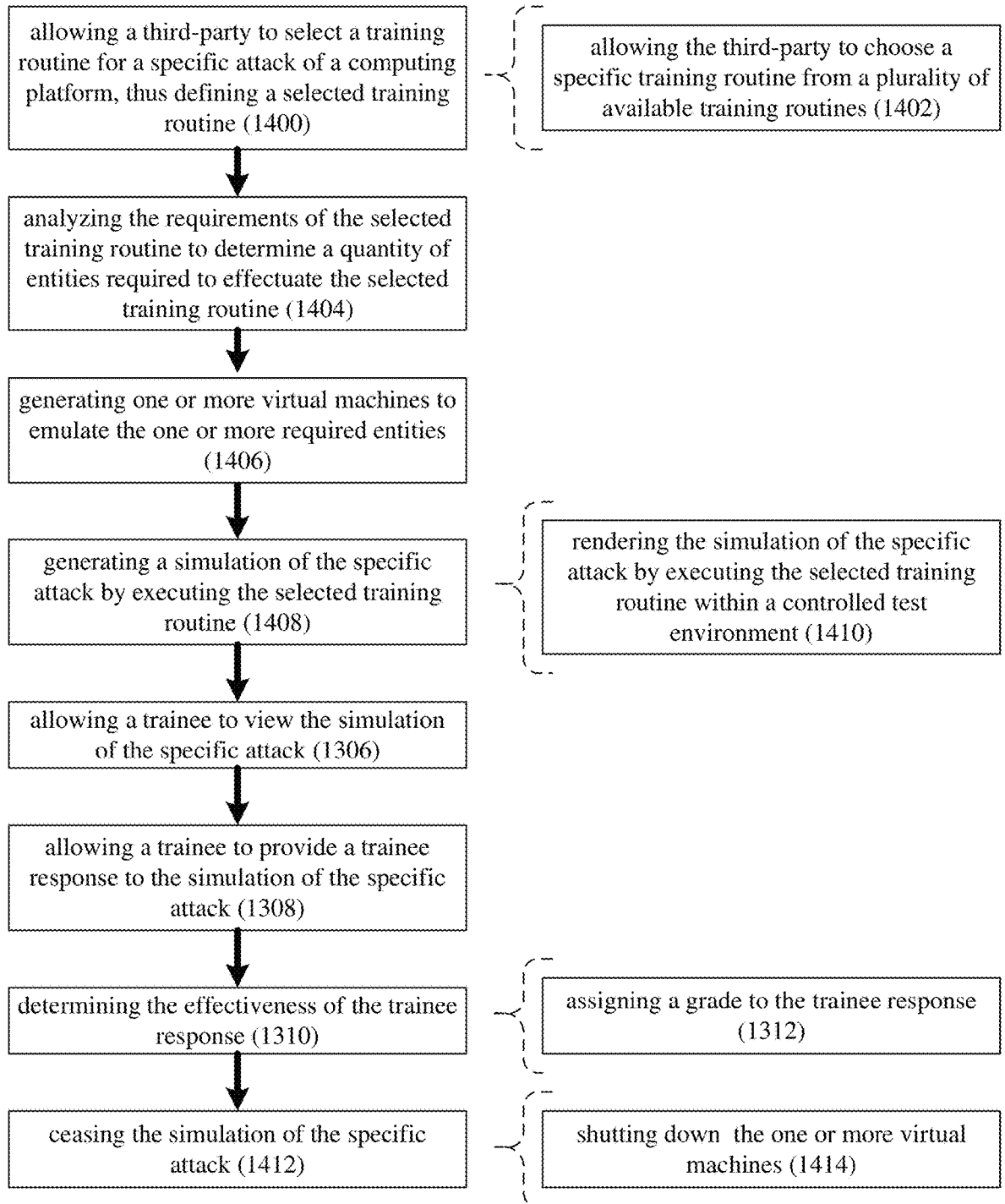

Referring also to FIG. 27, threat mitigation process 10 may be configured to allow a trainee to choose their training routine. For example mitigation process 10 may allow 1400 a third-party (e.g., the user/owner/operator of computing platform 60) to select a training routine for a specific attack (e.g., a Denial of Services attack) of computing platform 60, thus defining a selected training routine. When allowing 1400 a third-party (e.g., the user/owner/operator of computing platform 60) to select a training routine for a specific attack (e.g., a Denial of Services attack) of computing platform 60, threat mitigation process 10 may allow 1402 the third-party (e.g., the user/owner/operator of computing platform 60) to choose a specific training routine from a plurality of available training routines. For example, the third-party (e.g., the user/owner/operator of computing platform 60) may be able to select a specific type of attack (e.g., DDoS events, DoS events, phishing events, spamming events, malware events, web attacks, and exploitation events) and/or select a specific training routine (that may or may not disclose the specific type of attack).

Once selected, threat mitigation process 10 may analyze 1404 the requirements of the selected training routine (e.g., training routine 272) to determine a quantity of entities required to effectuate the selected training routine (e.g., training routine 272), thus defining one or more required entities. For example, assume that training routine 272 has three required entities (e.g., an attacked device and two attacking devices). According, threat mitigation process 10 may generate 1406 one or more virtual machines (e.g., such as virtual machine 274) to emulate the one or more required entities. In this particular example, threat mitigation process 10 may generate 1406 three virtual machines, a first VM for the attacked device, a second VM for the first attacking device and a third VM for the second attacking device. As is known in the art, a virtual machine (VM) is an virtual emulation of a physical computing system. Virtual machines may be based on computer architectures and may provide the functionality of a physical computer, wherein their implementations may involve specialized hardware, software, or a combination thereof.

Threat mitigation process 10 may generate 1408 a simulation of the specific attack (e.g., a Denial of Services attack) by executing the selected training routine (e.g., training routine 272). When generating 1408 the simulation of the specific attack (e.g., a Denial of Services attack) by executing the selected training routine (e.g., training routine 272), threat mitigation process 10 may render 1410 the simulation of the specific attack (e.g., a Denial of Services attack) by executing the selected training routine (e.g., training routine 272) within a controlled test environment (e.g., such as virtual machine 274).

As discussed above, threat mitigation process 10 may allow 1306 a trainee (e.g., trainee 276) to view the simulation of the specific attack (e.g., a Denial of Services attack) and may allow 1308 the trainee (e.g., trainee 276) to provide a trainee response (e.g., trainee response 278) to the simulation of the specific attack (e.g., a Denial of Services attack). For example, threat mitigation process 10 may execute training routine 272, which trainee 276 may "watch" and provide trainee response 278.

Further and as discussed above, threat mitigation process 10 may then determine 1310 the effectiveness of trainee response 278, wherein determining 1310 the effectiveness of the trainee response may include threat mitigation process 10 assigning 1312 a grade (e.g., a letter grade or a number grade) to trainee response 278.

When training is complete, threat mitigation process 10 may cease 1412 the simulation of the specific attack (e.g., a Denial of Services attack), wherein ceasing 1412 the simulation of the specific attack (e.g., a Denial of Services attack) may include threat mitigation process 10 shutting down 1414 the one or more virtual machines (e.g., the first VM for the attacked device, the second VM for the first attacking device and the third VM for the second attacking device).

Information Routing

As will be discussed below in greater detail, threat mitigation process 10 may be configured to route information based upon whether the information is more threat-pertinent or less threat-pertinent.

Figure 28:
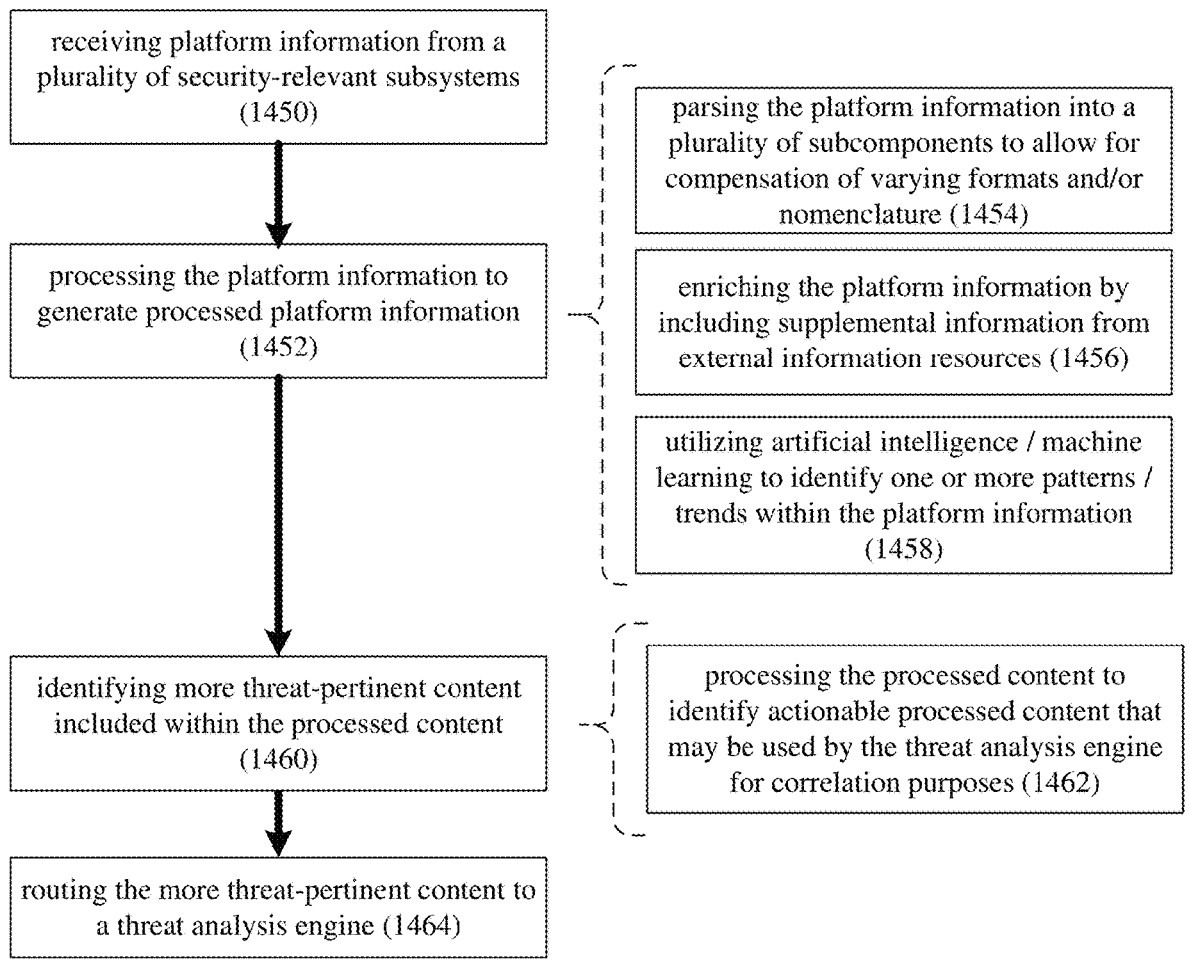

Referring also to FIG. 28, threat mitigation process 10 may be configured to route more threat-pertinent content in a specific manner. For example, threat mitigation process 10 may receive 1450 platform information (e.g., log files) from a plurality of security-relevant subsystems (e.g., security-relevant subsystems 226). As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform.

Threat mitigation process 10 may process 1452 this platform information (e.g., log files) to generate processed platform information. And when processing 1452 this platform information (e.g., log files) to generate processed platform information, threat mitigation process 10 may: parse 1454 the platform information (e.g., log files) into a plurality of subcomponents (e.g., columns, rows, etc.) to allow for compensation of varying formats and/or nomenclature; enrich 1456 the platform information (e.g., log files) by including supplemental information from external information resources; and/or utilize 1458 artificial intelligence/machine learning (in the manner described above) to identify one or more patterns/trends within the platform information (e.g., log files).

Threat mitigation process 10 may identify 1460 more threat-pertinent content 280 included within the processed content, wherein identifying 1460 more threat-pertinent content 280 included within the processed content may include processing 1462 the processed content to identify actionable processed content that may be used by a threat analysis engine (e.g., SIEM system 230) for correlation purposes. Threat mitigation process 10 may route 1464 more threat-pertinent content 280 to this threat analysis engine (e.g., SIEM system 230).

Figure 29:
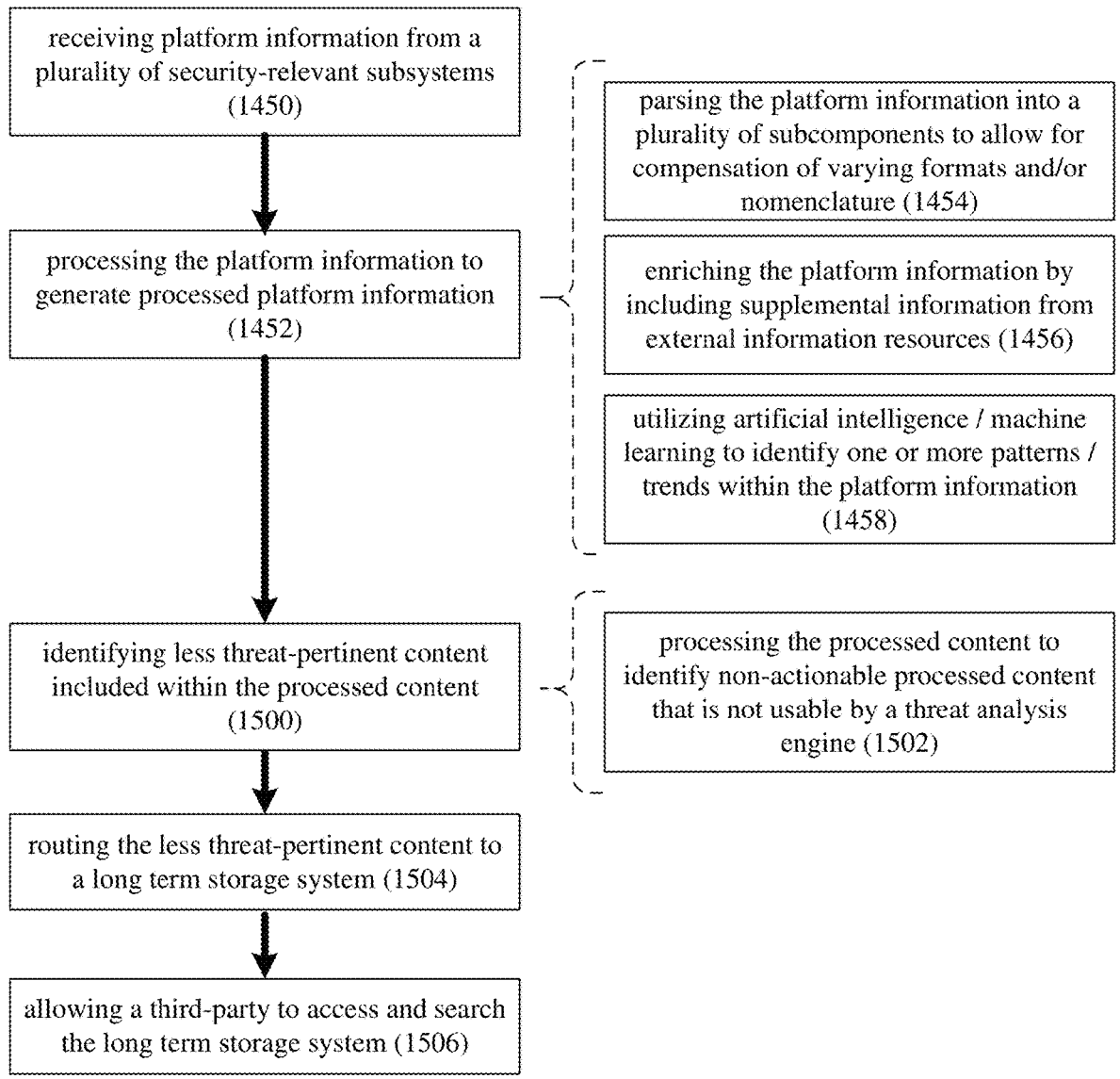

Referring also to FIG. 29, threat mitigation process 10 may be configured to route less threat-pertinent content in a specific manner. For example and as discussed above, threat mitigation process 10 may receive 1450 platform information (e.g., log files) from a plurality of security-relevant subsystems (e.g., security-relevant subsystems 226). As discussed above, examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, Antivirus systems, operating systems, data lakes; data logs; security-relevant software applications; security-relevant hardware systems; and resources external to the computing platform Further and as discussed above, threat mitigation process 10 may process 1452 this platform information (e.g., log files) to generate processed platform information. And when processing 1452 this platform information (e.g., log files) to generate processed platform information, threat mitigation process 10 may: parse 1454 the platform information (e.g., log files) into a plurality of subcomponents (e.g., columns, rows, etc.) to allow for compensation of varying formats and/or nomenclature; enrich 1456 the platform information (e.g., log files) by including supplemental information from external information resources; and/or utilize 1458 artificial intelligence/machine learning (in the manner described above) to identify one or more patterns/trends within the platform information (e.g., log files).

Threat mitigation process 10 may identify 1500 less threat-pertinent content 282 included within the processed content, wherein identifying 1500 less threat-pertinent content 282 included within the processed content may include processing 1502 the processed content to identify non-actionable processed content that is not usable by a threat analysis engine (e.g., SIEM system 230) for correlation purposes. Threat mitigation process 10 may route 1504 less threat-pertinent content 282 to a long term storage system (e.g., long term storage system 284). Further, threat mitigation process 10 may be configured to allow 1506 a third-party (e.g., the user/owner/operator of computing platform 60) to access and search long term storage system 284.

Automated Analysis

As will be discussed below in greater detail, threat mitigation process 10 may be configured to automatically analyze a detected security event.

Figure 30:
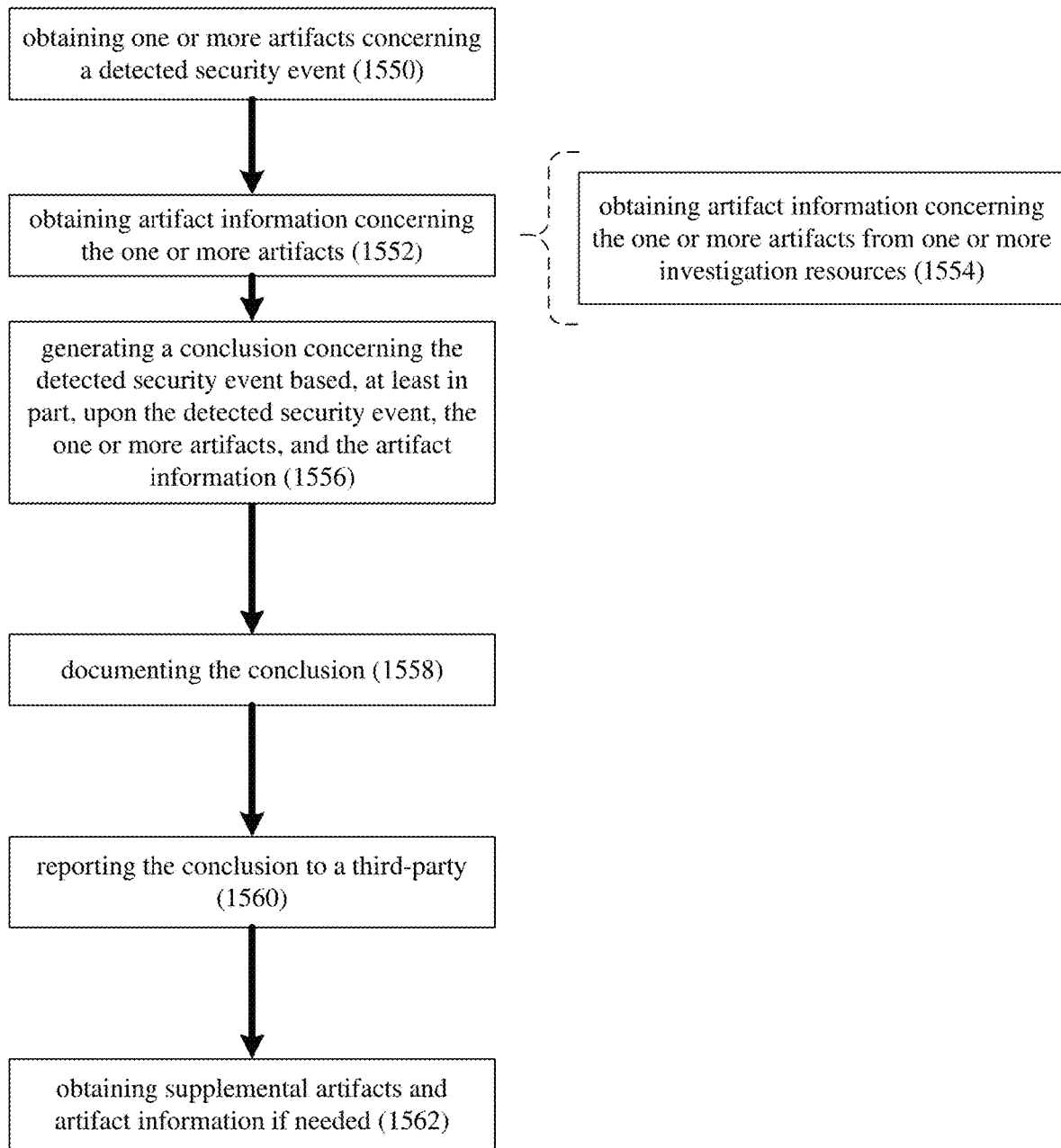

Referring also to FIG. 30, threat mitigation process 10 may be configured to automatically classify and investigate a detected security event. As discussed above and in response to a security event being detected, threat mitigation process 10 may obtain 1550 one or more artifacts (e.g., artifacts 250) concerning the detected security event. Examples of such a detected security event may include but are not limited to one or more of: access auditing; anomalies; authentication; denial of services; exploitation; malware; phishing; spamming; reconnaissance; and web attack. These artifacts (e.g., artifacts 250) may be obtained 1550 from a plurality of sources associated with the computing platform, wherein examples of such plurality of sources may include but are not limited to the various log files maintained by SIEM system 230, and the various log files directly maintained by the security-relevant subsystems Threat mitigation process 10 may obtain 1552 artifact information (e.g., artifact information 286) concerning the one or more artifacts (e.g., artifacts 250), wherein artifact information 286 may be obtained from information resources include within (or external to) computing platform 60.

For example and when obtaining 1552 artifact information 286 concerning the one or more artifacts (e.g., artifacts 250), threat mitigation process 10 may obtain 1554 artifact information 286 concerning the one or more artifacts (e.g., artifacts 250) from one or more investigation resources (such as third-party resources that may e.g., provide information on known bad actors).

Once the investigation is complete, threat mitigation process 10 may generate 1556 a conclusion (e.g., conclusion 288) concerning the detected security event (e.g., a Denial of Services attack) based, at least in part, upon the detected security event (e.g., a Denial of Services attack), the one or more artifacts (e.g., artifacts 250), and artifact information 286. Threat mitigation process 10 may document 1558 the conclusion (e.g., conclusion 288), report 1560 the conclusion (e.g., conclusion 288) to a third-party (e.g., the user/owner/operator of computing platform 60). Further, threat mitigation process 10 may obtain 1562 supplemental artifacts and artifact information (if needed to further the investigation).

While the system is described above as being computer-implemented, this is for illustrative purposes only and is not intended to be a limitation of this disclosure, as other configurations are possible and are considered to be within the scope of this disclosure. For example, some or all of the above-described system may be implemented by a human being.

Concept 1:

As discussed above, threat mitigation process 10 may be configured to e.g., analyze a monitored computing platform (e.g., computing platform 60) and provide information to third-parties concerning the same. Further and as discussed above, such a monitored computing platform (e.g., computing platform 60) may be a highly complex, multi-location computing system/network that may span multiple buildings/locations/countries.

For this illustrative example, the monitored computing platform (e.g., computing platform 60) is shown to include many discrete computing devices, examples of which may include but are not limited to: server computers (e.g., server computers 200, 202), desktop computers (e.g., desktop computer 204), and laptop computers (e.g., laptop computer 206), all of which may be coupled together via a network (e.g., network 208), such as an Ethernet network. Computing platform 60 may be coupled to an external network (e.g., Internet 210) through WAF (i.e., Web Application Firewall) 212. A wireless access point (e.g., WAP 214) may be configured to allow wireless devices (e.g., smartphone 216) to access computing platform 60. Computing platform 60 may include various connectivity devices that enable the coupling of devices within computing platform 60, examples of which may include but are not limited to: switch 216, router 218 and gateway 220. Computing platform 60 may also include various storage devices (e.g., NAS 222), as well as functionality (e.g., API Gateway 224) that allows software applications to gain access to one or more resources within computing platform 60.

In addition to the devices and functionality discussed above, other technology (e.g., security-relevant subsystems 226) may be deployed within computing platform 60 to monitor the operation of (and the activity within) computing platform 60. Examples of security-relevant subsystems 226 may include but are not limited to: CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform. Each of security-relevant subsystems 226 may monitor and log their activity with respect to computing platform 60, resulting in the generation of platform information 228. For example, platform information 228 associated with a client-defined MDM (i.e., Mobile Device Management) system may monitor and log the mobile devices that were allowed access to computing platform 60.

Further, SEIM (i.e., Security Information and Event Management) system 230 may be deployed within computing platform 60. As is known in the art, STEM system 230 is an approach to security management that combines SIM (security information management) functionality and SEM (security event management) functionality into one security management system. The underlying principles of a SIEM system is to aggregate relevant data from multiple sources, identify deviations from the norm and take appropriate action. For example, when a security event is detected, SIEM system 230 might log additional information, generate an alert and instruct other security controls to mitigate the security event. Accordingly, STEM system 230 may be configured to monitor and log the activity of security-relevant subsystems 226 (e.g., CDN (i.e., Content Delivery Network) systems; DAM (i.e., Database Activity Monitoring) systems; UBA (i.e., User Behavior Analytics) systems; MDM (i.e., Mobile Device Management) systems; IAM (i.e., Identity and Access Management) systems; DNS (i.e., Domain Name Server) systems, antivirus systems, operating systems, data lakes; data logs; security-relevant software applications; security-relevant hardware systems; and resources external to the computing platform).

As would be expected, threat mitigation process 10 may be highly-complex and may be installed onto computing platform 60 in various stages. For example, threat mitigation process 10 may include a plurality of threat detection capability modules (e.g., threat detection capability modules 290, FIG. 3), wherein these threat detections capability modules (e.g., threat detection capability modules 290) may include various discrete items, examples of which may include but are not limited to threat detection rules, threat detection applications/applets, threat detection routines, threat detection lists, threat detection definitions, software/hardware drivers, software/firmware updates, software patches, APIs, functionality modules, etc. Accordingly, the installation of such threat detection capability modules (e.g., threat detection capability modules 290) may be similar to the installation of upgrades that are made to software platforms and/or similar to the staged installation of a software platform.

Figure 31:
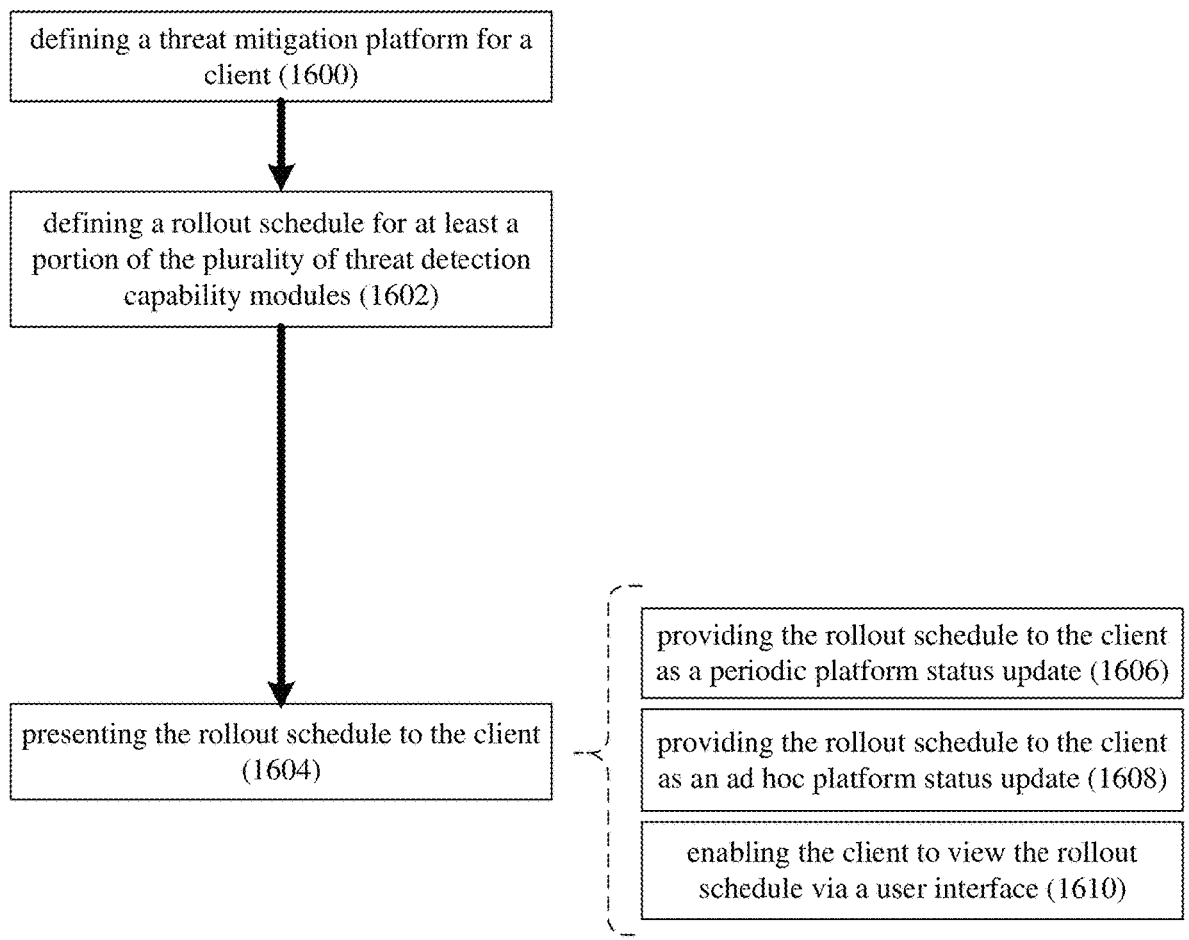

Accordingly and as could be imagined, the complete installation of threat mitigation process 10 may take a considerable amount of time. For example and referring also to FIG. 31, threat mitigation process 10 may define 1600 a threat mitigation platform (e.g., a specific installation of threat mitigation process 10) for a client (e.g., user/owner/operator of computing platform 60). This threat mitigation platform (e.g., a specific installation of threat mitigation process 10) may include a plurality of threat detection capability modules (e.g., threat detection capability modules 290). As discussed above, the complete installation of threat mitigation process 10 may take a considerable amount of time.

Figure 32:
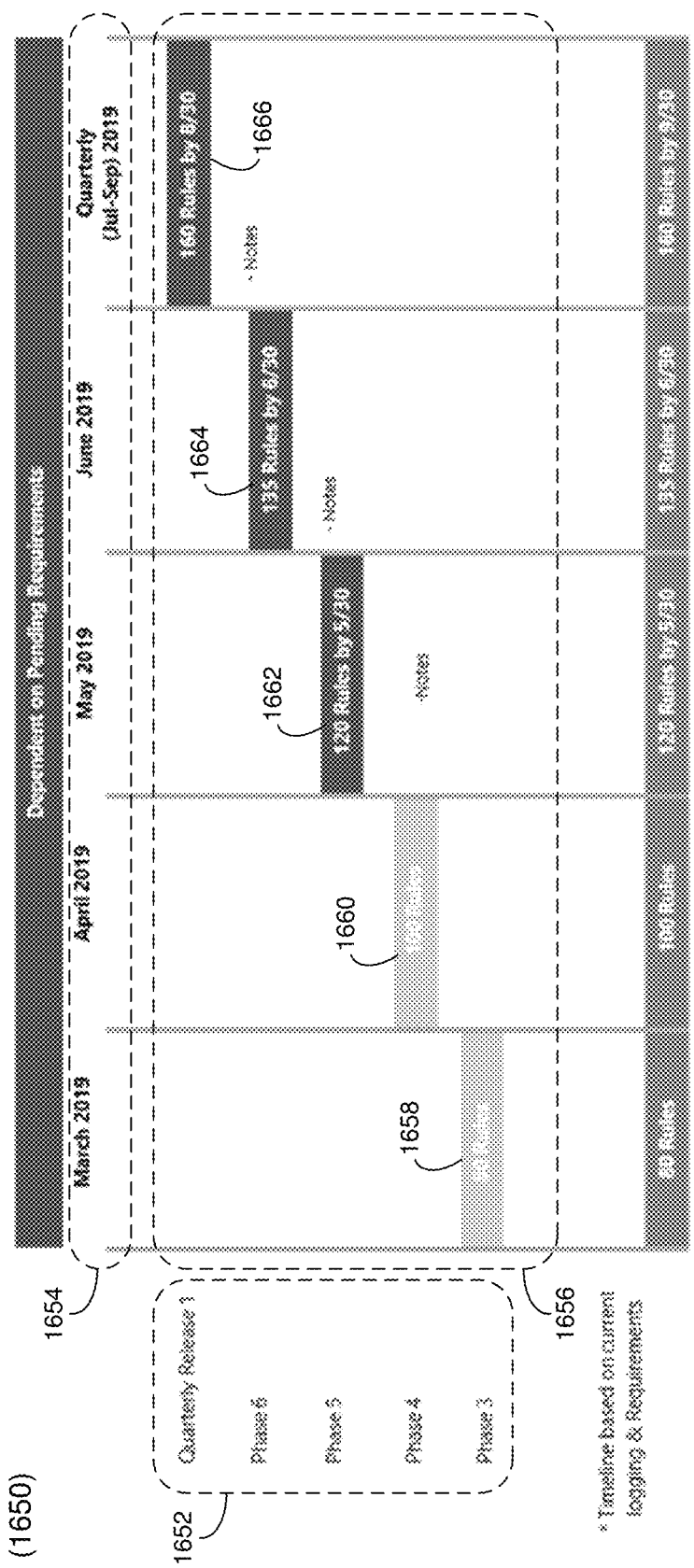
FIG. 32 is a diagrammatic view of a screen rendered by the threat mitigation process of FIG. 1 according to an embodiment of the present disclosure.

Accordingly and referring also to FIG. 32, threat mitigation process 10 may define 1602 a rollout schedule (e.g., rollout schedule 1650) for at least a portion of the plurality of threat detection capability modules (e.g., threat detection capability modules 290). This rollout schedule (e.g., rollout schedule 1650) may be a graphical rollout schedule and/or a text-based rollout schedule. For example, rollout schedule 1650 is shown to include text-based portion 1652 that defines the various rollout phases, text-based portion 1654 that defines rollout phase dates, and graphical timeline 1656 that shows the temporal positioning of the various threat detection capability modules (e.g., threat detection capability modules 290). Additionally, the rollout schedule (e.g., rollout schedule 1650) may define a date for each of the plurality of threat detection capability modules (e.g., threat detection capability modules 290) and may define a content for each of the plurality of threat detection capability modules (e.g., threat detection capability modules 290).

For example and in this particular implementation, rollout schedule 1650 is shown to illustrate the following:

- a first threat detection capability module (e.g., threat detection capability module 1658) having been installed in March 2019, which brought the total rule count up to 80 rules;
- a second threat detection capability module (e.g., threat detection capability module 1660) having been installed in April 2019, which brought the total rule count up to 100 rules;
- a third threat detection capability module (e.g., threat detection capability module 1662) to be installed in May 2019, which brought the total rule count up to 120 rules;
- a fourth threat detection capability module (e.g., threat detection capability module 1664) to be installed in June 2019, which brought the total rule count up to 135 rules; and
- a fifth threat detection capability module (e.g., threat detection capability module 1666) to be installed in July-September 2019, which brought the total rule count up to 160 rules.

Threat mitigation process 10 may be configured to present 1604 the rollout schedule (e.g., rollout schedule 1650) to the client (e.g., user/owner/operator of computing platform 60).

When presenting 1604 the rollout schedule (e.g., rollout schedule 1650) to the client (e.g., user/owner/operator of computing platform 60), threat mitigation process 10 may provide 1606 the rollout schedule (e.g., rollout schedule 1650) to the client (e.g., user/owner/operator of computing platform 60) as a periodic platform status update. For example, threat mitigation process 10 may proactively provide 1606 the rollout schedule (e.g., rollout schedule 1650) to the client (e.g., user/owner/operator of computing platform 60) as e.g., a printed document, an electronic document and/or an email attachment that is part of a periodic report.

Additionally/alternatively and when presenting 1604 the rollout schedule (e.g., rollout schedule 1650) to the client (e.g., user/owner/operator of computing platform 60), threat mitigation process 10 may provide 1608 the rollout schedule (e.g., rollout schedule 1650) to the client (e.g., user/owner/operator of computing platform 60) as an ad hoc platform status update. For example, threat mitigation process 10 may reactively provide 1608 the rollout schedule (e.g., rollout schedule 1650) to the client (e.g., user/owner/operator of computing platform 60) as e.g., a printed document, an electronic document and/or an email attachment in response to a request from the client (e.g., user/owner/operator of computing platform 60).

Additionally/alternatively and when presenting 1604 the rollout schedule (e.g., rollout schedule 1650) to the client (e.g., user/owner/operator of computing platform 60), threat mitigation process 10 may enable 1610 the client (e.g., user/owner/operator of computing platform 60) to view the rollout schedule (e.g., rollout schedule 1650) via a user interface. For example, threat mitigation process 10 may enable 1610 the client (e.g., user/owner/operator of computing platform 60) to view the rollout schedule (e.g., rollout schedule 1650) via a user interface accessible via a desktop computer (e.g., desktop computer 204, FIG. 3).

Concept 2:

As will be discussed below, threat mitigation process 10 may be configured to provide information (e.g., to the client) concerning the efficacy of threat mitigation process 10 as it is currently installed and operating on the monitored computing platform (e.g., computing platform 60).

Figure 33:
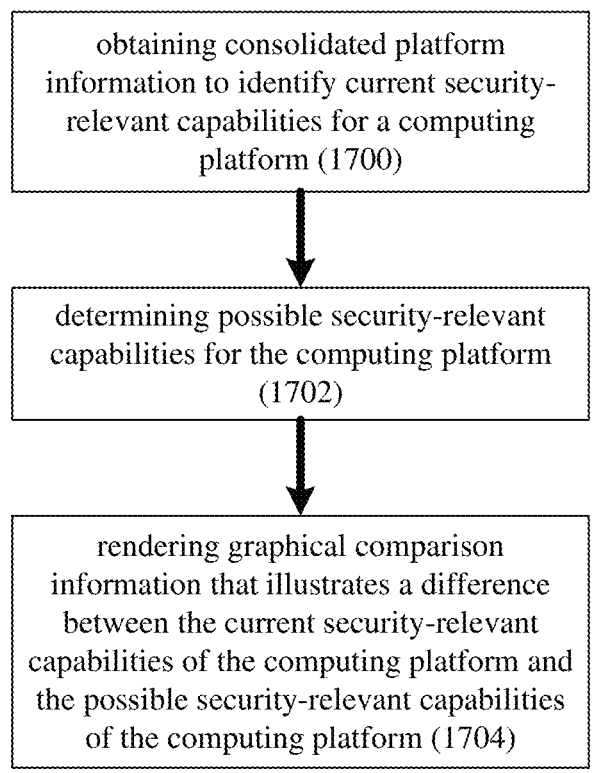
FIG. 33 is a flowchart of another implementation of the threat mitigation process of FIG. 1 according to an embodiment of the present disclosure.

As discussed above and referring also to FIG. 33, threat mitigation process 10 may obtain 1700 consolidated platform information to identify current security-relevant capabilities for a computing platform (e.g., computing platform 60). This consolidated platform information may be obtained from an independent information source (e.g., such as STEM system 230 that may provide system-defined consolidated platform information 236) and/or may be obtained from a client information source (e.g., such as questionnaires 240 that may provide client-defined consolidated platform information 238.

Threat mitigation process 10 may then determine 1702 possible security-relevant capabilities for computing platform 60 (i.e., the difference between the current security-relevant capabilities of computing platform 60 and the possible security-relevant capabilities of computing platform 60. For example, the possible security-relevant capabilities may concern the possible security-relevant capabilities of computing platform 60 using the currently-deployed security-relevant subsystems. Additionally/alternatively, the possible security-relevant capabilities may concern the possible security-relevant capabilities of computing platform 60 using one or more supplemental security-relevant subsystems.

Figure 34:
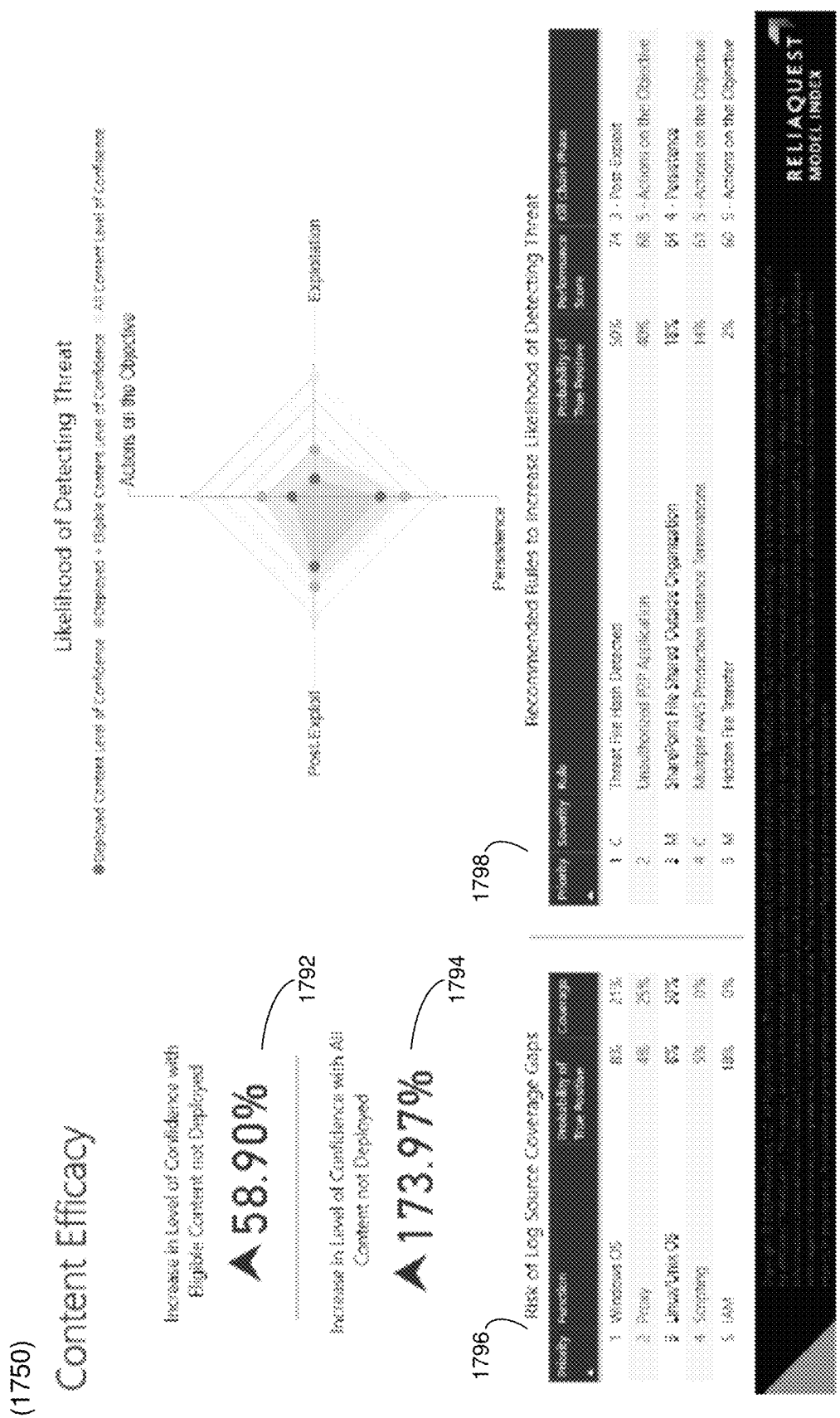
FIG. 34-35 are diagrammatic views of screens rendered by the threat mitigation process of FIG. 1 according to an embodiment of the present disclosure.

Referring also to FIG. 34, threat mitigation process 10 may render 1704 graphical comparison information (e.g., graphical comparison information 1750) that illustrates a difference between the current security-relevant capabilities of the computing platform (e.g., computing platform 60) and the possible security-relevant capabilities of the computing platform (e.g., computing platform 60). Such graphical comparison information (e.g., graphical comparison information 1750) may identify security-relevant deficiencies of the computing platform (e.g., computing platform 60).

The graphical comparison information (e.g., graphical comparison information 1750) that illustrates a difference between the current security-relevant capabilities of the computing platform (e.g., computing platform 60) and the possible security-relevant capabilities of the computing platform (e.g., computing platform 60) may include: multi-axial comparison information that illustrates the difference between the current security-relevant capabilities of the computing platform (e.g., computing platform 60) and the possible security-relevant capabilities of the computing platform (e.g., computing platform 60).

Figure 35:
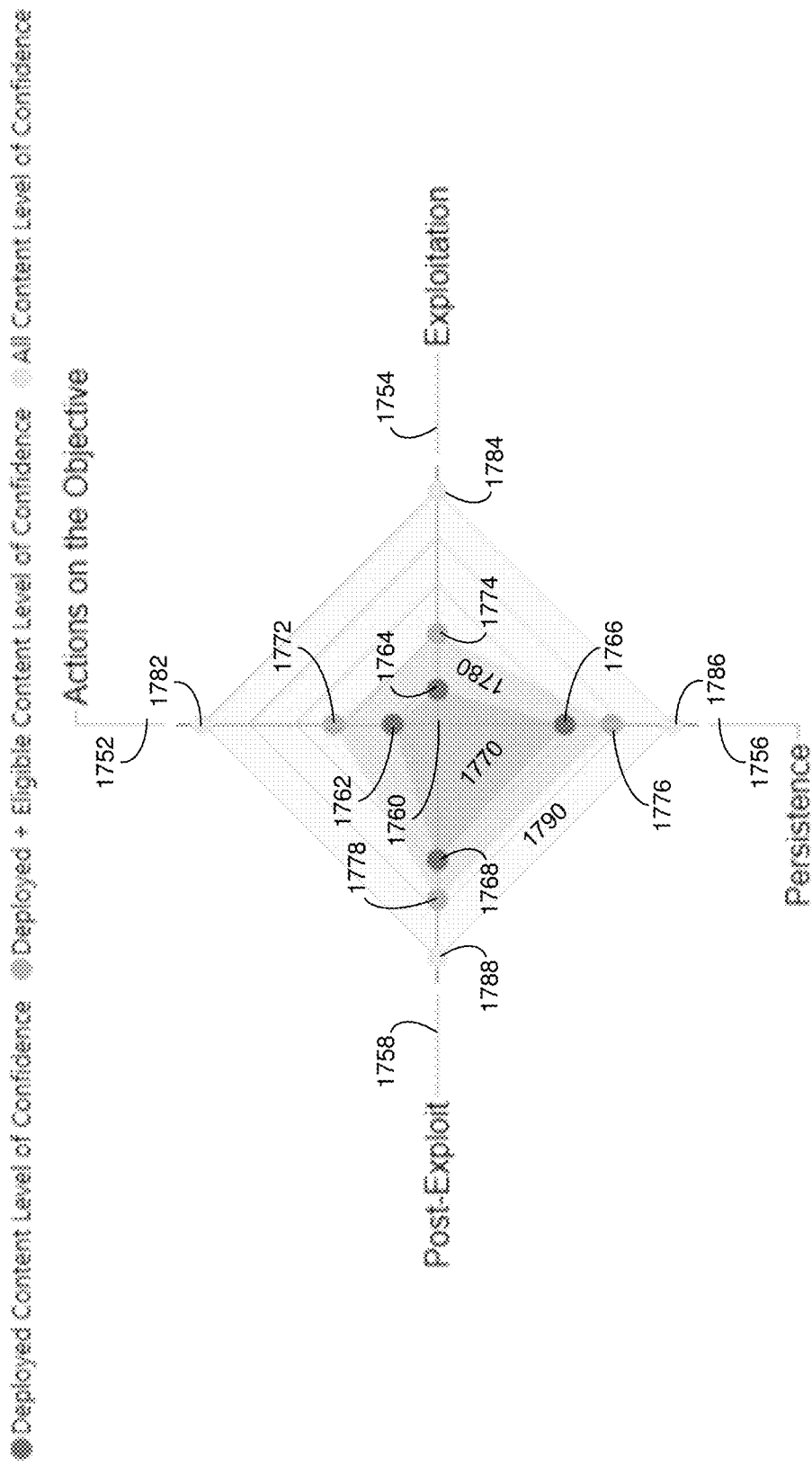

For example and referring also to FIG. 35, multi-axial comparison information may define (in this particular illustrative example) graphical comparison information that include four axes (e.g. axes 1752, 1754, 1756, 1758) that correspond to four particular types of computer threats. This multi-axial comparison information may include origin 1760, the point at which computing platform 60 has no protection with respect to any of the four types of computer threats that correspond to axes 1752, 1754, 1756, 1758. Accordingly, as the capabilities of computing platform 60 are increased to counter a particular type of computer threat, the data point along the corresponding axis is proportionately displaced from origin 1760.

As discussed above, threat mitigation process 10 may obtain 1700 consolidated platform information to identify current security-relevant capabilities for computing platform 60. Concerning such current security-relevant capabilities for computing platform 60, these current security-relevant capabilities are defined by data points 1762, 1764, 1766, 1768, the combination of which define bounded area 1770. Bounded area 1770 (in this example) defines the current security-relevant capabilities of computing platform 60.

Further and as discussed above, threat mitigation process 10 may determine 1702 possible security-relevant capabilities for computing platform 60 (i.e., the difference between the current security-relevant capabilities of computing platform 60 and the possible security-relevant capabilities of computing platform 60.

As discussed above, the possible security-relevant capabilities may concern the possible security-relevant capabilities of computing platform 60 using the currently-deployed security-relevant subsystems. For example, assume that the currently-deployed security relevant subsystems are not currently being utilized to their full potential. Accordingly, certain currently-deployed security relevant subsystems may have certain features that are available but are not utilized and/or disabled. Further, certain currently-deployed security relevant subsystems may have expanded features available if additional licensing fees are paid. Therefore and concerning such possible security-relevant capabilities of computing platform 60 using the currently-deployed security-relevant subsystems, data points 1772, 1774, 1776, 1778 may define bounded area 1780 (which represents the full capabilities of the currently-deployed security-relevant subsystems within computing platform 60).

Further and as discussed above, the possible security-relevant capabilities may concern the possible security-relevant capabilities of computing platform 60 using one or more supplemental security-relevant subsystems. For example, assume that supplemental security-relevant subsystems are available for the deployment within computing platform 60. Therefore and concerning such possible security-relevant capabilities of computing platform 60 using such supplemental security-relevant subsystems, data points 1782, 1784, 1786, 1788 may define bounded area 1780 (which represents the total capabilities of computing platform 60 when utilizing the full capabilities of the currently-deployed security-relevant subsystems and any supplemental security-relevant subsystems).

Naturally, the format, appearance and content of the graphical comparison information (e.g., graphical comparison information 1750) may be varied greatly depending upon the design criteria and anticipated performance/use of threat mitigation process 10. Accordingly, the appearance, format, completeness and content of graphical comparison information 1750 is for illustrative purposes only and is not intended to be a limitation of this disclosure, as other configurations are possible and are considered to be within the scope of this disclosure. For example, content may be added to graphical comparison information 1750, removed from graphical comparison information 1750, and/or reformatted within graphical comparison information 1750.

The graphical comparison information (e.g., graphical comparison information 1750) that illustrates a difference between the current security-relevant capabilities of the computing platform (e.g., computing platform 60) and the possible security-relevant capabilities of the computing platform (e.g., computing platform 60) may include: level-of-confidence comparison information that illustrates the difference between the current security-relevant capabilities of the computing platform (e.g., computing platform 60) and the possible security-relevant capabilities of the computing platform (e.g., computing platform 60).

For example, graphical comparison information 1750 may include various levels of confidences, such as: first level-of-confidence comparison information 1792 and second level-of-confidence comparison information 1794.

In this particular example:
first level-of-confidence comparison information 1792, which defines 58.90% as the "Increase in Level of Confidence with Eligible Content not Deployed" (i.e., the possible security-relevant capabilities of computing platform 60 using the currently-deployed security-relevant subsystems). In this particular example, 58.90% defines the increase in surface area between bounded area 1770 versus bounded area 1780.
second level-of-confidence comparison information 1794, which defines 173.97% as the "Increase in Level of Confidence with All Content not Deployed" (i.e., the possible security-relevant capabilities of computing platform 60 using one or more supplemental security-relevant subsystems). In this particular example, 173.97% defines the increase in surface area between bounded area 1770 versus bounded area 1790.

Figure 36:
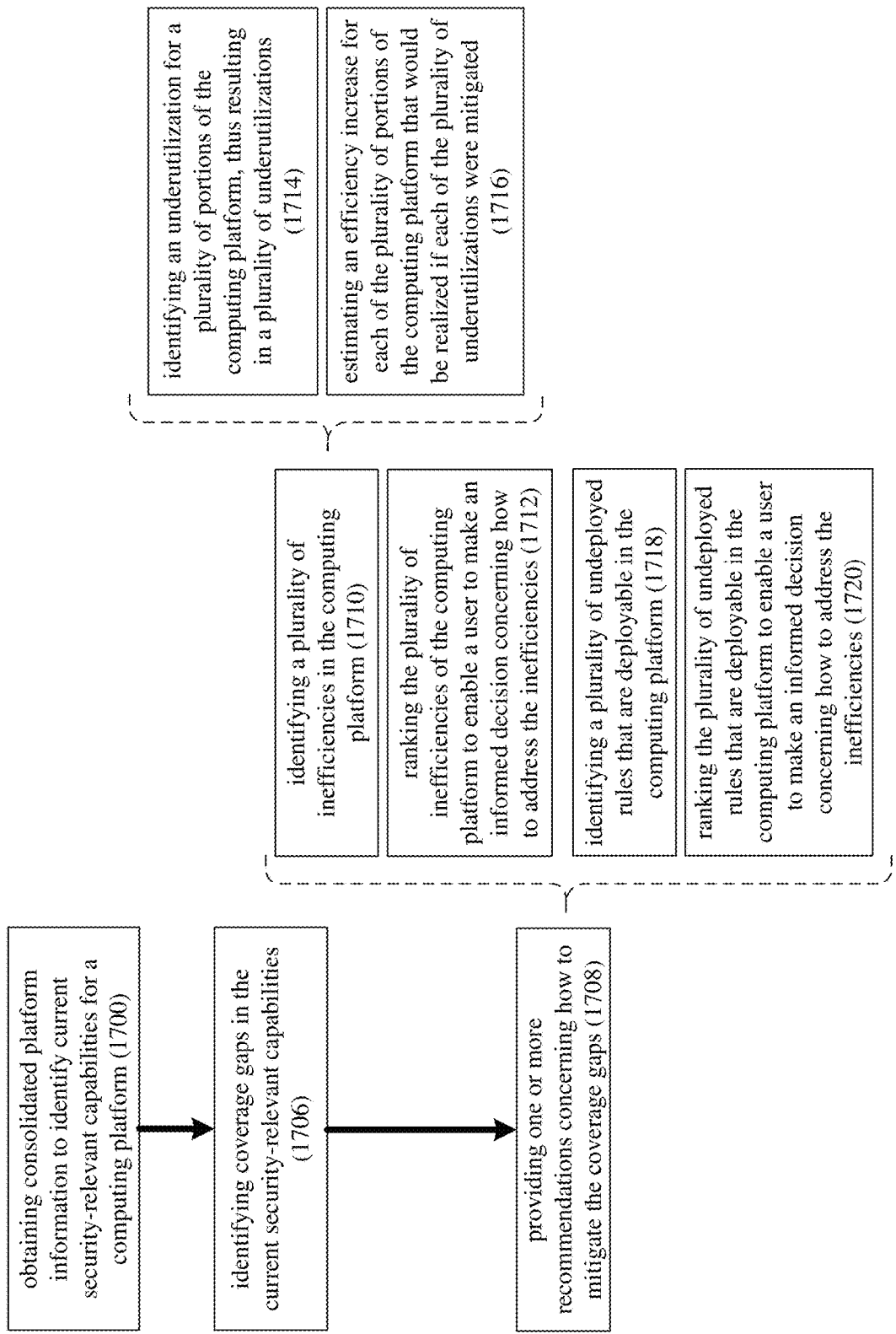
FIG. 36 is a flowchart of another implementation of the threat mitigation process of FIG. 1 according to an embodiment of the present disclosure.

Concept 3:

As discussed above and referring also to FIG. 36, threat mitigation process 10 may obtain 1700 consolidated platform information to identify current security-relevant capabilities for a computing platform (e.g., computing platform 60). This consolidated platform information may be obtained from an independent information source (e.g., such as SIEM system 230 that may provide system-defined consolidated platform information 236) and/or may be obtained from a client information source (e.g., such as questionnaires 240 that may provide client-defined consolidated platform information 238.

In order to enhance the security of computing platform 60, threat mitigation process 10 may identify 1706 coverage gaps in the current security-relevant capabilities of the computing platform (e.g., computing platform 60), and provide 1708 one or more recommendations (e.g., recommendations 1796, 1798) concerning how to mitigate such coverage gaps.

For example and when providing 1708 one or more recommendations (e.g., recommendations 1796, 1798) concerning how to mitigate such coverage gaps, threat mitigation process 10 may: identify 1710 a plurality of inefficiencies (e.g., as identified in recommendations 1796) in the computing platform (e.g., computing platform 60); and rank 1712 the plurality of inefficiencies (e.g., as identified in recommendations 1796) of the computing platform (e.g., computing platform 60) to enable a user (e.g., an administrator or security professional associated with computing platform 60) to make an informed decision concerning how to address the inefficiencies (e.g., as identified in recommendations 1796).

Referring also to FIG. 37 and when identifying 1710 a plurality of inefficiencies (e.g., as identified in recommendations 1796) in the computing platform (e.g., computing platform 60), threat mitigation process 10 may: identify 1714 an underutilization (e.g., underutilization 1800) for a plurality of portions of the computing platform (e.g., computing platform 60), thus resulting in a plurality of underutilizations; and may estimate 1716 an efficiency increase for each of the plurality of portions of the computing platform (e.g., computing platform 60) that would be realized if each of the plurality of underutilizations were mitigated.

For example, threat mitigation process 10 may identify 1714 a specific underutilization (e.g., underutilization 1800), wherein only 21% of the Windows OS systems operating within computing platform 60 are performing the above-described logging functionality (e.g., logging data for STEM system 230). Threat mitigation process 10 may estimate 1716 that an efficiency increase of 8% (concerning the detection of true positives) may be realized if 100% of the Windows OS systems operating within computing platform 60 are performing the above-described logging functionality.

Threat mitigation process 10 may rank underutilization 1800 as "Priority 1" to enable a user (e.g., an administrator or security professional associated with computing platform 60) to make an informed decision concerning how to address the underutilization (e.g., as identified in recommendations 1796), wherein such ranking may consider all of the above-described factors associated with (in this example) underutilization 1800.

Further and when providing 1708 one or more recommendations (e.g., recommendations 1796, 1798) concerning how to mitigate such coverage gaps, threat mitigation process 10 may: identify 1718 a plurality of undeployed rules (e.g., as identified in recommendations 1798) that are deployable in the computing platform (e.g., computing platform 60); and rank 1720 the plurality of undeployed rules (e.g., as identified in recommendations 1798) that are deployable in the computing platform (e.g., computing platform 60) to enable a user (e.g., an administrator or security professional associated with computing platform 60) to make an informed decision concerning how to address the undeployed rules (e.g., as identified in recommendations 1798).

Each of the plurality of undeployed rules (e.g., as identified by threat mitigation process 10 within recommendations 1798) may be associated with a kill chain phase; may be assigned a severity level; and may be assigned a performance score that is based, at least in part, on the possible of false positives.

For example and concerning undeployed rule 1802 (e.g., "Threat File Hash Detected") identified 1718 by threat mitigation process 10, undeployed rule 1802 is shown to have been assigned:
- a severity level of "C", wherein threat mitigation process 10 may assign a severity level of "C" for Critical, "H" for High, "M" for Medium, "L" for Low, and unassigned for when the severity level is variable;
- a probability of detecting a true positive of 50%;
- a performance score of 74, wherein this performance score may be indicative of the ability of undeployed rule 1802 to detect true positives while avoiding injecting noise (e.g., false positives) into the system;
- a kill chain phase of "3-Post Exploit" (as shown in FIG. 35).

As discussed above, threat mitigation process 10 may rank 1720 undeployed rule 1800 as "Priority 1" to enable a user (e.g., an administrator or security professional associated with computing platform 60) to make an informed decision concerning how to address the undeployed rules (e.g., as identified in recommendations 1798), wherein such ranking 1720 may consider all of the above-described factors associated with (in this example) undeployed rule 1802.

Concept 4

As will be discussed below, threat mitigation process 10 may be configured to monitor that manner in which a client reacts in response to being notified of a security event being detected within the monitored computing platform (e.g., computing platform 60). Examples of such a detected security event may include but are not limited to one or more of: access auditing; anomalies; authentication; denial of services; exploitation; malware; phishing; spamming; reconnaissance; and web attack.

Figure 38:
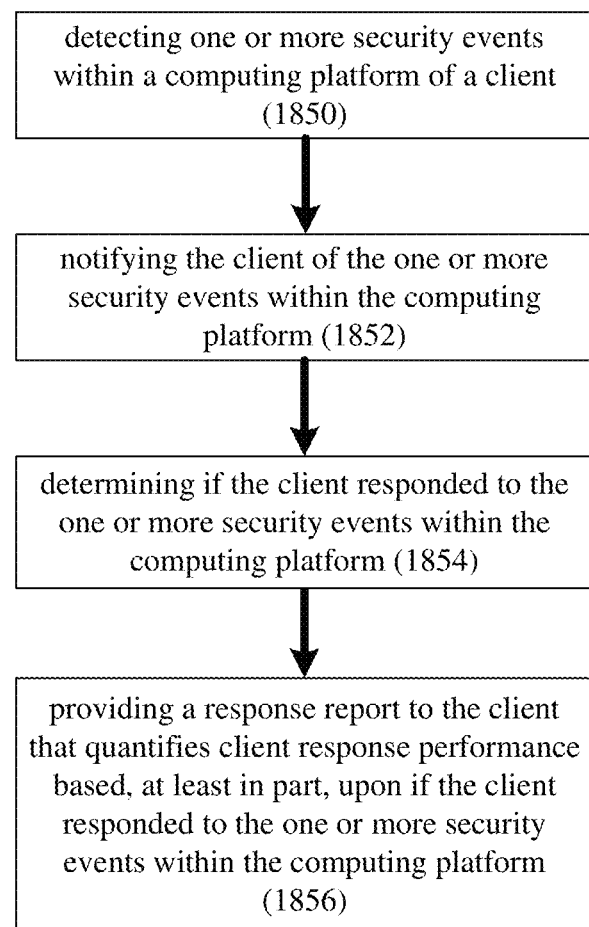
FIG. 38 is a flowchart of another implementation of the threat mitigation process of FIG. 1 according to an embodiment of the present disclosure.

Referring also to FIG. 38, threat mitigation process 10 may detect 1850 one or more security events within a computing platform (e.g., computing platform 60) of a client (e.g., user/owner/operator of computing platform 60). As discussed above, threat mitigation process 10 may be configured to monitor the health of computing platform 60 and provide feedback to a third-party concerning the same. For example and in the event that threat mitigation process 10 detects 1850 one or more security events (e.g., access auditing; anomalies; authentication; denial of services; exploitation; malware; phishing; spamming; reconnaissance; and web attack) within a computing platform (e.g., computing platform 60) of a client (e.g., user/owner/operator of computing platform 60), threat mitigation process 10 may notify 1852 the client (e.g., user/owner/operator of computing platform 60) of the one or more security events within the computing platform (e.g., computing platform 60).

Threat mitigation process 10 may determine 1854 if the client (e.g., user/owner/operator of computing platform 60) responded to the one or more security events within the computing platform (e.g., computing platform 60). Specifically, threat mitigation process 10 may determine 1854 if the client (e.g., user/owner/operator of computing platform 60) responded to being notified 1852 about the security event(s) detected 1850 within the computing platform (e.g., computing platform 60).

Figure 39:
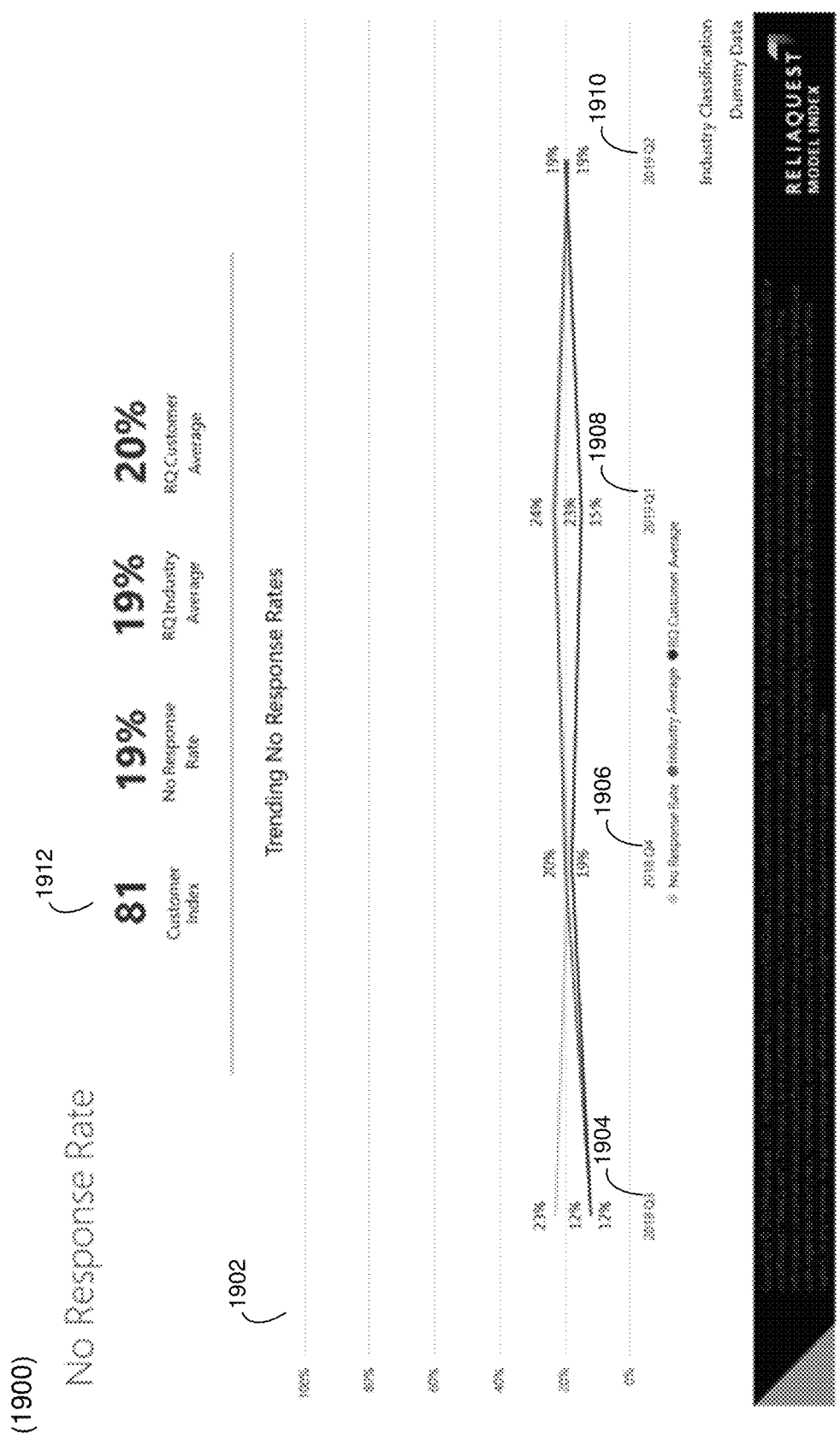
FIG. 39 is a diagrammatic view of a screen rendered by the threat mitigation process of FIG. 1 according to an embodiment of the present disclosure.

Referring also to FIG. 39, threat mitigation process 10 may provide 1856 a response report (e.g., response report 1900) to the client (e.g., user/owner/operator of computing platform 60) that quantifies client response performance based, at least in part, upon if the client (e.g., user/owner/operator of computing platform 60) responded to the one or more security events (e.g., access auditing; anomalies; authentication; denial of services; exploitation; malware; phishing; spamming; reconnaissance; and web attack) within the computing platform (e.g., computing platform 60).

The response report (e.g., response report 1900) may define a client response rate with respect to if the client (e.g., user/owner/operator of computing platform 60) responded to the one or more security events within the computing platform (e.g., computing platform 60). For example, response report 1900 is shown to define that the client (e.g., user/owner/operator of computing platform 60) failed to respond to 19% of the security event(s) that were detected 1850 within the computing platform (e.g., computing platform 60) and of which the client (e.g., user/owner/operator of computing platform 60) was notified 1852. The client (e.g., user/owner/operator of computing platform 60) may be deemed to have not responded in the event that threat mitigation process 10 has not been notified that the client (e.g., user/owner/operator of computing platform 60) has received and/or resolved the security event about which they have been notified 1852.

The response report (e.g., response report 1900) may compare the client response rate to the response rate of third-parties, wherein these third-parties may include one or more of: other clients regardless of industry; and other clients in the same industry as the client (e.g., user/owner/operator of computing platform 60). For example, response report 1900 is shown to define that:
- 20% of other clients (regardless of industry) failed to respond to the security events that were detected within their computing platforms; and
- 19% of other clients (in the same industry as the client) failed to respond to the security events that were detected within their computing platforms.

The response report (e.g., response report 1900) may define time-based response performance (e.g., time-based response performance 1902) over a defined period of time. This time-based response performance (e.g., time-based response performance 1902) may include time-based response performance for the client (e.g., user/owner/operator of computing platform 60) and for third-parties.

For example, response report 1900 is shown to include time-based response performance 1902 for the client, other clients (regardless of industry) and other clients (in the same industry as the client) covering a period of four quarters 1904, 1906, 1908, 1910 (e.g., 2018 Q3, 2018 Q4, 2019 Q1 and 2019 Q2).

Response report 1900 may also include a customer index (e.g., customer index 1912), which (in general terms) is a sliding scale grade concerning the response performance of the client (e.g., user/owner/operator of computing platform 60) versus the response performance of the third-parties (e.g., other clients regardless of industry and other clients in the same industry as the client).

Naturally, the format, appearance and content of response report 1900 may be varied greatly depending upon the design criteria and anticipated performance/use of threat mitigation process 10. Accordingly, the appearance, format, completeness and content of response report 1900 is for illustrative purposes only and is not intended to be a limitation of this disclosure, as other configurations are possible and are considered to be within the scope of this disclosure. For example, content may be added to response report 1900, removed from response report 1900, and/or reformatted within response report 1900.

Concept 5:

As will be discussed below, threat mitigation process 10 may be configured to monitor how quickly a client resolves a security event detected within the monitored computing platform (e.g., computing platform 60). As discussed above, examples of such detected security events may include but are not limited to one or more of: access auditing; anomalies; authentication; denial of services; exploitation; malware; phishing; spamming; reconnaissance; and web attack.

Figure 40:
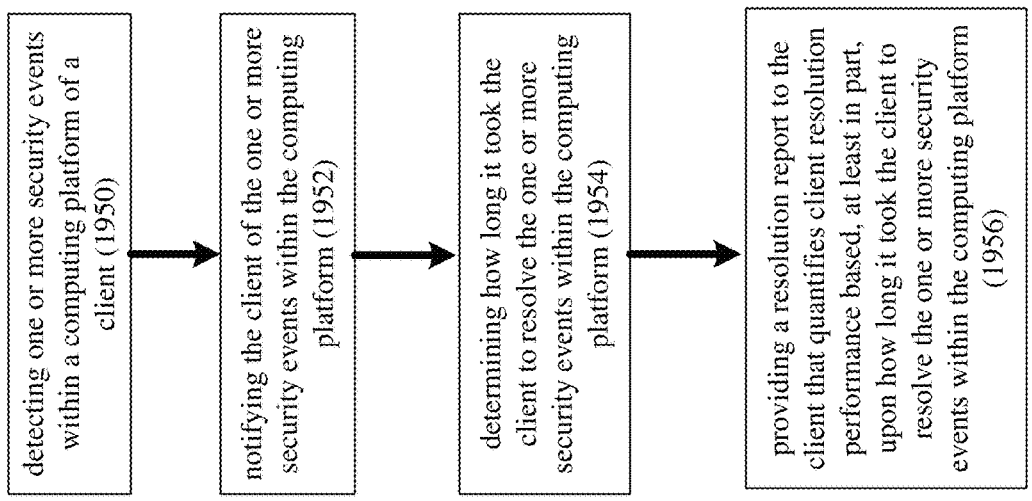
FIG. 40 is a flowchart of another implementation of the threat mitigation process of FIG. 1 according to an embodiment of the present disclosure.

Referring also to FIG. 40, threat mitigation process 10 may detect 1950 one or more security events within a computing platform (e.g., computing platform 60) of a client (e.g., user/owner/operator of computing platform 60). As discussed above, threat mitigation process 10 may be configured to monitor the health of computing platform 60 and provide feedback to a third-party concerning the same. For example and in the event that threat mitigation process 10 detects 1950 one or more security events (e.g., access auditing; anomalies; authentication; denial of services; exploitation; malware; phishing; spamming; reconnaissance; and web attack) within a computing platform (e.g., computing platform 60) of a client (e.g., user/owner/operator of computing platform 60), threat mitigation process 10 may notify 1952 the client (e.g., user/owner/operator of computing platform 60) of the one or more security events within the computing platform (e.g., computing platform 60).

Threat mitigation process 10 may determine 1954 how long it took the client (e.g., user/owner/operator of computing platform 60) to resolve the one or more security events within the computing platform (e.g., computing platform 60). Specifically, threat mitigation process 10 may determine 1954 how long it took the client (e.g., user/owner/operator of computing platform 60) to resolve the security event(s) detected 1950 within computing platform 60 about which they were notified 1952.

Figure 41:
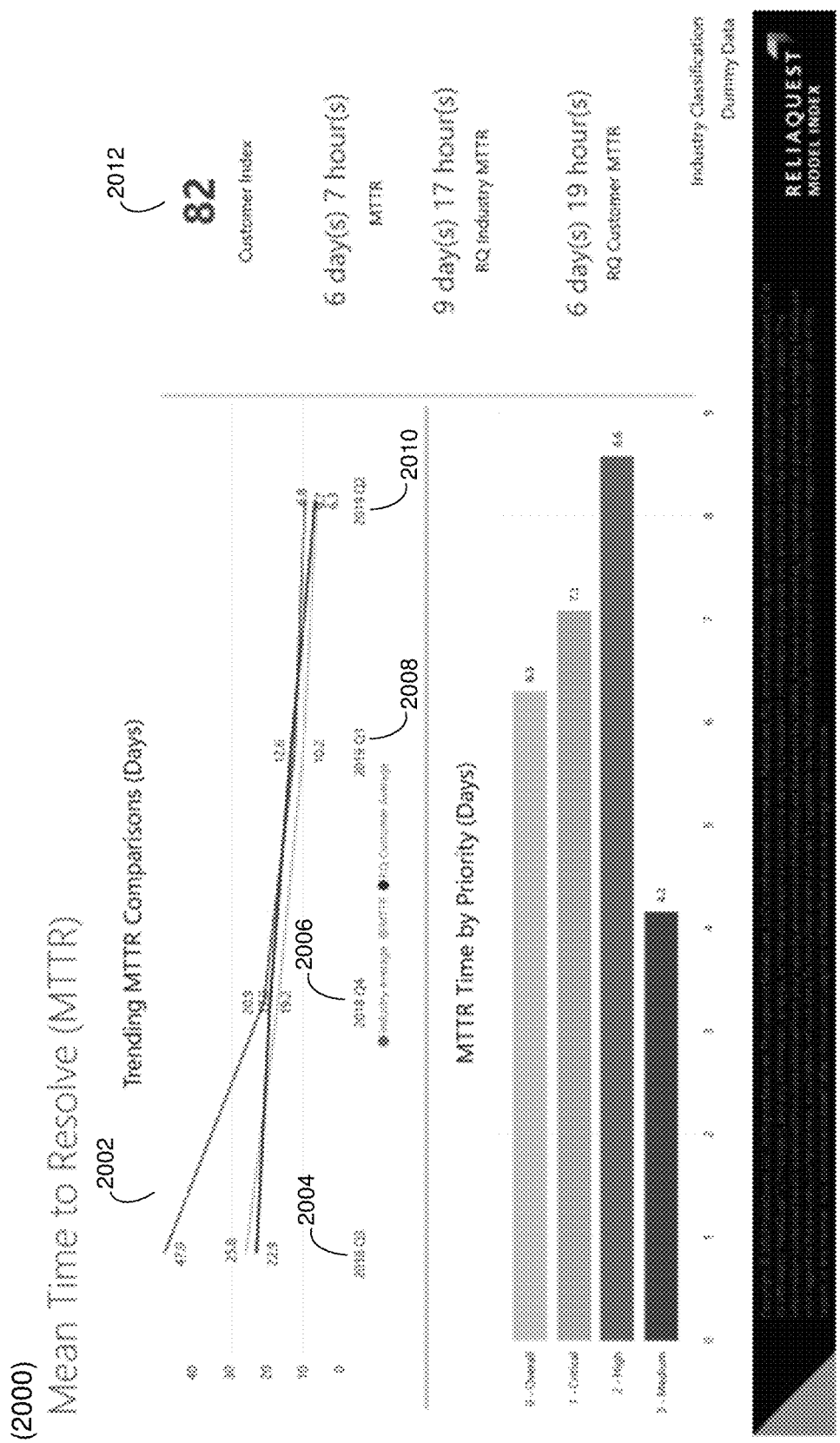
FIG. 41 is a diagrammatic view of a screen rendered by the threat mitigation process of FIG. 1 according to an embodiment of the present disclosure.

Referring also to FIG. 41, threat mitigation process 10 may provide 1956 a resolution report (e.g., resolution report 2000) to the client (e.g., user/owner/operator of computing platform 60) that quantifies client performance based, at least in part, upon how long it took the client (e.g., user/owner/operator of computing platform 60) to resolve the one or more security events within the computing platform (e.g., computing platform 60).

For example, resolution report 2000 is shown to define a client resolution time (e.g., a mean time) of 6 Days, 7 Hours with respect to how long it took the client (e.g., user/owner/operator of computing platform 60) to resolve the security event(s) that were detected 1950 within the computing platform (e.g., computing platform 60) and of which the client (e.g., user/owner/operator of computing platform 60) was notified 1952.

The resolution report (e.g., resolution report 2000) may compare the client resolution time to the resolution time of third-parties, wherein these third-parties may include one or more of: other clients regardless of industry; and other clients in the same industry as the client (e.g., user/owner/operator of computing platform 60). For example, resolution report 2000 is shown to define that:

other clients (regardless of industry) had a mean resolution time of 6 Days, 19 Hours for resolving the security events that were detected within their computing platforms; and other clients (in the same industry as the client) had a mean resolution time of 9 Days, 17 Hours for resolving the security events that were detected within their computing platforms.

The resolution report (e.g., resolution report 2000) may define time-based resolution performance (e.g., time-based response performance 2002) over a defined period of time. This time-based resolution performance (e.g., time-based resolution performance 2002) may include time-based resolution performance for the client (e.g., user/owner/operator of computing platform 60) and for third-parties.

For example, resolution report 2000 is shown to include time-based resolution performance 2002 for the client, other clients (regardless of industry) and other clients (in the same industry as the client) covering a period of four quarters 2004, 2006, 2008, 2010 (e.g., 2018 Q3, 2018 Q4, 2019 Q1 and 2019 Q2).

Resolution report 2000 may also include a customer index (e.g., customer index 2012), which (in general terms) is a sliding scale grade concerning the resolution performance of the client (e.g., user/owner/operator of computing platform 60) versus the resolution performance of the third-parties (e.g., other clients regardless of industry and other clients in the same industry as the client).

Resolution report 2000 may also include time-based resolution performance for the client (e.g., user/owner/operator of computing platform 60) sorted by severity. For example, resolution report 2000 is shown to define that the client (e.g., user/owner/operator of computing platform 60) had:

a resolution time of 6.3 days for all severity events;
a resolution time of 7.1 days for Critical severity events;
a resolution time of 8.6 days for High severity events; and
a resolution time of 4.2 days for Medium severity events.

Naturally, the format, appearance and content of resolution report 2000 may be varied greatly depending upon the design criteria and anticipated performance/use of threat mitigation process 10. Accordingly, the appearance, format, completeness and content of resolution report 2000 is for illustrative purposes only and is not intended to be a limitation of this disclosure, as other configurations are possible and are considered to be within the scope of this disclosure. For example, content may be added to resolution report 2000, removed from resolution report 2000, and/or reformatted within resolution report 2000.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
 detecting, using artificial intelligence/machine learning, one or more security events within a computing platform of a client;

notifying the client of the one or more security events within the computing platform;
determining if the client responded to the one or more security events within the computing platform;
determining how long it took the client to resolve the one or more security events; and
providing a response report to the client that quantifies client response performance based, at least in part, upon if the client responded to the one or more security events within the computing platform, wherein the response report includes time-based resolution performance for the client sorted by security even severity, wherein the response report compares a response rate of the client to the response rate of a third party including a customer index as a sliding scale grade concerning the response performance of the client versus the response performance of the third-parties, the response rate of the client based upon failure of the client to respond to detected security events the client was notified of, and wherein the client is one or more of a user, an owner, and an operator of the computing platform.

2. The computer-implemented method of claim 1 wherein the response report defines a client response rate with respect to if the client responded to the one or more security events within the computing platform.

3. The computer-implemented method of claim 1 wherein the third-parties include one or more of:
   other clients regardless of industry; and
   other clients in the same industry as the client.

4. The computer-implemented method of claim 1 wherein the response report defines time-based response performance over a defined period of time.

5. The computer-implemented method of claim 4 wherein the time-based response performance includes time-based response performance for the client.

6. The computer-implemented method of claim 4 wherein the time-based response performance includes time-based response performance for third-parties.

7. The computer-implemented method of claim 6 wherein the third-parties include one or more of:
   other clients regardless of industry; and
   other clients in the same industry as the client.

8. A computer program product residing on a non-transitory computer readable medium having a plurality of instructions stored thereon which, when executed by a processor, cause the processor to perform operations comprising:
   detecting, using artificial intelligence/machine learning, one or more security events within a computing platform of a client;
   notifying the client of the one or more security events within the computing platform;
   determining if the client responded to the one or more security events within the computing platform;
   determining how long it took the client to resolve the one or more security events; and
   providing a response report to the client that quantifies client response performance based, at least in part, upon if the client responded to the one or more security events within the computing platform, wherein the response report includes time-based resolution performance for the client sorted by security even severity, wherein the response report compares a response rate of the client to the response rate of a third party including a customer index as a sliding scale grade concerning the response performance of the client versus the response performance of the third-parties, the response rate of the client based upon failure of the client to respond to detected security events the client was notified of, and wherein the client is one or more of a user, an owner, and an operator of the computing platform.

9. The computer program product of claim 8 wherein the response report defines a client response rate with respect to if the client responded to the one or more security events within the computing platform.

10. The computer program product of claim 8 wherein the third-parties include one or more of:
    other clients regardless of industry; and
    other clients in the same industry as the client.

11. The computer program product of claim 8 wherein the response report defines time-based response performance over a defined period of time.

12. The computer program product of claim 11 wherein the time-based response performance includes time-based response performance for the client.

13. The computer program product of claim 11 wherein the time-based response performance includes time-based response performance for third-parties.

14. The computer program product of claim 13 wherein the third-parties include one or more of:
    other clients regardless of industry; and
    other clients in the same industry as the client.

15. A computing system including a processor and memory configured to perform operations comprising:
    detecting, using artificial intelligence/machine learning, one or more security events within a computing platform of a client;
    notifying the client of the one or more security events within the computing platform;
    determining if the client responded to the one or more security events within the computing platform;
    determining how long it took the client to resolve the one or more security events; and
    providing a response report to the client that quantifies client response performance based, at least in part, upon if the client responded to the one or more security events within the computing platform, wherein the response report includes time-based resolution performance for the client sorted by security even severity, wherein the response report compares a response rate of the client to the response rate of a third party including a customer index as a sliding scale grade concerning the response performance of the client versus the response performance of the third-parties, the response rate of the client based upon failure of the client to respond to detected security events the client was notified of, and wherein the client is one or more of a user, an owner, and an operator of the computing platform.

16. The computing system of claim 15 wherein the response report defines a client response rate with respect to if the client responded to the one or more security events within the computing platform.

17. The computing system of claim 15 wherein the third-parties include one or more of:
    other clients regardless of industry; and
    other clients in the same industry as the client.

18. The computing system of claim 15 wherein the response report defines time-based response performance over a defined period of time.

19. The computing system of claim 18 wherein the time-based response performance includes time-based response performance for the client.

20. The computing system of claim 18 wherein the time-based response performance includes time-based response performance for third-parties.

21. The computing system of claim 20 wherein the third-parties include one or more of:
   other clients regardless of industry; and
   other clients in the same industry as the client.

* * * * *